(12) United States Patent
Shimizu

(10) Patent No.: US 7,350,831 B2
(45) Date of Patent: Apr. 1, 2008

(54) END STRUCTURE OF WATER PIPE

(75) Inventor: Shohachi Shimizu, Gifu-ken (JP)

(73) Assignee: Mirai Industry Co., Ltd., Wanouchi-cho, Anpachi-gun, Gifu-ken (JP)

( * ) Notice: Subject to any disclaimer, the term of this patent is extended or adjusted under 35 U.S.C. 154(b) by 0 days.

(21) Appl. No.: 10/499,836

(22) PCT Filed: Jun. 18, 2004

(86) PCT No.: PCT/JP2002/013509

§ 371 (c)(1),
(2), (4) Date: Jun. 18, 2004

(87) PCT Pub. No.: WO03/056227

PCT Pub. Date: Jul. 10, 2003

(65) Prior Publication Data

US 2005/0081935 A1 Apr. 21, 2005

(30) Foreign Application Priority Data

Dec. 25, 2001 (JP) .............................. 2001-392476
Dec. 26, 2001 (JP) .............................. 2001-394458
Dec. 27, 2001 (JP) .............................. 2001-398470

(51) Int. Cl.
*F16L 25/00* (2006.01)

(52) U.S. Cl. ..................... 285/334.5; 285/354; 285/423

(58) Field of Classification Search ............. 285/334.5, 285/382.4, 382.5, 341–343, 234, 233, 354

See application file for complete search history.

(56) References Cited

U.S. PATENT DOCUMENTS

| | | | |
|---|---|---|---|
| 4,203,313 A | 5/1980 | Kunzli et al. | |
| 4,822,082 A * | 4/1989 | Phillipps | 285/334.1 |
| 4,893,848 A | 1/1990 | Melcher | |
| 5,295,718 A * | 3/1994 | Bartholomew | 285/258 |
| 5,967,568 A | 10/1999 | Bird | |

FOREIGN PATENT DOCUMENTS

| | | |
|---|---|---|
| GB | 18977 A A.D. 1909 | 7/1910 |
| JP | 64-55393 | 4/1989 |
| JP | 1-77188 | 5/1989 |
| JP | 2-92189 | 7/1990 |
| JP | 07-042883 | 2/1995 |
| JP | 07-251228 | 10/1995 |
| JP | 07-285078 | 10/1995 |
| JP | 10-281372 | 10/1998 |
| JP | 2000-002384 | 1/2000 |

* cited by examiner

*Primary Examiner*—Aaron Dunwoody
(74) *Attorney, Agent, or Firm*—Colin P. Cahoon; Carstens & Cahoon, LLP

(57) ABSTRACT

A water pipe includes a pipe main body made of a synthetic resin and an annular metal inner piece inserted into an end of the pipe main body. The inner piece has its diameter increased from the inside of the pipe main body so as to increase the diameter of at least a part of that portion of the pipe main body which corresponds to the inner piece. The inner diameter of the inner piece the diameter of which has been increased is almost the same as that of a portion of the pipe main body which is not enlarged by the inner piece.

10 Claims, 23 Drawing Sheets

END STRUCTURE OF WATER PIPE

FIELD OF THE INVENTION

The present invention relates to an end structure of a water pipe made of a synthetic resin and used as a hot water supply pipe, a water supply pipe, or the like, as well as a water pipe comprising the end structure. The present invention also relates to a structure connecting a water pipe and a connector together and a method of forming an end structure of a water pipe.

BACKGROUND OF THE INVENTION

As shown in FIG. 45, for example, Japanese Laid-Open Patent Publication No. 7-42883 discloses a water pipe 1101 made of a synthetic resin and used as a water supply pipe. The water pipe 1101 comprises an end structure connected to a cylindrical joint 1102 in a lockable manner.

A pipe main body 1101a of the water pipe 1101 has a flange portion 1101b formed at its end and projecting outward from an outer peripheral surface of the pipe main body 1101a along a circumferential direction of the pipe main body 1101a. Connecting cylindrical portions 1103 are formed at respective ends of the joint 1102 (FIG. 45 shows only one of the ends). An inserting cylindrical portion 1103a of each connecting cylindrical portion 1103 extends from the connecting cylindrical portion 1103 along an axial direction of the pipe main body 1101a.

An annular concave portion 1103b is formed in a part of the connecting cylindrical portion 1103 which is located radially outside the inserting cylindrical portion 1103a. An annular seal member 1107 formed of rubber is installed in the concave portion 1103b. A male thread 1104 is formed around an outer peripheral surface of the connecting cylindrical portion 1103. A female thread 1105a that can be screwed onto the male thread 1104 is formed in an inner peripheral surface of a cover nut 1105 forming the joint 1102.

A sleeve 1106 installed around an outer peripheral surface of the water pipe 1101 is generally cylindrical. The sleeve 1106 has a flange 1106b formed at one end and extending outward along a circumferential direction of the sleeve 1106. In addition, the sleeve 1106 has a tapered reduced diameter portion 1106a formed at the other end.

The joint 1102 is connected to the water pipe 1101 by externally fitting the pipe main body 1101a around the inserting cylindrical portion 1103a until the flange portion 1101b of the pipe main body 1101a abuts against the seal member 1107. With the sleeve 1106 externally fitted around the pipe main body 1101a, the male thread 1105a of the cover nut 1105 is screwed onto the female thread 1104.

As the cover nut 1105 is screwed onto the connecting cylindrical portion 1103, the reduced diameter portion 1106a of the sleeve 1106 decreases owing to the pressure from the inner peripheral surface of the cover nut 1105. Accordingly, an inner peripheral surface of the sleeve 1106 is brought into pressure connection with the outer peripheral surface of the pipe main body 1101a. At the same time, the flange portion 1101b of the pipe main body 1101a is sandwiched between the flange 1106b of the sleeve 1106 and the concave portion 1103b. As a result, the pipe main body 1101a is connected to the connecting cylindrical portion 1103 with the water pipe 1101 locked on the joint 1102.

The flange portion 1101b of the pipe main body 1101a is formed by heating and softening each end of the pipe main body 1101a and pressing the end against a predetermined jig for molding. Thus, the operation of forming the flange portion 10b is very complicated. Further, the flange portion 1101b is formed by molding a synthetic resin. Accordingly, if for example, the flange portion 1101b is repeatedly expanded and contracted by a variation in temperature, it may be deformed. When the flange portion 1101b is deformed, it is unstably sandwiched between the flange 1106b and the concave portion 1103b. Consequently, the pipe main body 1101a and the joint 1102 are unstably connected together.

Japanese Laid-Open Patent Publication No. 2000-2384, shown in FIG. 46 discloses a technique to prevent the leakage of a fluid from the end structure between a joint 2102 and a water pipe 2101 both of which are generally cylindrical. The joint 2102, formed of metal, is connected to a pipe main body 2101a of the water pipe 2101. The joint 2102 has a connecting cylindrical portion 2103 formed at one end and inserted into the water pipe 2101. The joint 2102 has a pipe (not shown) connectibly formed at one end. The connecting cylindrical portion 2103 has a plurality of projections 2103a formed around its outer peripheral surface at fixed intervals and projecting outward along a circumferential direction of the connecting cylindrical portion 2103.

The diameter of each end of the pipe main body 2101a is increased using a jig (not shown) so that when the water pipe 2101 is connected to the joint 2102, the pipe main body 2101a has almost the same inner diameter as that of the connecting cylindrical portion 2103 to reduce the flow loss of a fluid at the connecting cylindrical portion 2103. Before the end of the pipe main body 2101a, the diameter of which has been increased, returns to its original state owing to its own contraction force, the portion of the pipe main body 2101a the diameter of which has been increased is installed around the outer peripheral surface of the connecting cylindrical portion 2103. An inner peripheral surface of the pipe main body 2101a is brought into pressure contact with the outer peripheral surface of the connecting cylindrical portion 2103 because of a decrease in diameter caused by the contraction. Moreover, a fixed ring 2104 formed of a synthetic resin is fitted around the end of the connected pipe main body 2101a.

The fixed ring 2104 has its diameter reduced by contraction to clamp the end of the pipe main body 2101a from its outer periphery to sandwich the end of the pipe main body 2101a between the fixed ring 2104 and the connecting cylindrical portion 2103. As a result, the projections 2103a cut into the inner peripheral surface of the pipe main body 2101a to connect the water pipe 2101 to the joint 2102 in a lockable manner.

With the water pipe 2101 connected to the joint 2102, the pipe main body 2101a has its diameter reduced and the fixed ring 2104 is clamped to the end of the pipe main body 2101a. Accordingly, the inner peripheral surface of the pipe main body 2101a is brought into pressure contact with the outer peripheral surface of the connecting cylindrical portion 2103. This forms a seal between the water pipe 2101 and the joint 2102. This seal structure prevents the leakage of a fluid from the end of the pipe main body 2101a, thus preventing the leakage of a fluid between the water pipe 2101 and the joint 2102.

If the end of the pipe main body 2101a is installed around the outer peripheral surface of the connecting cylindrical portion 2103, the end must be enlarged so that its inner diameter is larger than the outer diameter of the connecting cylindrical portion 2103. That is, the inner diameter of the end must be increased compared to the state in which the inner peripheral surface of the end of the pipe main body 2101a is in pressure contact with the outer peripheral surface of the connecting cylindrical portion 2103. Thus, an unnecessarily heavy load is imposed on the end of the pipe main body 2101a. The load may damage or deform the end of the pipe main body 2101a. Consequently, while the water pipe 2101 is connected to the joint 2102, a fluid may leak from the end of the pipe main body 2101a.

Further, to have the diameter of the fixed ring 2104 increased to externally fit the fixed ring 2104 around the end of the pipe main body 2101a, it is necessary to use a tool (not shown) to force the fixed ring 2104 to slide to the end of the pipe main body 2101a the diameter of which has been increased. Thus, apart from the operation of increasing the diameter of the pipe main body 2101a, it is necessary to slide the fixed ring 2104. Therefore, the operation of forming a seal structure at the end of the pipe main body 2101a is very complicated.

SUMMARY OF THE INVENTION

It is a first object of the present invention to easily form a structure for connecting a pipe main body of a water pipe to a connector. It is a second object of the present invention to stably connect the pipe main body of the water pipe to the connector. It is a third object of the present invention to minimize a load acting on an end of the pipe main body when the diameter of the pipe main body is increased. It is a fourth object of the present invention to reduce a flow loss that may occur at the end of the pipe main body while the pipe main body is connected to the connector. It is a fifth object of the present invention to easily form a seal structure that prevents the leakage of a fluid from the end of the pipe main body of the water pipe.

To accomplish the above objects, the present invention provides an end structure of a water pipe as described below. The water pipe comprises a pipe main body made of a synthetic resin and an annular metal inner piece inserted into an end of the pipe main body. The inner piece has its diameter increased from the inside of the pipe main body so as to increase the diameter of at least a part of that portion of the pipe main body which corresponds to the inner piece. The inner diameter of the inner piece the diameter of which has been increased is almost the same as that of a portion of the pipe main body which is not enlarged by the inner piece.

The present invention further provides an end structure of a water pipe described below. The water pipe comprises a pipe main body made of a synthetic resin and an annular metal inner piece inserted into an end of the pipe main body. The pipe main body is connected to a connecting cylindrical portion of a connector. The connecting cylindrical portion comprises a connection means having an engagement portion. The inner piece has its diameter increased from the inside of the pipe main body so as to form a radially outward swollen portion in at least a part of that portion of the pipe main body which corresponds to the inner piece. The swollen portion engages the pipe main body with the engagement portion so as to be locked on the connecting cylindrical portion.

The present invention further provides an end structure of a water pipe as described below. The water pipe comprises a pipe main body made of a synthetic resin and an annular metal inner piece inserted into an end of the pipe main body. The inner piece has its diameter increased from the inside of the pipe main body so as to form a seal between an outer peripheral surface of the inner piece and an inner peripheral surface of the pipe main body.

The present invention further provides a structure connecting a water pipe and a connector together. The water pipe comprises a pipe main body made of a synthetic resin and an annular metal inner piece inserted into an end of the pipe main body. The inner piece has its diameter increased from the inside of the pipe main body so as to form a radially outward swollen portion in at least a part of that portion of the pipe main body which corresponds to the inner piece. The connector comprises a connecting cylindrical portion connected to the pipe main body. The connecting cylindrical portion comprises connection means having an engagement portion. The engagement portion engages with the swollen portion to connect the pipe main body to the swollen portion so that the pipe main body is locked on the connecting cylindrical portion.

The present invention further provides a method of forming an end structure of a water pipe as described below. The water pipe comprises a pipe main body made of a synthetic resin and an annular metal inner piece. The forming method comprises inserting the inner piece into an end of the pipe main body, and increasing the diameter of the inner piece from the inside of the pipe main body so as to increase the diameter of at least a part of that portion of the pipe main body which corresponds to the inner piece, so that the inner diameter of the inner piece, the diameter of which has been increased, is almost the same as that of a portion of the pipe main body which is not enlarged by the inner piece.

The present invention further provides a method of forming an end structure of a water pipe as described below. The water pipe is connected to connectors. The water pipe comprises a pipe main body made of a synthetic resin and an annular metal inner piece. The forming method comprises inserting the inner piece into an end of the pipe main body, and increasing the diameter of the inner piece from the inside of the pipe main body so as to form a radially outward swollen portion in at least a part of that portion of the pipe main body which corresponds to the inner piece, the swollen portion engaging with a connector so that the pipe main body is connected to the connector so as not to slip out of the connector.

The present invention further provides a method of forming an end structure of a water pipe as described below. The water pipe comprises a pipe main body made of a synthetic resin and an annular metal inner piece. The forming method comprises inserting the inner piece into an end of the pipe main body, and increasing the diameter of the inner piece from the inside of the pipe main body to bring the outer peripheral surface of the inner piece into pressure contact with the inner peripheral surface of the pipe main body so as to form a seal between an outer peripheral surface of the inner piece and an inner peripheral surface of the pipe main body.

The present invention further provides an inner piece as described below. The inner piece is used to connect a pipe main body of a water pipe made of a synthetic resin to a connector so as to prevent the pipe main body from slipping out of the connector. The inner piece is made of metal and is annular. The inner piece is inserted into an end of the pipe main body. The inner piece has its diameter increased from the inside of the pipe main body so as to form a radially outward swollen portion in a part of that portion of the pipe main body which corresponds to the inner piece, the swollen portion engaging with the connector.

The present invention further provides a formation member as described below. The formation member is used to connect a pipe main body of a water pipe made of a synthetic resin to a connector. The formation member comprises a pullout piece inserted into the pipe main body in order to increase the diameter of an annular metal inner piece inserted into an end of the pipe main body, with the pullout piece being disposed inside the inner piece when inserted into the pipe main body. The pullout piece comprises an increased diameter portion having an outer diameter larger than the inner diameter of the inner piece. The increased diameter portion is pulled out of the pipe main body through the inner piece to increase the diameter of the inner piece. The inner member remaining in the pipe main body pushes the pipe main body open radially outward from the inside to form a connection portion at the end of the pipe main body.

DETAILED DESCRIPTION OF THE PREFERRED EMBODIMENTS

With reference to FIGS. 1 to 5, description will be given below of a first embodiment that embodies the present invention. The terms "upward", "downward", "right", and "left" in the description below of the present embodiment correspond to the upper, lower, right, and left sides, respectively, of the drawings.

Figure 1:
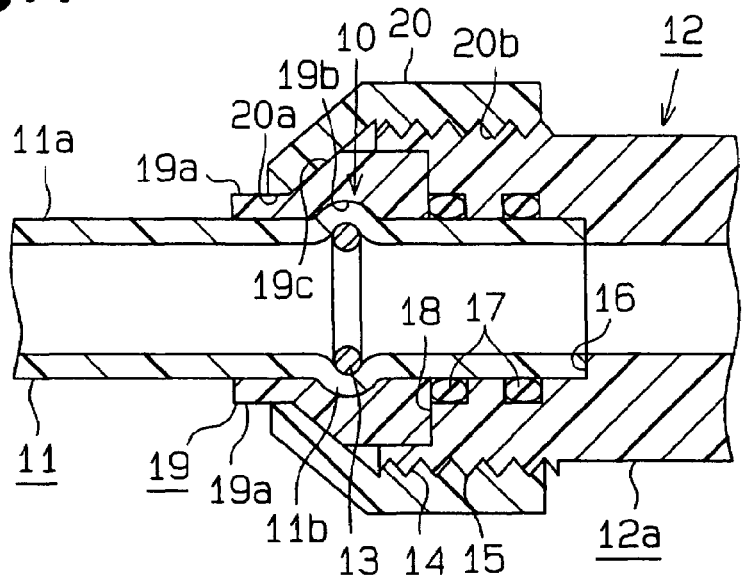
FIG. 1 is a sectional view showing how a water pipe and a joint are connected together according to a first embodiment of the present invention.

As shown in FIG. 1, an end structure 10 of a water pipe 11 is formed at the right end of a pipe main body 11a of the water pipe 11 in order to connect, in a lockable manner, the water pipe 11, made of a synthetic resin, to a joint 12 operating as a connector.

The end structure 10 comprises a swollen portion 11b provided at the right end of the pipe main body 11a and projected outside by increasing the diameter of a ring piece 13 from the inside of the ring piece 13; the ring piece 13 is inserted into the right end of the pipe main body 11a and operates as an inner piece. The ring member 13 is formed of, for example, copper. The ring member 13 may be formed of metal other than copper. Before insertion into the pipe main body 11a, the ring piece 13 has an outer diameter slightly smaller than the inner diameter of the pipe main body 11a.

The joint 12 is used to connect water pipes 11 together. The joint 12 comprises a joint main body 12a, an engagement sleeve 19, and a fixed sleeve 20 all of which are generally cylindrical. The joint main body 12a, the engagement sleeve 19, and the fixed sleeve 20 are formed of a synthetic resin. The joint main body 12a, the engagement sleeve 19, and the fixed sleeve 20 may be formed of metal. The joint main body 12a has a connecting cylindrical portion 14 formed at its left end and to which the pipe main body 11a is connected. The right end of the joint main body 12a is formed to be connectible to a pipe (not shown). A male thread 15 is formed around an outer peripheral surface of the connecting cylindrical portion 14. The joint main body 12a is internally formed with an annular first abutting surface 16. Two ring-like seal members 17 formed of a rubber material are installed in a part of the inner peripheral surface of the joint main body 12a which is closer to the left end surface of the joint main body 12a than the first abutting surface 16 so that there is a predetermined spacing between the seal members. The number of the seal members 17 is not limited to two. The seal member 17 may be installed in only one area or in three or more areas. An annular second abutting surface 18 is formed in a part of the joint main body 12a which is closer to the left end surface of the joint main body 12a than the seal member 17; the annular second abutting surface 18 has inner and outer diameters larger than those of the first abutting surface 16.

Figure 2A:
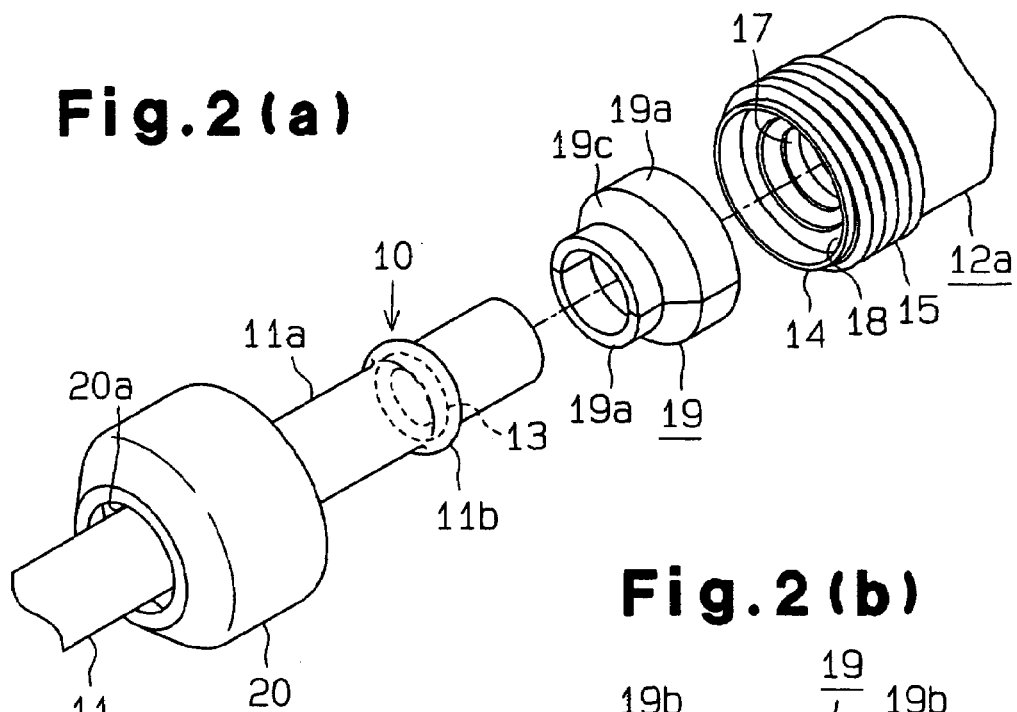
FIG. 2(a) is an exploded perspective view showing the water pipe and joint in FIG. 1.

As shown in FIG. 2(a), the engagement sleeve 19, operating as an engaged piece, is shaped like a cylinder having a left outer diameter smaller than the right outer diameter. The engagement sleeve 19 has a reduced diameter portion 19c formed substantially in its center and having an outer diameter decreasing from right to left of the engagement sleeve 19. The engagement sleeve 19 is provided in the connecting cylindrical portion 14 of the joint main body 12a.

Figure 2B:
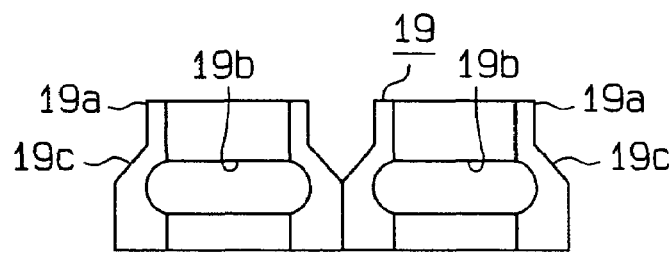
FIG. 2(b) is a front view showing an engagement sleeve in FIG. 1.

As shown in FIG. 2(b), the engagement sleeve 19 is formed by assembling a pair of divided semi-cylindrical bodies 19a together. The divided pieces 19a are connected and integrated together at their side edges so as to be separated from each other and assembled together around the connected portion. The engagement sleeve 19 has an engagement concavity 19b formed in its inner peripheral surface so as to extend along a circumferential direction of the engagement sleeve 19 and operating as an engagement portion. When the engagement sleeve 19 is installed around an outer peripheral surface of the pipe main body 11a, the swollen portion 11b engages with the interior of the engagement concavity 19b.

As shown in FIG. 2(a), the fixed sleeve 20 as an attachment is generally cylindrical. The fixed sleeve 20 is screwed onto and attached to the connecting cylindrical portion 14. The diameter of the left end of the fixed sleeve 20 increases toward the right end of the fixed sleeve 20. An inner hole 20a is formed at the left end of the fixed sleeve 20 and has a diameter slightly larger than the outer diameter of the left end of the engagement sleeve 19. The diameter of the inner hole 20a is slightly larger than the outer diameter of the pipe main body 11a plus double the diameter of a wire used to form the ring piece 13. Further, as shown in FIG. 1, a female thread 20b that can be screwed onto the male thread 15 is formed in an inner peripheral surface of the right end of the fixed sleeve 20. The joint 12 is formed by screwing the fixed sleeve 20 onto the joint main body 12a and positioning the engagement sleeve 19 between the joint main body 12a and the fixed sleeve 20.

Figure 3A:
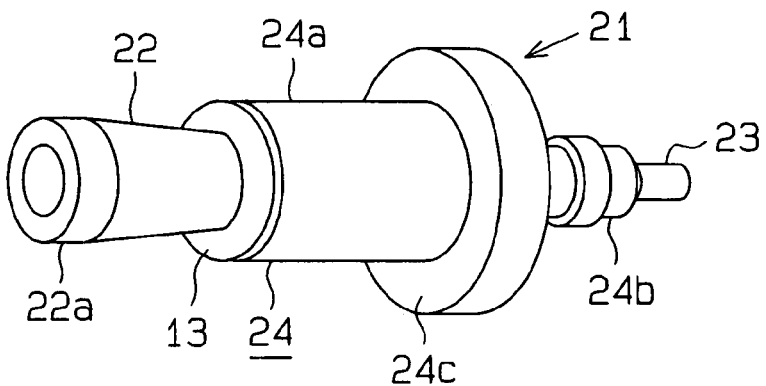
FIG. 3(a) is a perspective view showing a formation member.
Figure 3B:
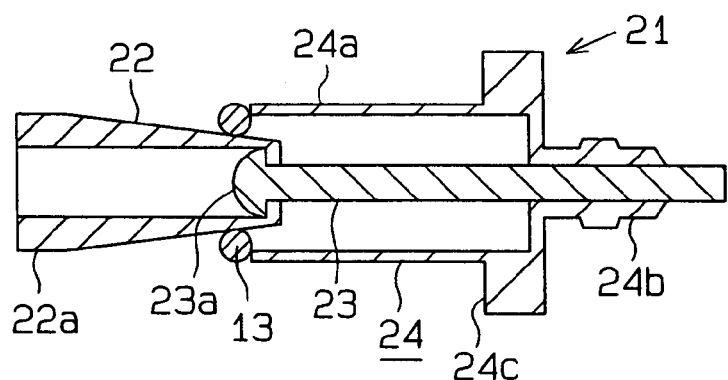
FIG. 3(b) is a sectional view showing the formation member.
Figure 4:
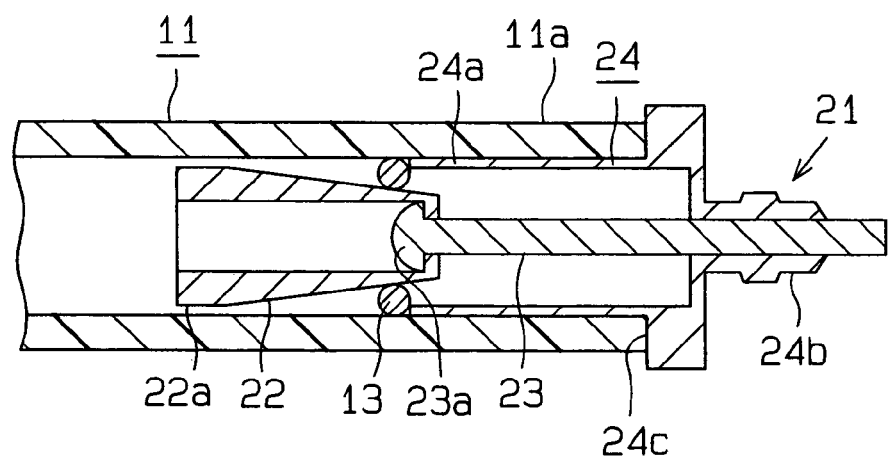
FIG. 4 is a sectional view showing that the formation member has been inserted into a pipe main body.

Now, description will be given of a formation member 21 that increases the diameter of the ring piece 13 to form the swollen portion 11b. As shown in FIGS. 3(a), 3(b), and 4, the formation member 21 comprises a generally cylindrical inserted piece 24 comprising the ring piece 13, forming the swollen portion 11b, a pullout piece 22 inserted into the pipe main body 11a so as to be partly inserted into the inserted piece 24, and a pullout pin 23 used to pull out the pullout piece 22 from the pipe main body 11a.

The cylindrical pullout piece 22 is formed of a metal material. The pullout piece 22 has an increased diameter portion 22a formed in a part located at a predetermined distance from its left end surface. The increased diameter portion 22a has a fixed diameter along an axial direction of the pullout piece 22. The pullout piece 22 is tapered so that its outer diameter decreases from the increased diameter portion 22a to the right end of the pullout piece 22.

The pullout pin 23 is attached to the pullout piece 22. The pullout pin 23 is prevented from slipping out of the pullout piece 22 by locking a head 23a of the pullout pin 23 placed in the pullout piece 22, on the inner peripheral edge of the right end of the pullout piece 22.

The inserted piece 24 comprises a cylindrical portion 24a into which the pullout piece 22 can be inserted. The cylindrical portion 24a has an annular support portion 24c projected from its right end and having a diameter larger than the outer diameter of the cylindrical portion 24a. An insertion support portion 24b having a smaller outer diameter than the cylindrical portion 24a extends from a central portion of an annular support portion 24c along an axial direction of the cylindrical portion 24a. The insert support portion 24b supports the shaft portion of the pullout pin 23. The ring piece 13 is bonded to the left opening end of the cylindrical portion 24a via an adhesive. An inner peripheral edge of the ring piece 13 is placed radially inside the inner peripheral surface of the cylindrical portion 24a.

The shaft portion of the pullout pin 23 is inserted into the insert support portion 24b through the cylindrical portion 24a. Moreover, the pullout piece 22 is inserted into the cylindrical portion 24a. An outer peripheral surface of the pullout piece 22 comes into contact with the inner peripheral surface of the ring piece 13 to regulate the insertion of the pullout piece 22 into the inserted piece 24. Furthermore, the shaft portion of the pullout pin 23 projects from the insert support portion 24b. The ring piece 13 need not be bonded to the opening end of the cylindrical portion 24a.

Now, description will be given of a method of using the formation member 21 to form the swollen portion 11b in the water pipe 11 to form the end structure 10 in the water pipe 11 and then connecting the water pipe 11 and the joint 12 together via the end structure 10.

First, as shown in FIG. 4, the inserted piece 24, pullout piece 22, and ring piece 13 of the formation member 21 are inserted into the pipe main body 11a to abut the end surface of the pipe main body 11a against the annular support portion 24c. Then, an exclusive pullout tool (not shown) is used to pull the pullout pin 23 in a direction in which the pullout pin 23 exits the pipe main body 11a. Then, the pullout pin 23 moves along the axial direction of the cylindrical portion 24a to pull the pullout piece 22 to a deeper part of the cylindrical portion 24a.

Figure 5:
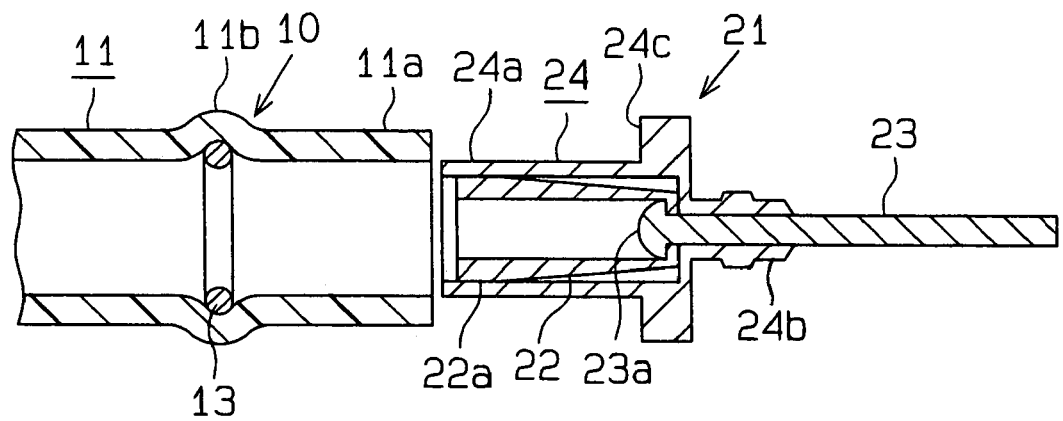
FIG. 5 is a sectional view showing that the formation member has been pulled out of the pipe main body.

The outer diameter of the pullout piece 22 increases toward the left end of the pullout piece 22. Thus, as the pullout piece 22 moves through the cylindrical portion 24a, the pullout piece 22 in contact with the inner peripheral surface of the ring piece 13 has its diameter increased. Accordingly, the ring piece 13 projecting toward the inner periphery of the cylindrical portion 24a has its outer diameter gradually increased. As shown in FIG. 5, the ring piece 13 pushes the right end of the pipe main body 11a radially outward.

When the right end surface of the pullout piece 22 abuts against the inner bottom surface of the inserted piece 24 and the pullout pin 23 is pulled, the pullout piece 22 pulls the inserted piece 24 so that the inserted piece 24 exits the pipe main body 11a. Then, with the ring piece 13 cut into the inner peripheral surface of the pipe main body 11a, the ring piece 13 is separated from the inserted piece 24. Further, the inserted piece 24 is pulled out of the pipe main body 11a. Consequently, the ring piece 13 remaining in the pipe main body 11a forms the end structure 10 including the swollen portion 11b projected outward from the outer peripheral surface of the pipe main body 11a. The ring piece 13 has almost the same inner diameter as that of the whole pipe main body 11a except for the swollen portion 11b, that is, the non-enlarged part of the pipe main body 11a.

To connect the water pipe 11 with the swollen portion 11b formed at the end of the pipe main body 11a to the joint main body 12a of the joint 12, the fixed sleeve 20 is installed in the pipe main body 11a by being passed through the inner hole 20a of the fixed sleeve 20 from the end of the water pipe 11 in which the swollen portion 11b has been formed, as shown in FIG. 2(a).

The diameter of the inner hole 20a is larger than the outer diameter of the pipe main body 11a plus double the diameter of a wire used to form the ring piece 13. That is, the diameter of the inner hole 20a is larger than the outer diameter of the swollen portion 11b. Thus, the fixed sleeve 20 is installed around the pipe main body 11a without locking the swollen portion 11b on the peripheral portion of the inner hole 20a.

Subsequently, the engagement sleeve 19, divided into the pair of divided pieces 19a, is placed around the outer periphery of the swollen portion 11b. The engagement sleeve 19 is formed by assembling the divided pieces 19a of the pair together so that the smaller portion 11b engages with the engagement concavity 19b. Further, the engagement sleeve 19 is attached to the pipe main body 11a. Then, the end of the pipe main body 11a to which the engagement sleeve 19 has been attached is inserted into the connecting cylindrical portion 14 of the pipe main body 12a.

Then, as shown in FIG. 1, the female thread 20b of the fixed sleeve 20 is screwed onto the male thread 15 of the joint main body 12a. Then, as the fixed sleeve 20 is screwed onto the joint main body 12a, the divided pieces 19a of the fixed sleeve 19 advance into the inner hole 20a. Furthermore, the inner peripheral surface of the inner hole 20a is gradually brought into pressure contact with the outer peripheral surface of the reduced diameter portion 19c of the engagement sleeve 19. Accordingly, the diameter of the engagement sleeve 19 decreases. At the same time, the engagement sleeve 19 is pressed deep into the connecting cylindrical portion 14. The pipe main body 11a with which the engagement concavity 19b of the engagement sleeve 19 is engaged is also pressed deep into the connecting cylindrical portion 14.

As a result, the right end surface of the pipe main body 11a abuts against the first abutting surface 16. The right end surface of the engagement sleeve 19 abuts against the second abutting surface 18. Further, the engagement sleeve 19 is held inside the fixed sleeve 20 attached to the joint main body 12a. This prevents the pipe main body 11a from slipping out of the fixed sleeve 20.

Since the engagement sleeve 19 holding the outer peripheral surface of the pipe main body Ha is held in the inner hole 20a, the water pipe 11 is stably held in the joint 12 via the engagement sleeve 19 and fixed sleeve 20. Specifically, the water pipe 11 is connected to the joint 12 by screwing the fixed sleeve 20 internally holding the engagement sleeve 19, onto the connecting cylindrical portion 14.

The swollen portion 11b of the water pipe 11 engages with the engagement concavity 19b of the engagement sleeve 19 to connect the pipe main body 11a and the connecting cylindrical portion 14 together so as to prevent the pipe main body 11a from slipping out of the connecting cylindrical portion 14. Thus, the water pipe 11 comprising the end structure 10 is connected to the joint 12. Furthermore, since the ring piece 13 is formed of metal, it is not deformed even if a hot fluid flows through the water pipe 11. Thus, the swollen portion 11b maintains its shape and remains engaged with the engagement concavity 19b. Moreover, the inner peripheral surface of the pair of seal members 17 is in tight contact with the outer peripheral surface of the pipe main body 11a to provide a favorable seal between the outer peripheral surface of the pipe main body 11a and the inner peripheral surface of the joint main body 12a.

The present embodiment provides the following advantages.

Figure 46:
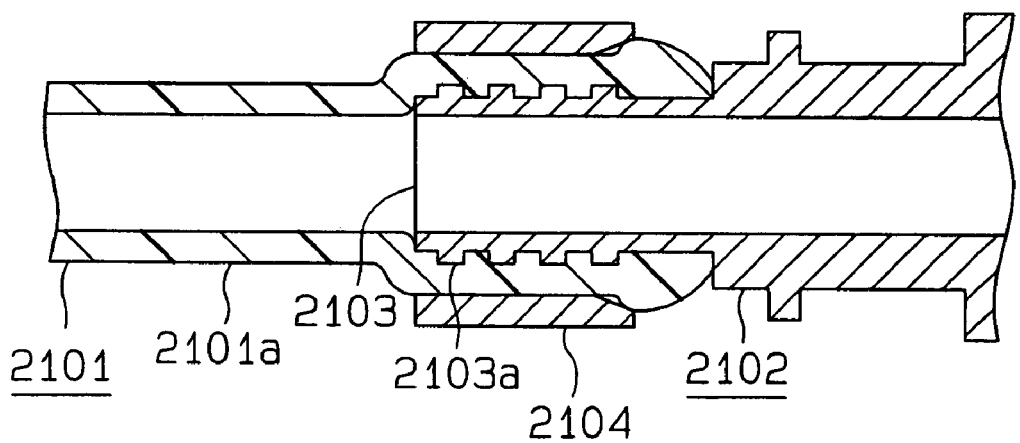
FIG. 46 is a sectional view showing another structure connecting a water pipe and a joint together in the prior art.

The end structure 10 for connecting the water pipe 11 and the joint 12 together can be formed by increasing the diameter of the ring piece 13 inserted into the end of the pipe main body 11a to form the swollen portion 11b. Accordingly, compared to the prior art, in which the end of the pipe main body 1011a is thermally softened and pressed against a predetermined jig to form the flange portion 1101b used to connect the water pipe 1101 to the joint 1102 as shown in FIG. 46, it is possible to easily form the end structure 10 for connecting the water pipe 11 to the joint 12.

The end structure 10 is formed by increasing the diameter of the ring piece 13 from its inside so that the swollen portion 11b can engage with the engagement concavity 19b of the engagement sleeve 19. This contrasts with the prior art, in which to fit the pipe main body 1101a into the inserting cylindrical portion 1103a projected from the joint 1102, it is necessary to increase the diameter of the pipe main body 1011a until the inner diameter of the pipe main body 1101a is larger than the outer diameter of the inserting cylindrical portion 1103a. That is, in the present embodiment, it is possible to reduce the load acting on the pipe main body Ha by increasing the diameter of the pipe main body 11a, while minimizing the amount by which the diameter of the pipe main body 11a is increased. Therefore, the pipe main body 11a can be prevented from being disadvantageously damaged or deformed by the load.

The ring shape of the ring piece 13 enables its diameter to be easily increased using the formation member 21. It is thus possible to easily form the swollen portion 11b and thus the end structure 10 of the water pipe 11. Further, since the diameter of the ring piece 13 is increased from the inside of the pipe main body 11a, the amount by which the swollen portion 11b projects radially outward from the pipe main body 11a can be reduced below the amount of the projection of the conventional flange portion 110b in FIG. 46. This makes it possible to reduce the size of the water pipe 11.

Since the ring piece 13 is made of metal, the swollen portion 11b is stronger than the conventional flange portion 1101b, made of a synthetic resin. Thus, after the swollen portion 11b has been formed using the ring piece 13, the end structure 10 can maintain its shape without any decrease in diameter or any deformation. Therefore, the engagement between the swollen portion 11b and the engagement concavity 19b can be maintained to stably connect the water pipe 11 and the joint 12 together.

The engagement sleeve 19 comprises the pair of divided pieces 19a. Thus, after the swollen portion 11b has been formed in the pipe main body 11a, the engagement sleeve 19 can be attached to the water pipe 11. Accordingly, it is unnecessary to increase the diameter of the ring piece 13 so that the swollen portion 1b can engage with the engagement concavity 19b after the engagement sleeve 19 has been attached to the water pipe 11. It is thus possible to promptly perform an operation for attaching the engagement sleeve 19 to the water pipe 11 and thus an operation for connecting the water pipe 11 and the joint 12 together.

The diameter of the inner hole 20a of the fixed sleeve 20 is larger than the outer diameter of the right end of the engagement sleeve 19. This enables the engagement sleeve 19 attached to the pipe main body 11a to be positioned in the fixed sleeve 20 screwed onto and connected to the joint main body 12a. It is thus possible to prevent the water pipe 11 from slipping out of the joint 12.

The diameter of the inner hole 20a of the fixed sleeve 20 is larger than the outer diameter of the pipe main body 11a plus double the diameter of the wire used to form the ring piece 13. Thus, the fixed sleeve 20 can be promptly installed around the pipe main body 11a without locking the peripheral edge of the inner hole 20a on the swollen portion 11b. It is thus possible to promptly perform an operation for connecting the water pipe 11 and the joint 12 together.

The present embodiment can eliminate disadvantages that may result from, for example, the use of a tool for increasing the diameter of the pipe main body 11a as described below. The tool comprises an aggregate having four divided pieces that can be separated from one another. With the aggregate inserted into the pipe main body 11a, a bar material is inserted into the center of the aggregate. Then, each of the four divided pieces is pushed radially outward to push the whole aggregate open to enlarge the end of the pipe main body 11a. Thus, the inner peripheral surface of the pipe main body 11a which contacts each divided piece is pushed radially outward. However, the part of the pipe main body 11a, which corresponds to the gap between the adjacent divided pieces, is not enlarged. As a result, after the inner diameter of the pipe main body 11a has been increased, an increased diameter site and a non-increased diameter site are formed at the end of the pipe main body 11a. Consequently, the inner diameter of the pipe main body 11a is not uniform in the circumferential direction. Thus, when the water pipe 11 is connected to the joint 12, the inner peripheral surface of the seal member 17 does not come into tight contact with the outer peripheral surface of the pipe main body 11a. Therefore, fluid may leak from the gap formed between the water pipe 11 and the joint 12. In contrast, in the present embodiment, the increased diameter portion 22a uniformly increases the diameter of the ring piece 13 in the circumferential direction. Thus, the end of the pipe main body 11a has its diameter uniformly increased all over its periphery. Furthermore, only the site of the pipe main body 11a, which corresponds to the ring piece 13, has its diameter increased. Accordingly, compared to the use of the above tool, the outer peripheral surface of the almost circular pipe main body 11a reliably comes into tight contact with the inner peripheral surface of the seal member 17. This makes it possible to prevent fluid from leaking from between the water pipe 11 and the joint 12. Further, when the above tool is used to directly increase the diameter of the pipe main body 11a, the present embodiment prevents the inner surface of the pipe main body 11a from being disadvantageously damaged by a face of the tool.

When the water pipe 11 is connected to the joint 12, the inner diameter of the ring piece 13 is almost the same of the inner diameter of the part of the pipe main body Ha which does not have its diameter increased. Thus, the flow loss of fluid flowing through the water pipe 11 is small in the connection between the end of the pipe main body 11a and the joint 12.

A second embodiment of the present invention will be described below with reference to FIGS. 6 to 8. In the present embodiment, only the configurations of the end structure 10 and joint 12 in the embodiments shown in FIGS. 1 to 5 are changed. Accordingly, the detailed description of similar components is omitted. Also in the present embodiment, the terms "upward", "downward", "right", and "left" in the description below correspond to the upper, lower, right, and left sides, respectively, of the drawings.

Figure 6:
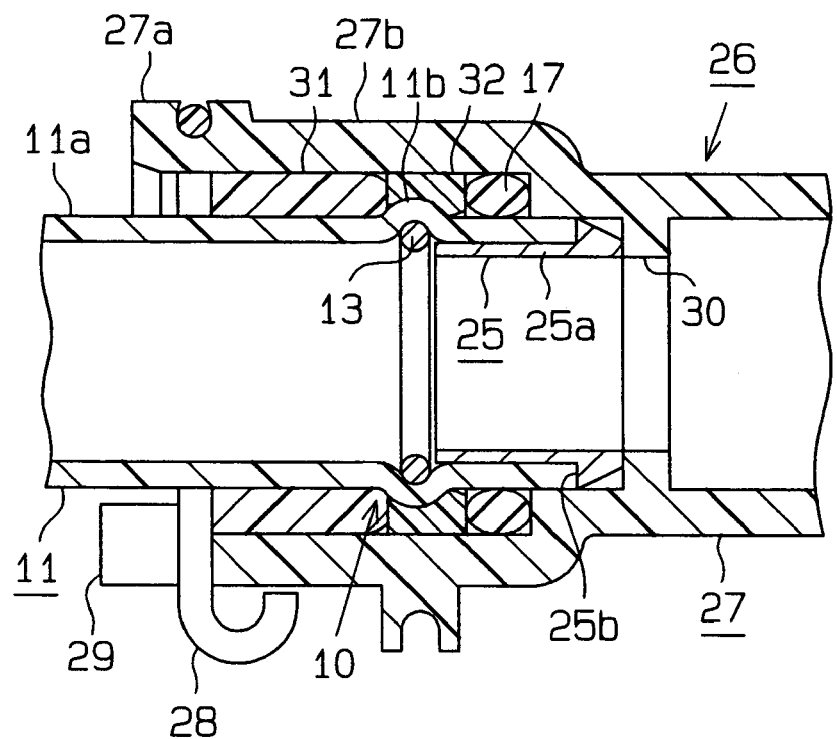
FIG. 6 is a sectional view showing how a water pipe and a joint are connected together according to a second embodiment of the present invention.

As shown in FIG. 6, in the end structure 10 of the water pipe 11, an inner sleeve 25 made of metal and operating as an inner piece is fitted into the pipe main body 11a between the swollen portion 11b of the pipe main body 11a and the opening in the pipe main body 11a. The inner sleeve 25 may be formed of a synthetic resin. The inner sleeve 25 comprises a cylindrical inner portion 25a and an engagement flange portion 25b formed at the right end of the inner portion 25a so as to project radially outward.

The inner potion 25a has an outer diameter slightly smaller than the inner diameter of the pipe main body 11a. Thus, the inner portion 25a can be inserted into the pipe main body 11a. The engagement flange portion 25b has an outer diameter larger than the inner diameter of the pipe main body 11a. When the inner portion 25a is inserted into the pipe main body 11a, the end surface of the pipe main body 11a engages with the engagement flange portion 25b. The outer diameter of the engagement flange portion 25b decreases from left to right in the drawing.

Now, a joint 26 as a connector will be described. The joint 26 is used to connect water pipes 11 together. The joint 26 includes a generally cylindrical joint main body 27, a pin body 28 having a generally U-shaped cross section and operating as an attachment, a first ring 31, and a second ring 32. The joint main body 27, the pin body 28, the first ring 31, and the second ring 32 are made of a synthetic resin. The joint main body 27, the pin body 28, the first ring 31, and the second ring 32 may be made of metal. Connecting cylindrical portions 27b are formed at respective ends of the joint main body 27 (FIG. 6 shows only the left end). Each connecting cylindrical portion 27b has a projecting portion 27a formed on a part of its outer surface which is close to its end surface, so as to project from its end surface. As shown in FIG. 7, a central portion of the pin body 28 is attached to the projecting portion 27a. The opposite ends of the pin body 28 extend along a radial direction of the connecting cylindrical portion 27b so as to extend from the projection portion 27a. The pin body 28 can be rotatively moved around its part attached to the projecting portion 27a.

The connecting cylindrical portion 27b has a pair of engagement projections 29 provided on its end surface located opposite the projecting portion 27a relative to its axis; the engagement projections 29 project outward from the end surface of the connecting cylindrical portion 27b along the axis of the joint main body 27. Each engagement projection 29 has an engagement concavity portion 29a formed in its inner side and with which the pin body 28 can be engaged. The pin body 28 can be placed so as not to be rotatively movable by rotatively moving the pin body 28 around the attached part of the projecting portion 27a so that the pin body 28 moves toward the engagement projections 29 and further engaging the pin body 28 with the engagement concavities 29a. On this occasion, as shown in FIG. 8, the pin body 28 is placed so as to traverse a part of the opening in the connecting cylindrical portion 27b. As shown in FIG. 6, the joint main body 27 has a locking projection 30 formed on its inner peripheral surface and extending along a circumferential direction of the joint main body 27.

Figure 7:
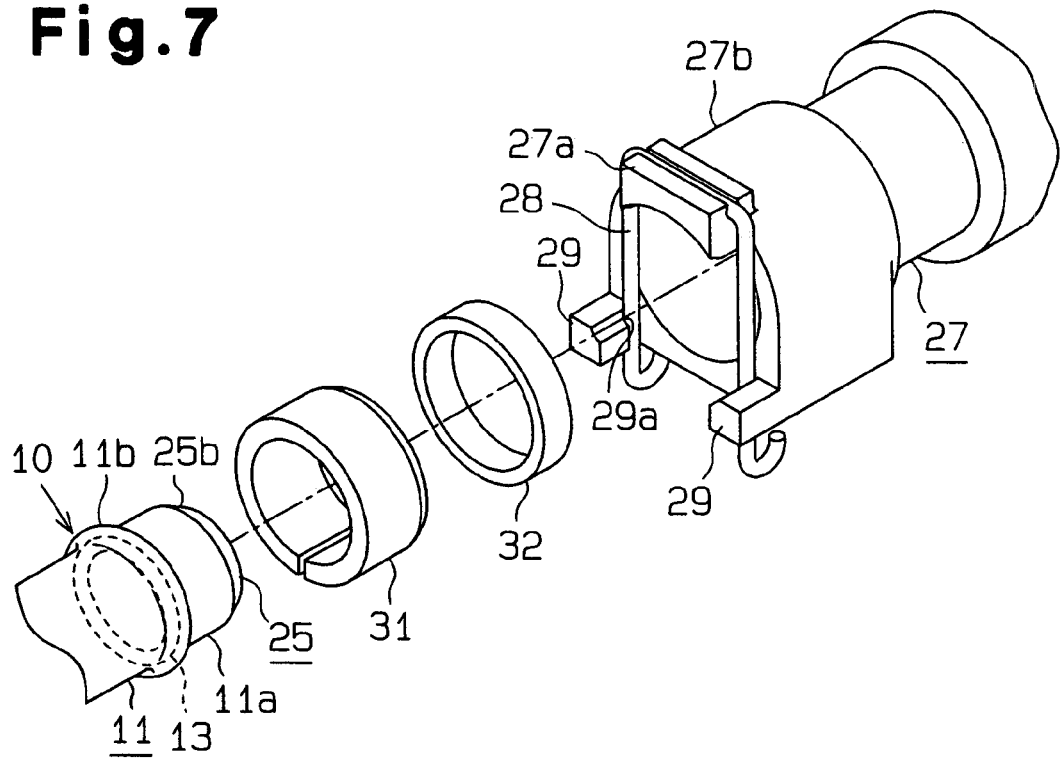
FIG. 7 is an exploded perspective view showing the water pipe and joint in FIG. 6.

As shown in FIG. 7, the first ring 31 as an engaged piece is cylindrical and is partly cut out along an axial direction so as to have a C-shaped cross section. As shown in FIG. 6, when the first ring 31 is inserted into the connecting cylindrical portion 27b, it has its outer diameter reduced by pressure from an inner peripheral surface of the connecting cylindrical portion 27b. Further, when the first ring 31 is inserted into the connecting cylindrical portion 27b, its right end surface engages with the swollen portion 11b, operating as an engagement portion. As shown in FIG. 7, the second ring 32 is cylindrical. As shown in FIG. 6, when inserted into the connecting cylindrical portion 27b, the second ring 32 is brought into pressure contact with the outer peripheral surface of the swollen portion 11b, by the pressure from the inner peripheral surface of the connecting cylindrical portion 27b.

To connect the water pipe 11 to the joint 26 configured as described above, the swollen portion 11b is first formed in the pipe main body Ha using the ring piece 13 in accordance with a method similar to that of the embodiments shown in FIGS. 1 to 5. Then, the water pipe 11 comprising the end structure 10 is formed. Then, as shown in FIG. 6, the inner portion 25a of the inner sleeve 25 is fitted into the end of the pipe main body 11a at which the swollen portion 11b has been formed. Further, the engagement flange portion 25b is engaged with the end surface of the pipe main body 11a. Subsequently, the first ring 31, the second ring 32, and the seal member 17 are installed around the end of the pipe main body 11a.

Then, with the seal member 17, the second ring 32, and the first ring 31 inserted into the connecting cylindrical portion 27b, the end of the pipe main body 11a at which the swollen portion 11b has been formed is inserted into the opening in the connecting cylindrical portion 27b. Thereafter, the pin body 28 is rotatively moved so that its opposite ends come near the engagement projections 29. Then, the pin body 28 abuts against the left end surface of the first ring 31 to press the first ring 31 deep into the connecting cylindrical portion 27b. The movement of the first ring 31 moves the second ring 32 and the seal member 17 deep into the connecting cylindrical portion 27b. On this occasion, the pressure from the inner peripheral surface of the connecting cylindrical portion 27b reduces the outer diameters of the first ring 31 and second ring 32. As a result, the first ring 31 is brought into pressure connection with the outer peripheral surface of the pipe main body 11a. The second ring 32 is brought into pressure connection with the outer peripheral surface of the swollen portion 11b.

The right end surface of the first ring 31 engages with the swollen portion 11b. Then, while remaining engaged with the swollen portion 11b, the first ring 31 is pushed deep into the connecting cylindrical portion 27n. Thus, the pipe main body 11a is fed deep into the connecting cylindrical portion 27b. The end surface of the engagement flange portion 25b is locked on the locking projection 30 in the connecting cylindrical portion 27b. This inhibits the pipe main body 11a from further moving deep into the joint main body 27. The seal member 17 comes into pressure contact with the outer peripheral surface of the pipe main body 11a. This maintains the seal between the joint main body 12a and the water pipe 11.

The water pipe 11 is connected to the joint 26, while the pin body 28 remains engaged with the engagement concavity portion 29a so as to be prevented from causing the first ring 31 engaged with the swollen portion 1b to slip out of the connecting cylindrical portion 27b.

When the pin body 28 engages with the engagement concavity portion 29a, the first ring 31 engaged with the swollen portion 11b slips out of the connecting cylindrical portion. In other words, the water pipe 11 can be prevented from slipping out of the connecting cylindrical portion 27b. As a result, compared to the case where the fixed sleeve 20 is screwed onto the joint 12 in order to prevent slipping-out of the engagement sleeve 19 engaged with the pipe main body 11 as in the case of the embodiments shown in FIGS. 1 to 5, it is possible to easily perform an operation for connecting the water pipe 11 and the joint 26 together so that the water pipe 11 will not slip out of the joint 26. Further, when fitted into the pipe main body 11a, the inner sleeve 25 protects the inner peripheral surface of the pipe main body 11a. Thus, the inner sleeve 25 can inhibit the end of the pipe main body 11a from, for example, being thermally deformed. Moreover, even if for example, the end surface of the pipe main body 11a is cut obliquely or so as to be irregular, the engagement flange portion 25b can protect the end surface of the pipe main body 11a. This makes it possible to prevent the seal member 17 from being damaged when the pipe main body 11 is inserted into the connecting cylindrical portion 27b. In addition, the engagement flange portion 25b is tapered and is thus unlikely to interfere with the seal member 17. It is thus possible to promptly perform an operation for inserting the water pipe 11 into the connecting cylindrical portion 27b.

A third embodiment of the present invention will be described below with reference to FIGS. 9 to 13. In the present embodiment, only the configurations of the end structure 10, ring piece 13, and joint 12 in the embodiments shown in FIGS. 1 to 5 are changed. Accordingly, the detailed description of similar components is omitted. Also in the present embodiment, the terms "upward", "downward", "right", and "left" in the description below correspond to the upper, lower, right, and left sides, respectively, of the drawings.

Figure 9:
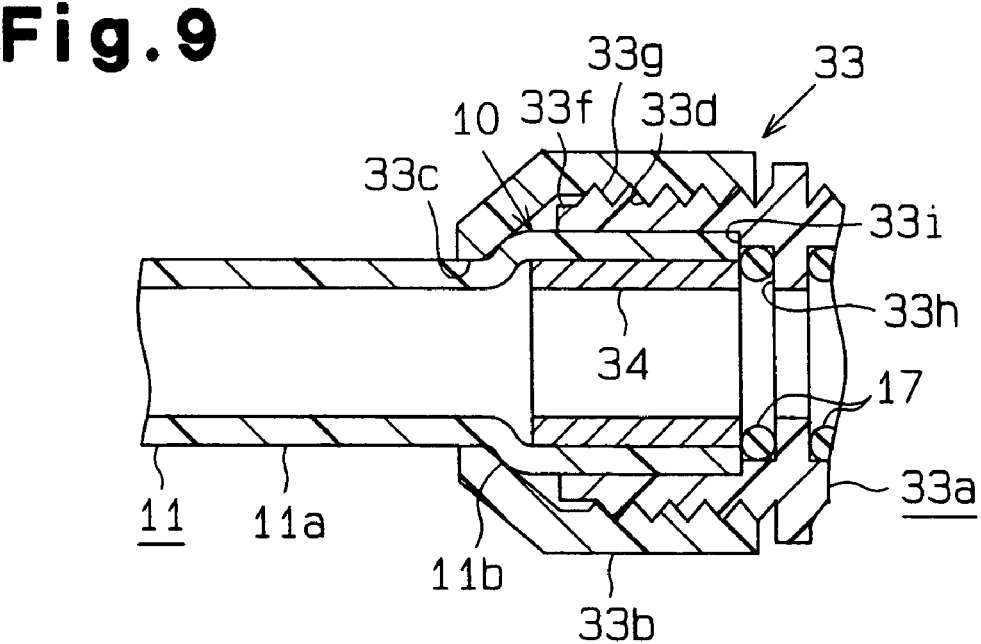
FIG. 9 is a sectional view showing how a water pipe and a joint are connected together according to a third embodiment of the present invention.

As shown in FIG. 9, the end structure 10 of the water pipe 11 comprises the swollen portion 11b formed by increasing the diameter of a cylinder 34 from its inside to swell the end of the pipe main body 11a radially outward; the cylinder 34 is inserted into the right end of the pipe main body 11a and operates as an inner piece. The cylinder 34 is formed of metal and has an outer diameter before enlargement slightly smaller than the inner diameter of the pipe main body Ha (see FIG. 12).

A joint 33 comprises a joint main body 33a and a slip-out preventing sleeve 33b both of which are generally cylindrical. The joint main body 33a and the slip-out preventing sleeve 33b are formed of a synthetic resin. The joint main body 33a and the slip-out preventing sleeve 33b may be formed of metal. The joint main body 33a has a connecting cylindrical portion 33f formed at its left end and to which the pipe main body 11a is connected. The joint main body 33a has a pipe (not shown) connected to its right end. A male thread 33g is formed around an outer peripheral surface of the connecting cylindrical portion 33f. An annular first abutting surface 33h is formed inside the joint main body 33a. The seal member 17 is installed around the first abutting surface 33h. The joint main body 33a has an annular second abutting surface 33i formed at its left end with an opening and having inner and outer diameters larger than those of the first abutting surface 33h.

Figure 10:
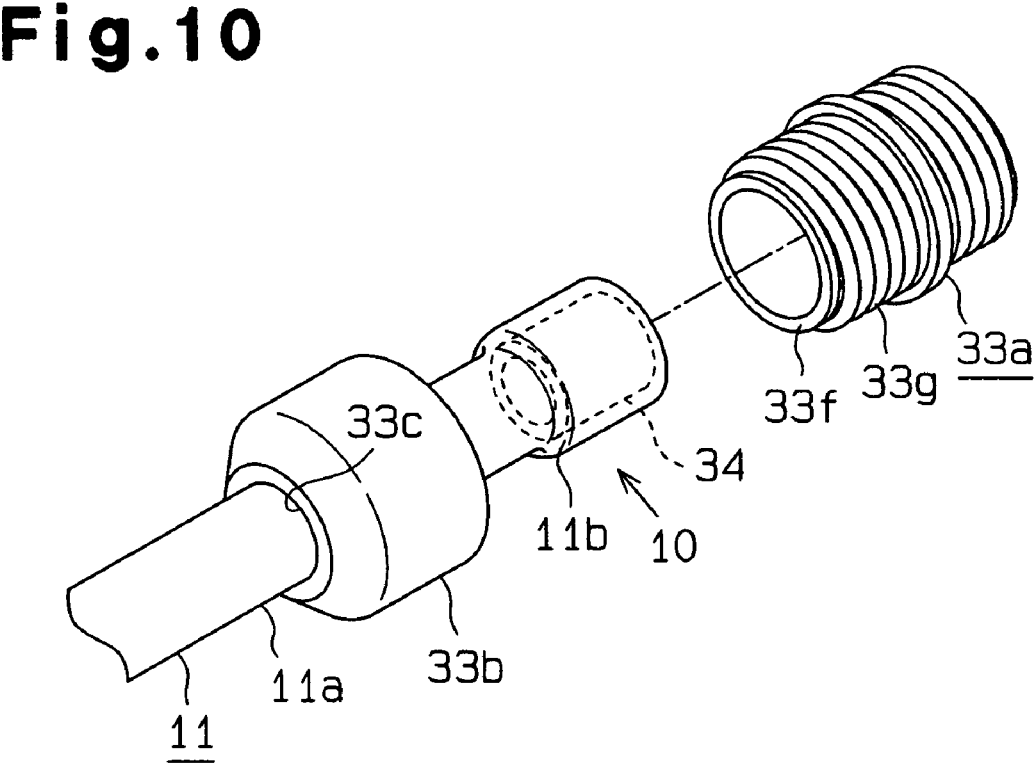
FIG. 10 is an exploded perspective view showing the water pipe and joint in FIG. 9.

As shown in FIG. 10, the slip-out preventing sleeve 33b is screwed onto and attached to the connecting cylindrical portion 33f as an attachment. Further, the slip-out preventing sleeve 33b is generally cylindrical. The slip-out preventing sleeve 33b has an inner hole 33c formed at its left end and having a diameter slightly larger than the outer diameter of the pipe main body 11a. The left end of the slip-out preventing sleeve 33b is formed to have inner and outer diameters decreasing toward the opening in the inner hole 33c in the slip-out preventing sleeve 33b. As shown in FIG. 9, the slip-out preventing sleeve 33b has a female thread 33d formed around its right inner peripheral surface and which can be screwed onto the male thread 33g.

Now, description will be given of a metal diameter increasing jig 35 that increases the diameter of the cylinder 34, shown in FIGS. 11 and 12. The terms "upward", "downward", "right", and "left" in the description of the diameter increasing jig 35 correspond to the upper, lower, right, and left sides, respectively, in the drawings. The diameter increasing jig 35 comprises a generally cylindrical main sleeve 36. The main sleeve 36 has a generally cylindrical sleeve cap 37 screwed onto and attached to its left end. As shown in FIG. 12, the sleeve cap 37 has a circular hole 37a formed in its central portion. A movable bolt 38 is inserted into the main sleeve 36 so that its head faces toward the sleeve cap 37.

The movable bolt 38 has a female threaded hole 38a formed in a central portion of an end surface of its head so as to lie opposite the circular hole 37a when the movable bolt 38 is inserted into the main sleeve 36. The female threaded hole 38a has a female thread formed around its inner peripheral surface. The movable bolt 38 has an engagement groove 38b formed in an outer surface of its head and extending along its axis. The movable bolt 38 has a male thread 38c formed around the outer peripheral surface of its shaft portion.

With the shaft portion of the movable bolt 38 projecting from the right end of the main sleeve 36, a nut 40 is screwed onto the male thread 38c via a spacer 39 to attach the movable bolt 38 to the main sleeve 36. With the movable bolt 38 attached to the main sleeve 36, an engagement pin 41 having passed through the main sleeve 36 is set so as to engage with the engagement groove 38b in the movable bolt 38. The engagement of the engagement pin 41 regulates the rotation of the movable bolt 38 within the main sleeve 36.

A male thread 42a formed around an increased diameter shaft 42 is screwed into the female threaded hole 38a, formed in the head of the movable bolt 38 to attach the increased diameter shaft 42 to the movable bolt 38. A left end of the increased diameter shaft 42 comprises an inclined part having an outer diameter gradually increasing toward the left end surface of the increased diameter shaft 42 and a non-inclined part located at a predetermined distance from the left end surface of the increased diameter shaft 42. The non-inclined part has a fixed outer diameter. The left end of the increased diameter shaft 42 has an outer diameter slightly smaller than the inner diameter of the pipe main body 11a. When the nut 40 is screwed onto the male thread 38c of the movable bolt 38, the movable bolt 38 moves from the sleeve cap 37 toward the nut 40 within the main sleeve 36. In union with this movement, the increased diameter shaft 42 moves within the main sleeve 36. A support shaft 43 is attached to the main sleeve 36.

Now, description will be provided of a method for using the diameter increasing jig 35 to form the swollen portion 11b in the water pipe 11 to form the end structure 10 in the water pipe 11 and then connecting the water pipe 11 to the joint 33. First, the slip-out preventing sleeve 33b is installed around the pipe main body 11a. Then, the nut 40 is loosened with respect to the movable bolt 38. The movable bolt 38 is then moved until the end surface of the head of the movable bolt 38 abuts against a part of the inner surface of the main sleeve 36 which is closer to the sleeve cap 37. Then, with the cylinder 34 installed around the increased diameter shaft 42, the male thread 42a of the increased diameter shaft 42 is screwed into the female threaded hole 38a to attach the increased diameter shaft 42 to the movable bolt 38.

Subsequently, as shown in FIG. 12, the end of the pipe main body Ha is fitted around the cylinder 34 and increased diameter shaft 42. Then, with the pipe main body 11a installed around the increased diameter shaft 42, the nut 40 is screwed onto the movable bolt 38. Then, since the engagement between the engagement pin 41 and the engagement groove 38b precludes the rotation of the movable bolt 38, the movable bolt 38 is pulled into the main sleeve 36 along its axis so that the engagement groove 38b is guided by the engagement pin 41. Simultaneously with the movement of the movable bolt 38, the male thread 42a of the increased diameter shaft 42 is pulled into the female threaded hole 38a of the movable bolt 38, in other words, into the main sleeve 36. Then, the inclined part of the increased diameter shaft 42 is gradually inserted into the cylinder 34 to gradually increase the inner diameter of the cylinder 34.

Figure 13:
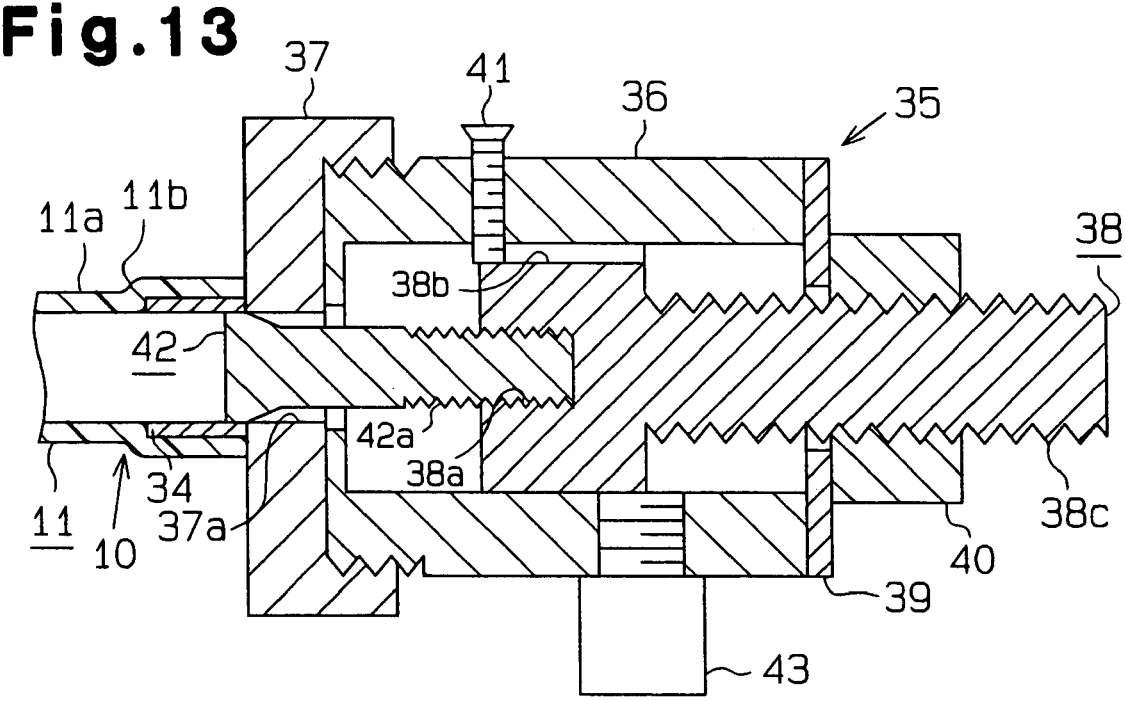
FIG. 13 is a sectional view showing that a swollen portion has been formed using the jig.

As shown in FIG. 13, the non-inclined part as the increased diameter shaft 42, having an outer diameter almost the same as the inner diameter of the pipe main body 11a, passes through the cylinder 34. Then, the inner diameter of the cylinder 34 is increased so as to be almost the same as the inner diameter of the non-increased diameter part of the pipe main body 11a. As a result, the enlarged cylinder 34 pushes the end of the pipe main body 11a radially outward. The radially outward projecting swollen portion 11b is formed on the outer peripheral surface of the pipe main body 11a.

To connect the joint 33 to the water pipe 11, the end of the pipe main body 11a at which the swollen portion 11b has been formed is inserted into the connecting cylindrical portion 33f as shown in FIG. 9. Then, the right end surface of the pipe main body 11a is abutted against the second abutting surface 33i. Further, the right end surface of the cylinder 34 is abutted against the seal member 17. Subsequently, the male thread 33g is screwed into the female thread 33d of the slip-out preventing sleeve 33b to attach the slip-out preventing sleeve 33b to the joint main body 33a. The inner hole 33c in the slip-out preventing sleeve 33b has a diameter almost the same as the outer diameter of the non-increased diameter part of the pipe main body 11a. Accordingly, the diameter of the inner hole 33c is smaller than the outer diameter of the swollen portion 11b.

The slip-out preventing sleeve 33b is attached to the joint main body 33a to form the joint 33. Further, the swollen portion 11b engages with the inner peripheral surface of the left end of the slip-out preventing sleeve 33b, operating as an engagement portion. This prevents the swollen portion 11b from slipping out of the slip-out preventing sleeve 33b. Furthermore, the water pipe 11 comprising the end structure 10 is connected to the joint 33 so as to be prevented from slipping out. Moreover, the slip-out preventing sleeve 33b presses the pipe main body 11a into the joint main body 33a. Consequently, the right end surface of the cylinder 34 is brought into pressure contact with the seal member 17 in the joint main body 33a. This serves to provide a favorable seal between the pipe main body 11a and the joint main body 33a.

The inner diameter of the cylinder 34 is increased so as to be almost the same as that of the pipe main body 11a. This substantially eliminates the flow loss of fluid flowing through the pipe main body 11a, which loss is attributed to the cylinder 34. Further, the cylinder 34 is enlarged from its inside to bring the outer peripheral surface of the cylinder 34 into pressure contact with the inner peripheral surface of the pipe main body 11a. Accordingly, the seal structure can be formed between the pipe main body 11a and the cylinder 34 to prevent fluid from leaking from between the inner peripheral surface of the pipe main body 11a and the outer peripheral surface of the cylinder 34. In other words, the seal structure can reduce the possibility of fluid leakage from between the outer peripheral surface of the pipe main body 11a and the inner peripheral surface of the joint main body 33a.

A fourth embodiment of the present invention will be described below with reference to FIGS. 14 to 17. In the present embodiment, only the configurations of the end structure 10 and joint 12 in the embodiments shown in FIGS. 1 to 5 are changed. Accordingly, the detailed description of similar components is omitted. Also in the present embodiment, the terms "upward", "downward", "right", and "left" in the description below correspond to the upper, lower, right, and left sides, respectively, of the drawings.

Figure 8:
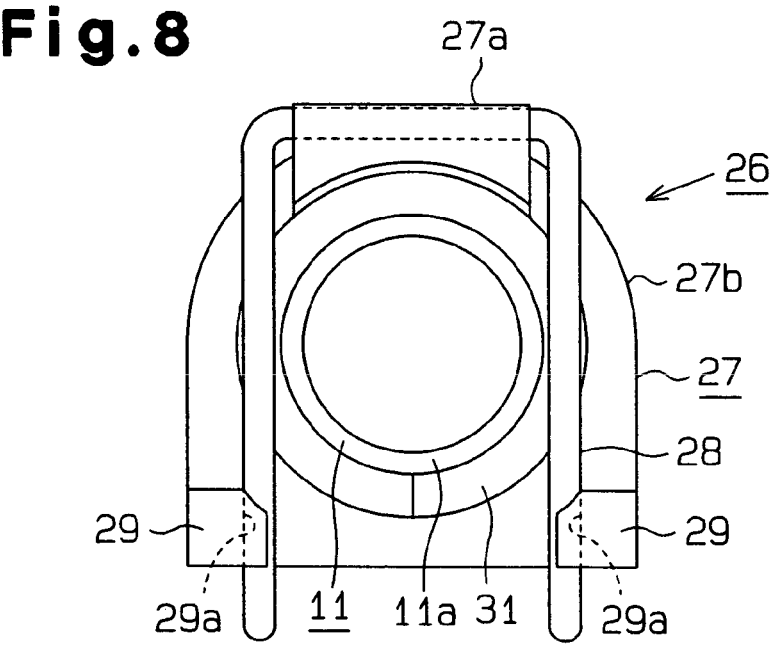
FIG. 8 is a front view showing that the water pipe has been connected to the joint in FIG. 7.
Figure 14:
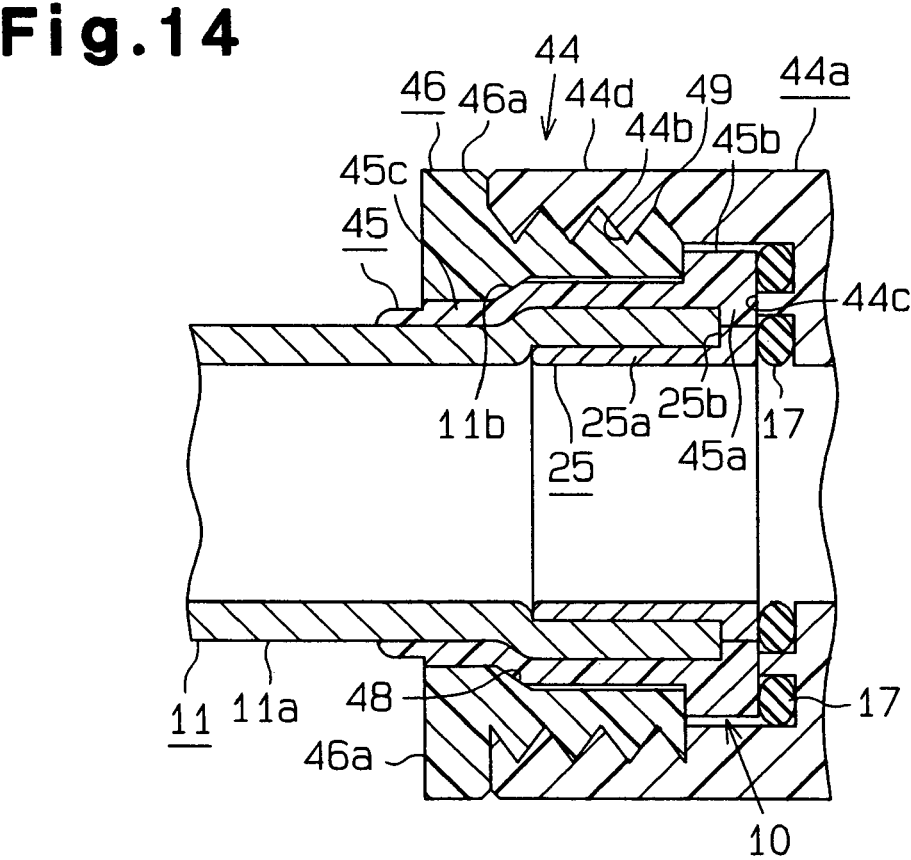
FIG. 14 is a sectional view showing how a water pipe and a joint are connected together according to a fourth embodiment of the present invention.

As shown in FIG. 14, in the end structure 10 of the water pipe 11, the inner sleeve 25, which is similar to that used in the embodiments shown in FIGS. 6 to 8, is inserted into the right end of the pipe main body 11a. The inner diameter of the inner sleeve 25 is increased to project an outer sleeve 45 radially outward which is installed around the outer peripheral surface of the pipe main body 11a. A part of the outer peripheral surface of the outer sleeve 45 which projects radially outward corresponds to the swollen portion 11b.

Figure 16:
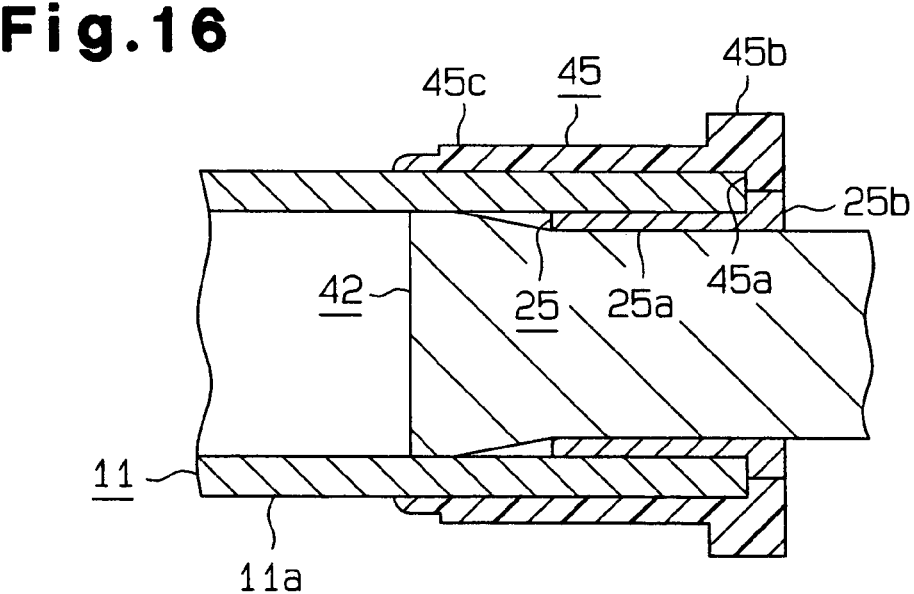
FIG. 16 is a partial sectional view showing that an inner sleeve and an outer sleeve have been installed around a pipe main body.

The generally cylindrical outer sleeve 45 is formed of a synthetic resin such as crosslinked polyethylene. The outer sleeve 45 may be formed of a soft metal such as copper. The outer sleeve 45 has an inner peripheral flange portion 45a and an outer peripheral flange portion 45a formed at a right end of its cylindrical portion 45c; the inner peripheral flange portion 45a projects inward along a circumferential direction of the outer sleeve 45 and the outer peripheral flange portion 45b projects outward along the circumferential direction of the outer sleeve 45. As shown in FIG. 16, the cylindrical portion 45c has an inner diameter slightly larger than the outer diameter of the pipe main body 11a. The inner peripheral flange portion 45a has an inner diameter smaller than the outer diameter of the pipe main body 11a.

Figure 15A:
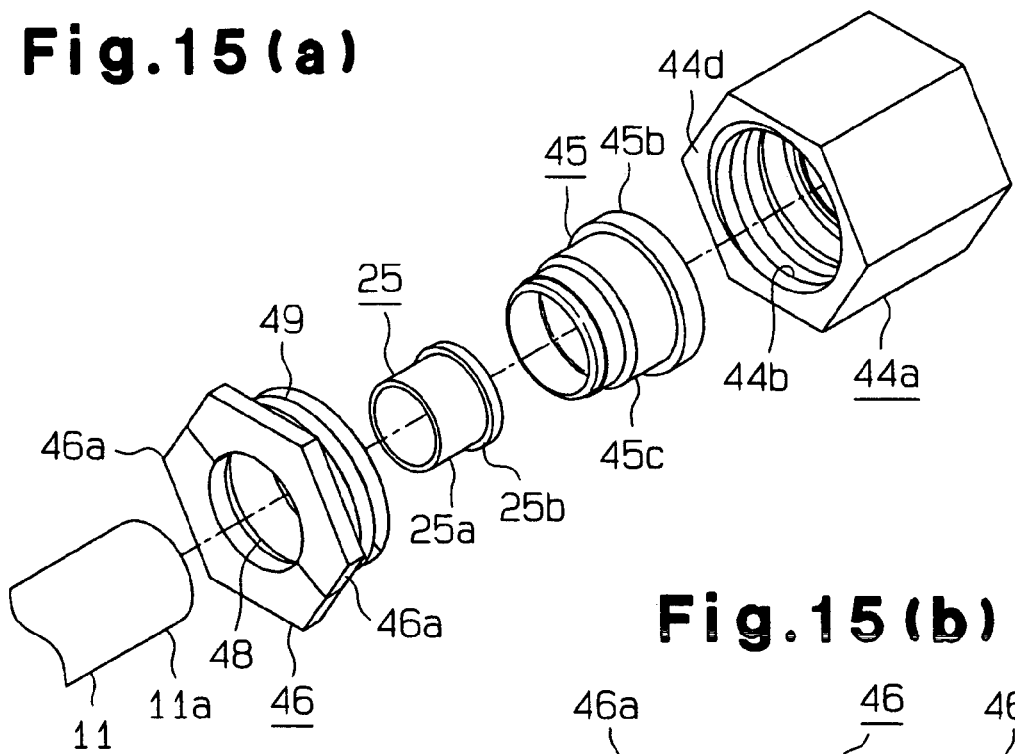
FIG. 15(a) is an exploded perspective view showing the water pipe and joint in FIG. 14.

Now, a joint 44 will be described. As shown in FIGS. 14 and 15(a), the joint 44 comprises a joint main body 44a and a slip-out preventing sleeve 46 both of which are generally cylindrical and are formed of a synthetic resin. The joint main body 44a and the slip-out preventing sleeve 46 may be formed of metal. The joint main body 44a has connecting cylindrical portions 44d which are formed at its respective ends and to which the pipe main body 11a can be connected (FIGS. 14 and 15(a) show only the left end of the joint main body 44a). As shown in FIG. 14, the joint main body 44a has a male thread 44b formed around an inner peripheral surface of its left end. An abutting portion 44c is formed close to a central portion in the joint main body 44a so as to project along a circumferential direction of the joint main body 44a. The pair of seal members 17 is installed so that the abutting portion 44c is sandwiched between the seal members 17. Only one seal member 17 may be installed around the abutting portion 44c.

Figure 15B:
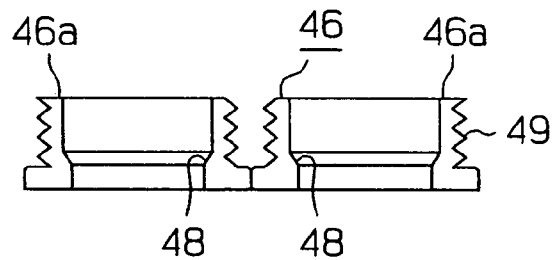
FIG. 15(b) is a front view showing a slip-out preventing sleeve.

As shown in FIG. 15(b), the slip-out preventing sleeve 46 is formed by assembling a pair of divided pieces 46a together. The divided pieces 46a are integrated together by connecting their side edges together. The divided pieces 46a can be separated from each other or assembled together around their connecting part.

The slip-out preventing sleeve 46 has an engagement step portion 48 formed along its circumferential direction as an engagement portion. When the slip-out preventing sleeve 46 is installed around the outer peripheral surface of the pipe main body 11a, the engagement step portion 48 engages with the swollen portion 11b. The slip-out preventing sleeve 46 has a male thread 49 formed around its outer peripheral surface and which can be screwed into the female thread 44b of the joint main body 44a. With the slip-out preventing sleeve 46 attached to the joint main body 44a, the engagement step portion 48 engages with the swollen portion 11b.

Now, description will be given of a method for using a diameter increasing jig 35, shown in FIG. 11, to form the swollen portion 11b in the water pipe 11 and then connecting the water pipe 11 to the joint 44. First, the inner sleeve 25 is installed around the increased diameter shaft 42. Then, the diameter increasing jig 35 is attached to the increased diameter shaft 42. Subsequently, as shown in FIG. 16, the outer sleeve 45 is installed outside the end of the pipe main body 11a to engage the inner peripheral flange portion 45a with the end surface of the pipe main body 11a.

Moreover, the pipe main body 11a is fitted around the increased diameter shaft 42 around which the inner sleeve 25 has been installed, to engage the end surface of the pipe main body 11a with the engagement flange portion 25b and insert the inner portion 25a of the inner sleeve 25 into the pipe main body 11a. At this time, the outer end surface of the engagement flange portion 25b is flush with the outer end surfaces of the inner peripheral flange portion 45a and outer peripheral flange portion 45b.

Figure 11:
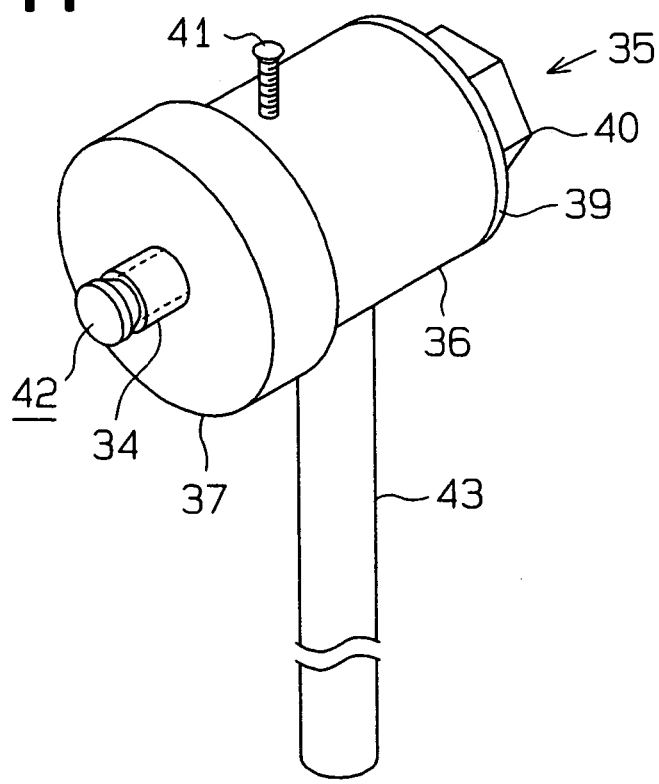
FIG. 11 is a perspective view showing jig.
Figure 12:
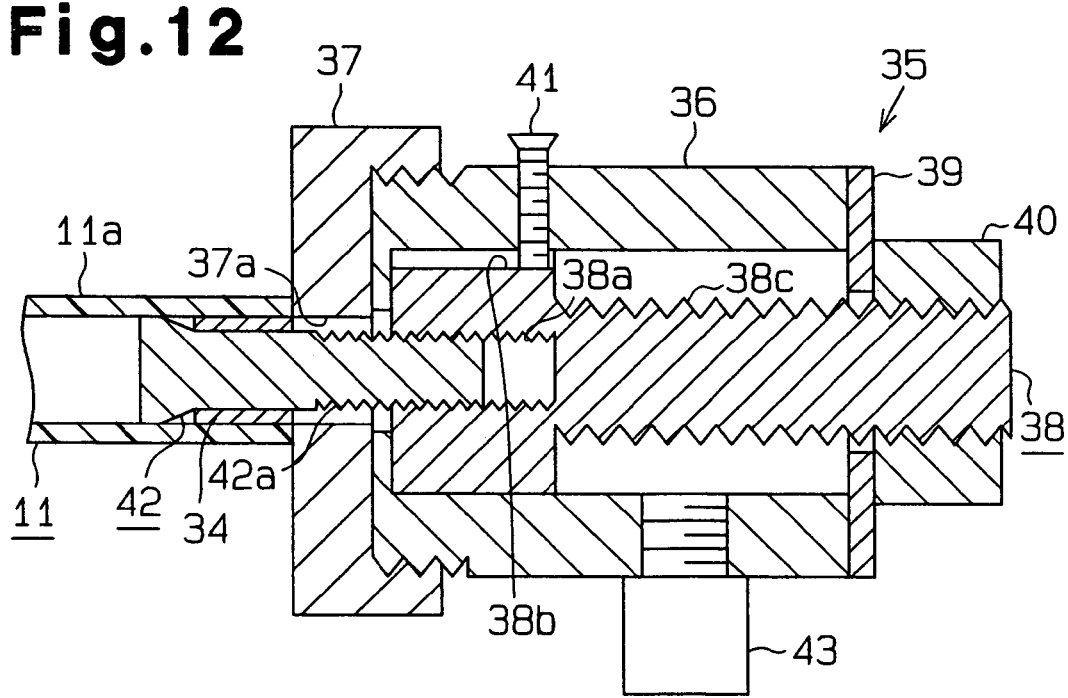
FIG. 12 is a sectional view showing that a cylinder and a pipe main body have been installed in the jig.
Figure 17:
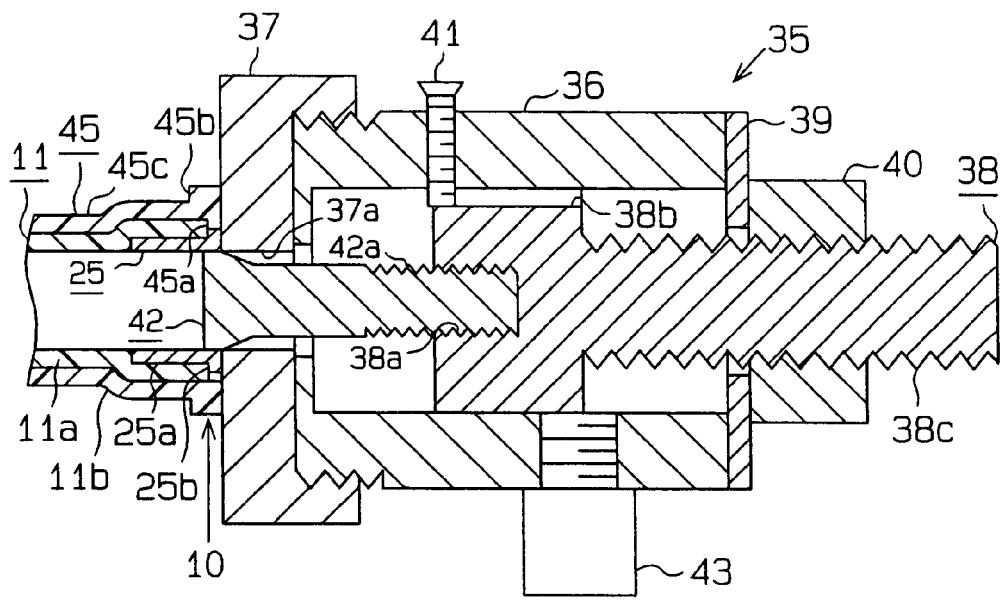
FIG. 17 is a sectional view showing that the pipe main body has its diameter increased using the jig.

Subsequently, the diameter increasing jig 35, shown in FIG. 11, is used to increase the diameter of the end of the pipe main body 11a. Then, as shown in FIG. 17, the increased diameter shaft 42 increases the outer diameter of the inner sleeve 25 and thus increases the outer diameter of the outer sleeve 45 via the end of the pipe main body 11a.

This forms an enlarged part of the outer sleeve 45, that is, the swollen portion 11b, and thus a water pipe 11 having the end structure 10 comprising the swollen portion 11b. The inner diameter of the inner sleeve 25 is the same as that of the non-increased diameter part of the pipe main body 11a.

Then, as shown in FIG. 14, the pair of divided pieces 46a is assembled to the outer peripheral surface of the pipe main body 11a to attach the slip-out preventing sleeve 46 to the pipe main body 11a. Then, the end of the pipe main body 11a at which the end structure 10 has been formed is inserted into the connecting cylindrical portion 44d. Moreover, the male thread 49 of the slip-out preventing sleeve 46 is screwed into the female thread 44b of the joint main body 44a to form the joint 44.

In FIG. 14, the right end surface of the slip-out preventing sleeve 46 abuts against the outer peripheral flange portion 45b of the outer sleeve 45. Further, the outer peripheral flange portion 45b is sandwiched between the slip-out preventing sleeve 46 and the abutting portion 44c to position the outer sleeve 45 in the joint main body 44a. At this time, the swollen portion 11b is engaged with the engagement stage portion 48 of the slip-out preventing sleeve 46. As a result, the slip-out preventing sleeve 46 comprising the engagement step portion 48 engaged with the swollen portion 11b is attached to the joint main body 44a. This prevents the pipe main body 11a from slipping out of the joint main body 44a. That is, the water pipe 11 comprising the end structure 10 is connected to the joint 44 so as not to slip out of the joint 44.

If fluid should leak from between the radially inner seal member 17 and the abutting portion 44c or from between the outer peripheral surface of the inner sleeve 25 and the inner peripheral surface of the pipe main body 11a, the radially outer seal member 17 provides a seal between the inner surface of the joint main body 44a and the outer surface of the outer sleeve 45.

Contraction of the crosslinked polyethylene reduces the inner diameter of the outer sleeve 45 to bring the outer sleeve 45 into pressure contact with the outer peripheral surface of the pipe main body 11a. This provides a favorable seal between the pipe main body 11a and both the inner sleeve 25 and outer sleeve 45. It is thus possible to reduce the leakage of fluid from between the pipe main body 11a and the joint main body 33a. Further, the end surfaces of the outer peripheral flange portion 45b and engagement flange portion 25b are brought into pressure contact with the corresponding seal members 17. Thus, if a fluid should leak from between the outer peripheral flange portion 45b and the engagement flange portion 25b, the seal member 17 located radially outside the joint main body 44a, is able to inhibit fluid from leaking to between the inner peripheral surface of the joint main body 44a and the outer peripheral surface of the outer sleeve 45. That is, a favorable seal is provided between the pipe main body 11a and the joint main body 44a.

A fifth embodiment of the present invention will be described below with reference to FIGS. 18 to 19(b). In the present embodiment, only the configurations of the end structure 10 and joint 33 in the embodiments shown in FIGS. 9 to 13 are changed. Accordingly, the detailed description of similar components is omitted. Also in the present embodiment, the terms "upward", "downward", "right", and "left" in the description below correspond to the upper, lower, right, and left sides, respectively, of the drawings.

Figure 18:
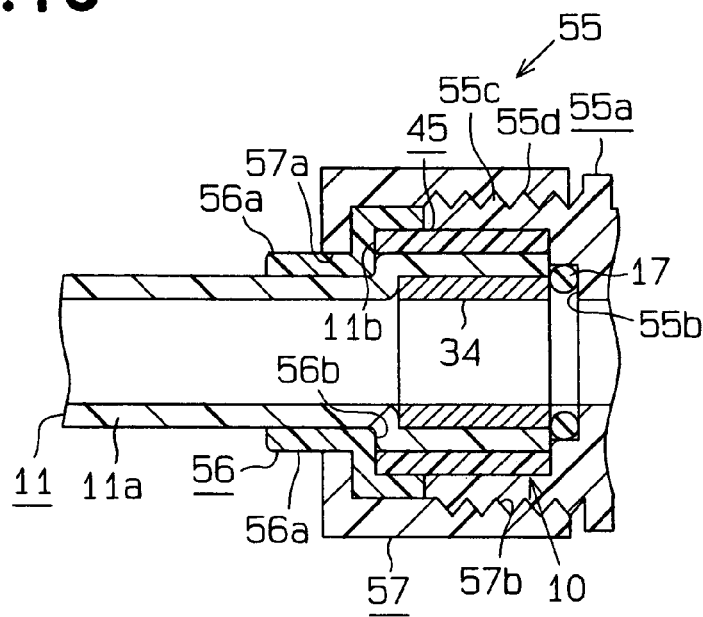
FIG. 18 is a sectional view showing how a water pipe and a joint are connected together according to a fifth embodiment of the present invention.

As shown in FIG. 18, in the end structure 10 of the water pipe 11, the inner diameter of the cylinder 34 inserted into the end of the pipe main body 11a is increased from the inside of the cylinder 34. Thus, the outer sleeve 45 installed around the outer peripheral surface of the pipe main body 11a projects radially outward to form the swollen portion 11b. The inner peripheral flange portion 45a and outer peripheral flange portion 45b of the outer sleeve 45, shown in FIG. 14, are omitted from the outer sleeve 45 in the present embodiment.

Figure 19A:
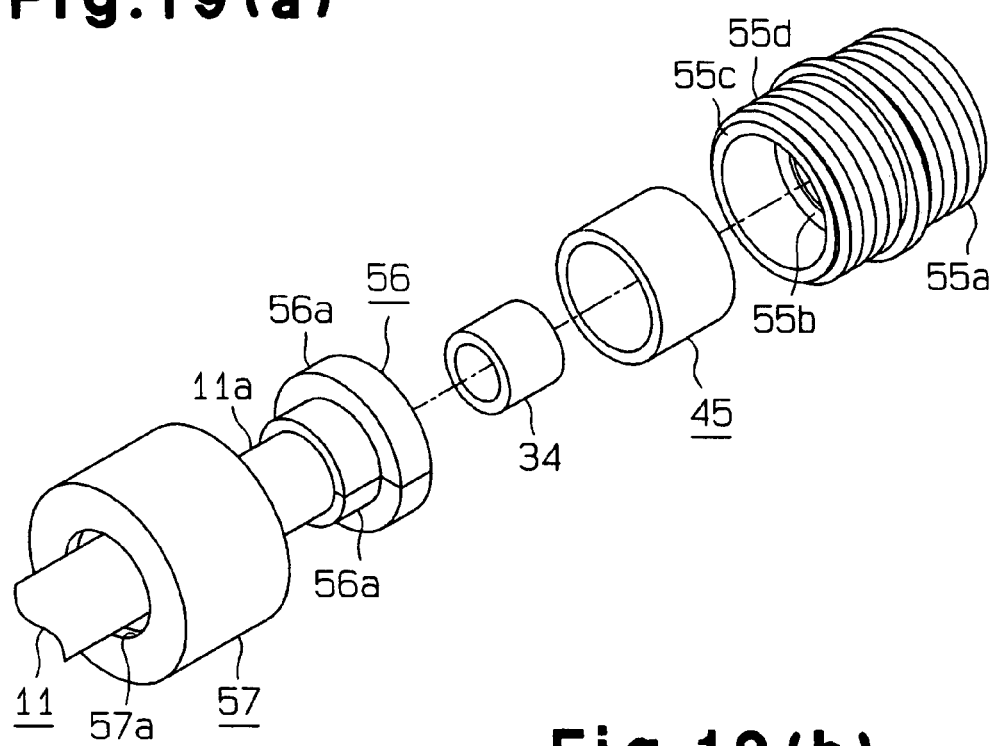
FIG. 19(a) is an exploded perspective view showing the water pipe and joint in FIG. 18.

As shown in FIGS. 18 and 19(a), a joint 55 comprises a joint main body 55a, an engagement sleeve 57, and a fixed sleeve 47 all of which are generally cylindrical and are formed of a synthetic resin. The joint main body 55a, the engagement sleeve 56, and the fixed sleeve 57 may be formed of metal. The joint main body 55a has connecting cylindrical portions 55c formed at its respective ends and to which the pipe main body 11a is connected. The right end (not shown) of the joint main body 55a is formed so as to be connectible to a pipe (not shown). Each connecting cylindrical portion 55c has a male thread 55d formed around its outer peripheral surface. An annular abutting surface 55b is formed inside the joint main body 55a. The seal member 17 is installed around the abutting surface 55b. As shown in FIG. 19(a), the engagement sleeve 56, provided on the connecting cylindrical portion 55c as an engaged piece, is generally cylindrical. As shown in FIG. 19(b), the engagement sleeve 56 is formed by assembling the divided pieces 56a of the pair together.

Divided pieces 56a are integrated together by connecting their side edges together. The divided pieces 56a can be separated from each other or assembled together around their connected part. As shown in FIG. 18, the right end of the engagement sleeve 56 has inner and outer diameters larger than those of its left end. The engagement sleeve 56 is formed with an inner engagement surface 56b as an engagement portion with which the swollen portion 11b can be engaged. The whole engagement sleeve 56 except for the engagement surface 56b has an inner diameter slightly larger than the outer diameter of the pipe main body 11a.

The fixed sleeve 57 is screwed onto and attached to the connecting cylindrical portion 55c as an attachment. The fixed sleeve 57 is generally cylindrical. The fixed sleeve 57 has an inner hole 57a formed at its left end and having a diameter slightly larger than the outer diameter of the left end of the engagement sleeve 56. Moreover, the fixed sleeve 57 has a female thread 57b formed around the inner peripheral surface of its right end and which can be screwed onto the male thread 55d of the joint main body 55a.

Now, description will be provided of a method for using the diameter increasing jig 35, shown in FIG. 11, to form the swollen portion 11b in the water pipe 11 and then connecting the water pipe 11 to the joint 55. First, the fixed sleeve 57 is installed around the pipe main body 11a. Subsequently, the cylinder 34 is installed around the increased diameter shaft 42. The increased diameter shaft 42 is then attached to the diameter increasing jig 35. Then, the outer sleeve 45 is installed on the outer peripheral surface of the end of the pipe main body 11a. The pipe main body 11a is externally fitted around the cylinder 34 of the increased diameter shaft 42 attached to the diameter increasing jig 35. Subsequently, the diameter increasing jig 35 is used to increase the diameter of the cylinder 34 so that the inner diameter of the cylinder 34 is almost the same as that of the non-increased diameter part of the pipe main body 11a. As a result, the outer diameter of the outer sleeve 45 is increased via the end of the pipe main body 11a to form the swollen portion 11b.

Then, the water pipe 11 is formed which has the end structure 10 comprising the swollen portion 11b at the end of the pipe main body 11a.

To connect the water pipe 11 described above to the joint 55, the pair of divided pieces 56a is first attached to the outer peripheral surface of the pipe main body 11a to attach the engagement sleeve 56 to the pipe main body 11a as shown in FIG. 19(a). Then, as shown in FIG. 18, the end of the pipe main body 11a is inserted into the connecting cylindrical portion 55c. Moreover, the female thread 57b of the fixed sleeve 57 is screwed onto the male thread 55d of the joint main body 55a.

The inner peripheral edge of the fixed sleeve 57 engages with the outer peripheral surface of the engagement sleeve 56 to move the engagement sleeve 56 inward of the joint main body 55a. Moreover, the right end surface of the engagement sleeve 56 abuts against the left end surface of the joint main body 55a. As a result, the engagement sleeve 56 is sandwiched between the joint main body 55a and the fixed sleeve 57. Consequently, a joint 55 is formed in which the swollen portion 11b is engaged with the engagement surface 56b of the engagement sleeve 56.

Since the swollen portion 11b engages with the engagement sleeve 56 positioned in the joint 55, the water pipe 11 is connected to the joint 55 so as not to slip out of it. Moreover, the right end surface of the pipe main body 11a is brought into pressure contact with the seal member 17. This provides a favorable seal between the pipe main body 11a and the joint main body 55a.

A sixth embodiment of the present invention will be described below with reference to FIGS. 20 to 24. A formation member 111 according to the present embodiment is obtained by partly changing the configuration of the formation member 21 for forming the end structure 10 in the water pipe 11 according to the embodiments shown in FIGS. 1 to 5. The other part of the configuration of the present embodiment is the same as that of the embodiments shown in FIGS. 1 to 5. Accordingly, description of the same components is omitted. Also in the present embodiment, the terms "upward", "downward", "right", and "left" in the description below correspond to the upper, lower, right, and left sides, respectively, of the drawings.

Figure 20:
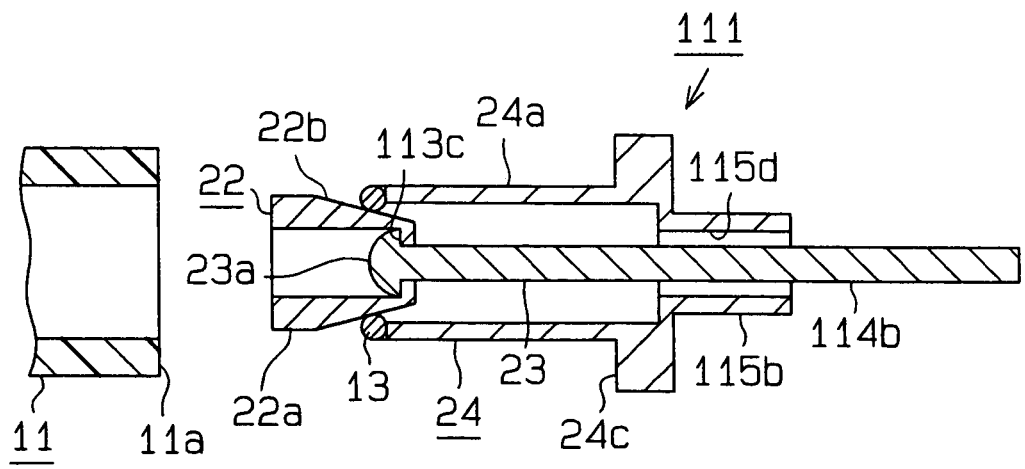
FIG. 20 is a sectional view showing a water pipe and a formation member according to a sixth embodiment.
Figure 21:
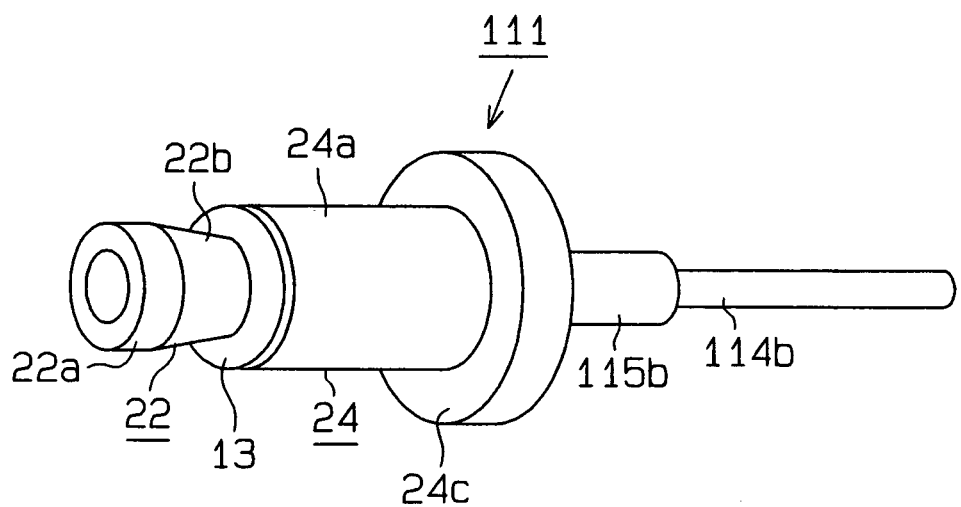
FIG. 21 is a perspective view showing the formation member in FIG. 20.

As shown in FIG. 20, the pullout piece 22 provided in the formation member 111 comprises a small diameter portion 22b having an outer diameter gradually decreasing away from the increased diameter portion 22a, that is, toward the right of the pullout piece 22. The pullout piece 22 has a locking edge 113c formed at the inner peripheral edge of its right end so as to project inward the along its radial direction.

The pullout pin 23 comprises a shaft portion 114b extending from the head 23a as a projecting portion. The shaft portion 114b has concavities and convexities (not shown) formed around its outer peripheral surface along its circumferential direction.

The inserted piece 24 comprises an insertion support portion 115b extending parallel with it from its support portion 24c along its axial direction. The insertion support portion 115b has outer and inner diameters smaller than those of the cylindrical portion 24a. The insertion support portion 115b is internally formed with a through-hole 115d in communication with the interior of the inserted piece 24. The through-hole 115d extends parallel with the axis of the insertion support portion 115b. The shaft portion 114b of the pullout pin 23 inserted into the cylindrical portion 24a is inserted into the through-hole 115d. The insertion support portion 115b supports the shaft portion 114b of the pullout pin 23 along the axis of the cylindrical portion 24a.

Figure 22:
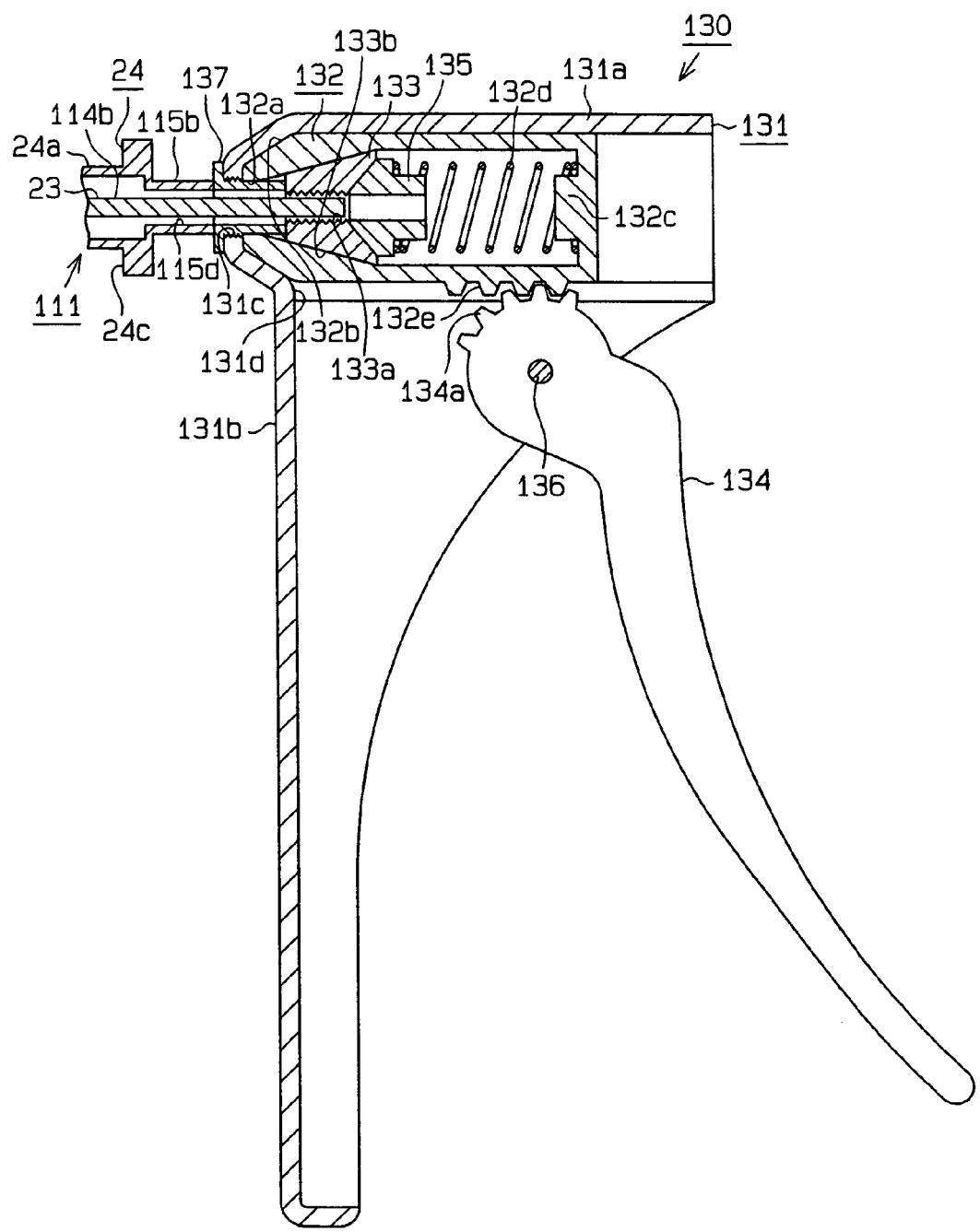
FIG. 22 is a sectional view showing a pullout tool.

Now, with reference to FIG. 22, description will be provided of a pullout tool 130 operating as a means for pulling out the pullout piece 22. The pullout tool 130 comprises a metal tool main body 131. The tool main body 131 is provided with a moving body 132 inside its upper end which can move rightward and leftward in the tool main body 131. A holding member 133 that can hold the shaft portion 114b is disposed in the moving body 132. The tool main body 131 is internally provided with a lever 134 that moves the moving body 132 deep into the tool main body 131.

The tool main body 131, having an L-shaped cross section, comprises a generally cylindrical accommodation portion 131a provided at its upper end and a fixed handle 131b extending downward from the accommodation portion 131a and having a generally C-shaped cross section. The moving body 132 is accommodated inside the accommodation portion 131a so as to be movable in a lateral direction of the accommodation portion 131a. The left end of the accommodation portion 131a is tapered so that its inner and outer diameters decrease toward its left end. The accommodation portion 131a has a through-hole 131c formed at its left end. A generally cylindrical mouthpiece 137 is screwed into the inner periphery of the through-hole 131c. The mouthpiece 137 is installed in the accommodation portion 131a so as to reach the interior of the accommodation portion 131a. The mouthpiece 137 is formed so that the shaft portion 114b can be inserted through the mouthpiece 137. The accommodation portion 131a has a slot 131d formed in its lower end surface along its longitudinal direction.

The moving body 132 is shaped like a bottomed cylinder. The moving body 132 has an accommodation hole 132a formed at its left end and having a size allowing the mouthpiece 137 to be inserted into the hole 132a. A left end of the moving body 132 is formed so that the inner and outer diameters of the moving body 132 incline toward the left end of the moving body 132. The moving body 132 is formed with a reduced diameter surface 132b constituting an inner peripheral surface of its left end. The moving body 132 has a fixed projection 132c projected from its inner bottom surface. The right end of a coil spring 132d is fixed to the fixed projection 132c. The right end of a generally cylindrical metal push-out member 135 is attached to the left end of the coil spring 132d.

A holding member 133 is disposed in the moving body 132 between the inner peripheral surface of the left end of the moving body 132 and the push-out member 135. The coil spring 132d always urges the holding member 133 toward the left end of the moving body 132 via the push-out member 135. The holding member 133 is formed to be generally cylindrical by assembling two generally half-cylindrical metal divided pieces together. A holding hole 133a is formed in the holding member 133. The shaft portion 114b of the pullout pin 23 having passed through the mouthpiece 137 is inserted into the holding hole 133a.

The holding member 133 is formed with a tapered surface 133b constituting an inner peripheral surface and having inner and outer diameters gradually decreasing from the right end to the left end of the holding member 133. The holding member 133 has concavities and convexities which are formed around its inner peripheral surface and which can be engaged with the convexities and concavities of the shaft portion 114b. When the mouthpiece 137 is not inserted into the moving body 132, the coil spring 132d urges the holding member 133 toward the left end of the moving body 132.

Further, the reduced diameter surface 132d of the moving body 132 causes a tightening force to be exerted to close the holding hole 133a. On the other hand, when screwed into the through-hole 131c, the mouthpiece 137 presses the holding member 133 into the accommodation portion 131a against the urging force of the coil spring 132d. This releases the tightening of the holding member 133 carried out by the reduced diameter surface 132b. Thus, the outer diameter of the holding member 133 is increased to keep the holding hole 133a open.

The moving body 132 has a gear portion 132e formed on the outer surface of its lower end and extending along its longitudinal direction. The gear portion 132e is exposed from the slot 131d in the accommodation portion 131a so as to project out from the accommodation portion 131a. A lever 134 is disposed in the fixed handle 131b to move the moving body 132. The upper end of the lever 134 is attached to the fixed handle 131b using a shaft member 136 extended between opposite side walls of the fixed handle 131b. The lever 134 is rotatively movable around the shaft portion 136 relative to the fixed handle 131b. A spring member (not shown) is provided between the lever 134 and the fixed handle 131b. The spring member urges the lever 134 away from the fixed handle 131b. An upper end of the lever 134 is generally circular and has a plurality of meshing blade portions 134a which are formed on its outer peripheral surface and which can be meshed with the gear portion 132e. With the lever 134 attached to the fixed handle 131b, the meshing blade portions 134a mesh with the gear portion 132e.

When the lever 134 is rotatively moved toward the fixed handle 131b, the meshing between the meshing blade portions 134a and the gear portion 132e causes the moving body 132 to be moved deep into the accommodation portion 131a, that is, away from the through-hole 131c. On the other hand, when the rotative movement of the lever 134 toward the fixed handle 131b is released, the spring member rotatively moves the lever 134 away from the fixed handle 131b. Then, the meshing between the meshing blade portion 134a and the gear portion 132e causes the moving body 132 to be moved toward the through-hole 131c in the accommodation portion 131a.

Now, description will be provided of a method for using the formation member 111 to form the end structure 10 in the water pipe 11 and then connecting the water pipe 11 to the joint 12 via the end structure 10. The configurations of the water pipe 11 and joint 12 are the same as those shown in FIG. 1. The connection method will be described with reference to FIGS. 1 and 2(b).

Figure 23:
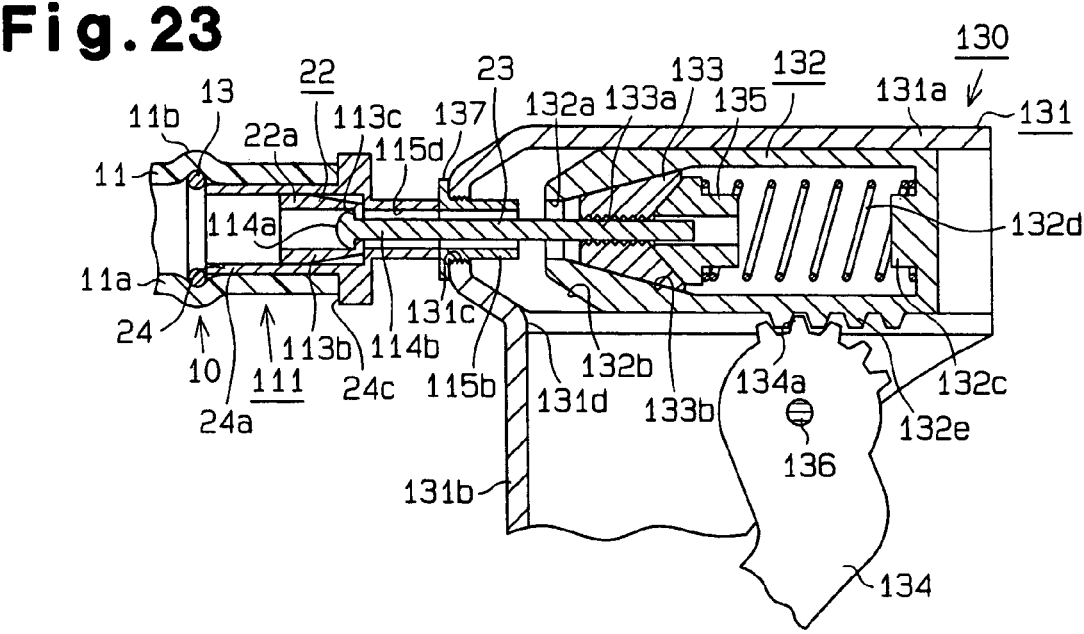
FIG. 23 is a sectional view showing that an end structure has been formed using a formation member.

First, as shown in FIG. 22, in the tool main body 131 in which the mouthpiece 137 has been screwed into the through-hole 131c, the shaft portion 114b of the pullout pin 23 is inserted into the holding hole 133a through the mouthpiece 137. Thus, the end surface of the insertion support portion 115b of the inserted piece 24 is abutted against the mouthpiece 137. Subsequently, as shown in FIG. 23, the lever 134 is rotatively moved toward the fixed handle 131b to move the moving body 132 away from the through-hole 131c, that is, toward the right edge of FIG. 22. As the moving body 132 moves, the tapered surface 133b of the holding member 133 slides in contact with the reduced diameter surface 132b of the moving body 132. Thus, the outer diameter of the holding member 133 decreases gradually. The decrease in the outer diameter of the holding member 133 causes the shaft portion 114b inserted into the holding hole 133a to be held in the holding hole 133a.

Consequently, the pullout piece 22 is installed in the tool main body 131. At this time, the concavities and convexities of the shaft portion 114b engage with the convexities and concavities of the inner peripheral surface of the holding hole 133a. As a result, the shaft portion 114b is firmly held in the holding member 133.

The water pipe 11 is mounted on the formation member so that the cylindrical portion 24a, the pullout piece 22, and the ring piece 13 are inserted into the pipe main body 11a. Thus, the right end surface of the pipe main body 11a is abutted against the support portion 24c. At this time, the small diameter portion 22b of the pullout piece 22 is disposed inside the ring piece 13. Further, the end surface of the pipe main body 11a abuts against the support portion 24c to place the ring piece 13 in position within the pipe main body 11a. Moreover, since the ring piece 13 is bonded to the cylindrical portion 24a and supported by the inserted piece 24, the ring piece 13 is inserted into the pipe main body Ha by inserting the cylindrical portion 24a into the pipe main body 11a.

With the shaft portion 114b held by the holding member 133, the lever 134 is further rotatively moved toward the fixed handle 131b to move the moving body 132 deep into the accommodation portion 131a. Then, the outer peripheral surface of the holding member 133 is locked on the inner peripheral surface of the accommodation hole 132a of the moving body 132. Owing to this locking, as the moving body 132 moves, the holding member 133 is moved deep into the accommodation portion 131a while holding the shaft portion 114b. Then, the pullout pin 23 is pulled away from the pipe main body 11a.

Then, the movement of the pullout pin 23 causes the head 23a to be locked on the locking edge 113c. Thus, the pullout piece 22 is pulled deep into the cylindrical portion 24a. Since the outer diameter of the outer peripheral surface of the pullout piece 22 increases gradually toward its left end, the outer diameter of the pullout piece 22 passing through the opening end of the cylindrical portion 24a increases gradually as the pullout piece 22 is pulled into the cylindrical portion 24a. As a result, the outer diameter of the pullout piece 22 which contacts the inner peripheral surface of the ring piece 13 increases gradually to increase the inner diameter of the ring piece 13.

Finally, upon passing through the ring piece 13, the increased diameter portion 22a enlarges the ring piece 13 so that the inner diameter of the ring piece 13 is almost the same as the outer diameter of the increased diameter portion 22a. Since the outer diameter of the increased diameter portion 22a is formed to be slightly smaller than the inner diameter of the pipe main body 11a, the inner diameter of the enlarged ring piece 13 becomes almost the same as the inner diameter of the part of the pipe main body 11a which has not been enlarged. Further, the diameter of the ring piece 13 is increased to push the right end of the pipe main body 11a open outward along the circumferential direction. The swollen portion 10b is formed in the pushed-open part.

Figure 24:
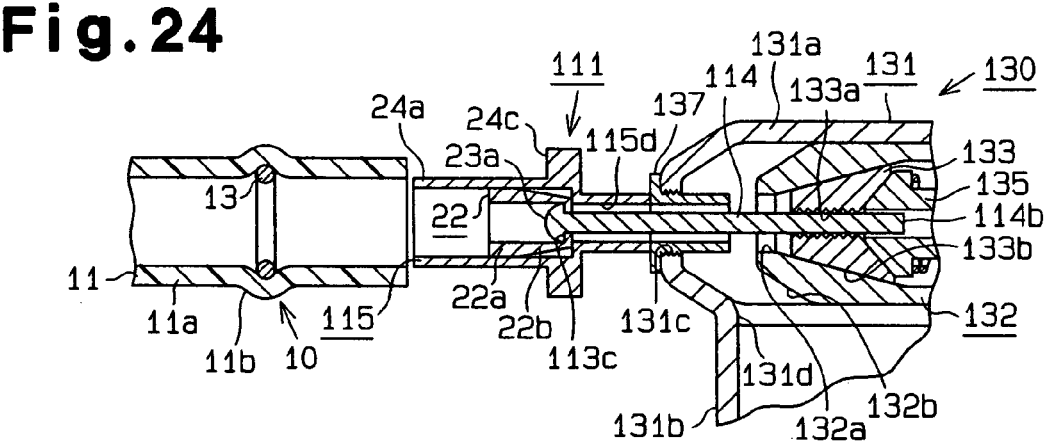
FIG. 24 is a sectional view showing that the formation member has been pulled out of the water pipe.

As shown in FIG. 24, after the whole pullout piece 22 has passed through the ring piece 13, the pullout tool 130 as a whole is moved away from the pipe main body 11a. Once the pullout piece 22 moves into the cylindrical portion 24a, the pullout piece 22 is moved deep into the cylindrical portion 24a while being guided by the inner peripheral surface of the cylindrical portion 24a. This is because the outer diameter of the increased diameter portion 22a is slightly smaller than the inner diameter of the cylindrical portion 24a. Then, the right end surface of the pullout piece 22 abuts against the inner bottom surface of the cylindrical portion 24a. Moreover, the pullout piece 22 pulls the inserted piece 24 away from the pipe main body 11a.

Then, since the ring piece 13 with its diameter increased has cut into the inner peripheral surface of the pipe main body 11a, the ring piece 13 is separated from the inserted piece 24 when the inserted piece 24 is pulled. Then, only the inserted piece 24 is pulled out of the pipe main body 11a. As a result, only the ring piece 13 remains in the pipe main body 11a to form the swollen portion 10b in the pipe main body 11a. Moreover, the inner diameter of the ring piece 13 becomes almost the same of the inner diameter of the part of the pipe main body 11a which has not been enlarged. This makes it possible to reduce flow loss caused by the ring piece 13. Then, the formation member 111 is formed which comprises the swollen portion 10b and the end structure 10 capable of reducing flow loss.

Once the end structure 10 has been formed, when the lever 134 is returned to its original state, the moving body 132 moves to the through-hole 131c in the accommodation portion 131a. Then, while the holding member 133 is holding the shaft portion 114b, the moving body 132 moves toward the left end of the accommodation portion 131a. Then, the left end surface of the holding member 133 abuts against the end surface of the mouthpiece 137 to inhibit further movement of the holding member 133. Since the reduced diameter surface 132b is gradually enlarged toward the right end of the moving body 132, as the moving body 132 moves, the reduced diameter surface 132b stops exerting tightening force. Accordingly, the outer diameter of the holding member 133 increases gradually. Then, the holding of the shaft portion 114b in the holding member 133 is released. Once the rotative movement of the lever 134 is ended, the left end surface of the moving body 132 abuts against the inner peripheral surface of the left end of the accommodation portion 131a. Thus, the initial state is recovered. On this occasion, since the holding of the shaft portion 114b in the holding hole 133a has been released, the shaft portion 114b is pulled out of the accommodation portion 131a. Thus, the pullout tool 130 is removed from the formation member 111.

In addition to the advantages of the embodiments shown in FIGS. 1 to 5, the present embodiment provides the following advantages.

The ring piece 13 is formed of metal. Thus, after being enlarged, the ring piece 13 is not contracted. Accordingly, operations can be continuously performed on the joint 12 and water pipe 11 without considering a decrease in the inner diameter of the end structure 10. Consequently, compared to the prior art, in which the end of the pipe main body 11a must be installed in the connecting cylindrical portion while maintaining its increased inner diameter, the present embodiment does not require hasty performance of a connecting operation for the water pipe 11. Therefore, ample time is available for performing the operation of connecting the water pipe 11 and the joint 12 together; the operation can also be easily performed.

The ring piece 13 is pre-assembled to the pullout piece 22. Accordingly, the end structure 10 can be formed promptly and easily compared to the assembly of the ring piece 13 to the pullout piece 22 in the site where the end structure 10 is to be formed.

The small diameter portion 22b of the pullout piece 22 is disposed inside the ring piece 13. Thus, the end structure 10 can be formed in the water pipe 11 simply by passing the pullout piece 22 through the ring piece 13. Furthermore, the ring piece 13 can be installed around the pullout piece 22. The pullout piece 22 and the ring piece 13 can be integrated together.

The small diameter portion 22b of the pullout piece 22 enables the inner diameter of the ring piece 13 to be gradually increased. Accordingly, compared to the case where the diameter of the ring piece 13 is increased all at once by passing the increased diameter portion 22a directly through the ring piece 13, the diameter of the ring piece 13 can be gradually increased using a weaker force.

The small diameter portion 22b of the pullout piece 22 allows the outer peripheral surface of the pullout piece 22 to be formed like a step. This prevents the increased diameter portion 22a from being disadvantageously locked on the inner peripheral edge of the ring piece 13. It is thus possible to smoothly perform an operation for pulling out the pullout piece 22.

The pullout piece 22 comprises the pullout pin 23, having the shaft portion 114b. The shaft portion 114b projects from the pipe main body 11a. Thus, by pulling the shaft portion 114b, it is possible to easily pull the pullout piece 22 out of the pipe main body 10a. Further, the end structure 10 can be easily formed in the water pipe 11.

The formation member 111 comprises the pullout tool 130. The pullout tool 130 can be used to easily pull the pullout pin 23 out of the pipe main body 11a. Accordingly, the inner diameter of the ring piece 13 can be easily increased. Therefore, it is possible to easily perform an operation for forming the end structure 10 in the water pipe 11.

By abutting the end surface of the pipe main body 11a against the support portion 24c, it is possible to position the cylindrical portion 24a in the pipe main body 11a. The ring piece 13 can also be positioned in the pipe main body 11a. Consequently, during an operation for increasing the diameter of the ring piece 13, it is possible to prevent the ring piece 13 from disadvantageously moving within the pipe main body Ha or falling from the pipe main body 11a. Furthermore, the swollen portion 10b can be precisely formed at a predetermined position.

The ring piece 13 is integrally pre-supported by the cylindrical portion 24a by being bonded to its end surface. Accordingly, by inserting the cylindrical portion 24a into the pipe main body 11a, it is possible to easily perform an operation for inserting and placing the ring piece 13 in the pipe main body 11a.

After the swollen portion 10b has been formed in the pipe main body 11a using the formation member 111, the inserted piece 24 is removed from the pipe main body 11a. Accordingly, with the water pipe 11 connected to the joint 12, it is possible to substantially eliminate flow loss from a fluid flowing through the water pipe 11.

The formation member 111 according to the present embodiment comprises the inserted piece 24. Specifically, the outer peripheral surface of the pullout piece 22 comes into contact with the vicinity of the opening end of the cylindrical portion 24a. Thus, the insertion support portion 115b supports the shaft portion 114b of the pullout pin 23. Consequently, the pullout piece 22 and the inserted piece 24 are assembled together. Therefore, compared to, for example, a formation member formed of the pullout piece 22 and the ring piece 13, the present formation member can be more easily used.

The ring piece 13 is disposed between the inserted piece 24 and the pullout piece 22. Accordingly, when the pullout piece 22 is pulled out, it is possible to almost simultaneously perform the function of the inserted piece 24 to support the ring piece 13 and the function to increase the diameter of the pullout piece 22.

Figure 25:
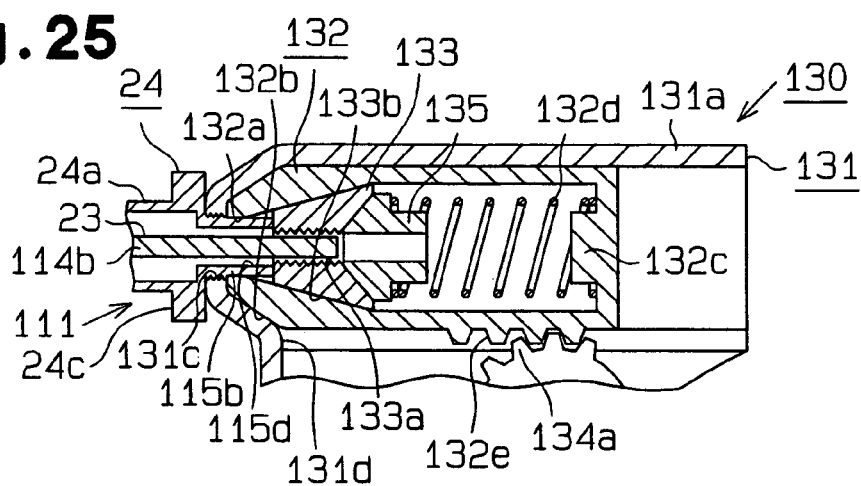
FIG. 25 is a partial sectional view showing that the formation member and the pullout tool have been integrated together.

Further, as shown in FIG. 25, the thread portion is formed around the outer peripheral surface of the insertion support portion 115b. The insertion support portion 115b is screwed into the inner peripheral surface of the through-hole 131c in the tool main body 131 while being inserted through the moving body 132. The formation member 111 may be constructed by integrating the inserted piece 24 with the tool main body 131 and inserting the pullout piece 22 through the inserted piece 24. Alternatively, the ring piece 13 may be assembled to and integrated with the pullout piece 22.

A seventh embodiment of the present invention will be described below with reference to FIGS. 26 and 27. In the present embodiment, only the configurations of the ring piece 13 and inserted piece 24 in the embodiments shown in FIGS. 20 to 25 are changed. Accordingly, the detailed description of similar components is omitted. Also in the present embodiment, the terms "upward", "downward", "right", and "left" of the formation member 211 in the description below correspond to the upper, lower, right, and left sides, respectively, of the drawings.

Figure 26:
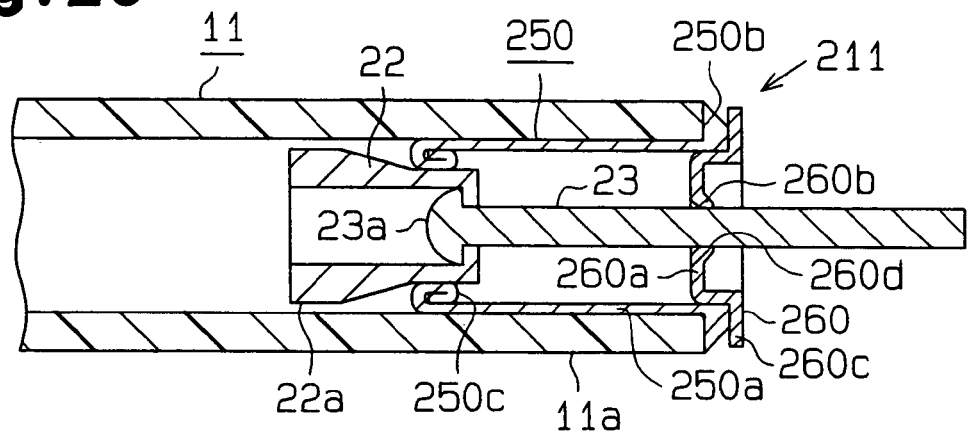
FIG. 26 is a sectional view showing a formation member according to a seventh embodiment.

As shown in FIG. 26, the formation member 211 includes a cylindrical inner sleeve 250 operating as an inner piece, the pullout piece 22, and a cap 260 operating as a support member. The inner sleeve 250 comprises an inner portion 250a formed of metal. The inner portion 250a has an engagement flange portion 250b formed at its right end so as to project outward along its circumferential direction. The inner portion 250a has a projecting portion 250c formed at its left end by folding an edge of the inner portion 250a inward. The projecting portion 250c projects inward from the inner peripheral surface of the inner portion 250a.

The inner portion 250a has an outer diameter slightly smaller than the inner diameter of the pipe main body 11a. Thus, the inner portion 250a can be inserted into the pipe main body 11a. The inner portion 250a has an inner diameter slightly larger than the outer diameter of the increased diameter portion 22a. The engagement flange portion 250b has an outer diameter larger than the inner diameter of the pipe main body 11a. When the inner portion 250a is inserted into the pipe main body 11a, the engagement flange portion 250b engages with the end surface of the pipe main body 11a. Further, the end surface is covered with the engagement flange portion 250b.

The cap 260 includes a generally cylindrical fit-in portion 260a formed of metal. The fit-in portion 260a may be formed of a synthetic resin. The fit-in portion 26a has an outer diameter slightly smaller than the inner diameter of the inner portion 250a. Thus, the fit-in portion 260a can be fitted into the inner portion 250a. A through-hole 260d is formed substantially in the center of the fit-in portion 260a. The fit-in portion 260a is formed with an insertion support portion 260b extending along its axis. The shaft portion 114b of the pullout pin 23 is inserted through the through-hole 260d and supported by the insertion support portion 260b. Moreover, the fit-in portion 260a is formed with a support portion 260c extending outward along its circumferential direction.

The engagement flange portion 250b of the inner sleeve 250 is fitted into the fit-in portion 260a of the cap 260. Moreover, when the support portion 260c of the cap 260 is engaged with the outer surface of the engagement flange portion 250b, the cap 260 supports the inner sleeve 250. The inner sleeve 250 is pre-integrated with the cap 260. The shaft portion 114b of the pullout pin 23 and the small diameter portion 22b of the pullout piece 22 are inserted into the inner portion 250a. The shaft portion 114b of the pullout pin 23 projects out from the fit-in portion 260a via the through-hole 260d.

The outer peripheral surface of the pullout piece 22 engages with an inner peripheral surface of the projecting portion 250c of the inner sleeve 250. The shaft portion 114b of the pullout pin 23 is supported by the insertion support portion 260b. Accordingly, the pullout piece 22, the inner sleeve 250 and the cap 260 are stably assembled together. Further, the shaft portion 114b of the pullout pin 23 supported by the insertion support portion 260b projects from the cap 260. Moreover, the pullout piece 22 has an axial length smaller than the length between the projecting portion 250c and the cap 260.

To use the formation member 211 to form the end structure in the water pipe 11, the inner portion 250a and pullout piece 22 of the formation member 211 are first inserted into the pipe main body 11a, as shown in FIG. 26. Thus, the end surface of the pipe main body 11a is abutted against the engagement flange portion 250b. When the end surface of the pipe main body 11a abuts against the engagement flange portion 250b, the projecting portion 250c is placed in position within the pipe main body 11a.

Subsequently, the pullout tool 130 in FIG. 22 is used to pull the pullout pin 23 away from the pipe main body 11a. Since the shaft portion 114b of the pullout pin 23 has been inserted through the insertion support portion 260b of the cap 260, the pullout pin 23 is pulled along the axis of the inner portion 250a. Further, the pullout piece 22 is pulled along the axis of the inner portion 250a. That is, the pullout piece 22 is moved through the pipe main body 11a along its axis.

Figure 27:
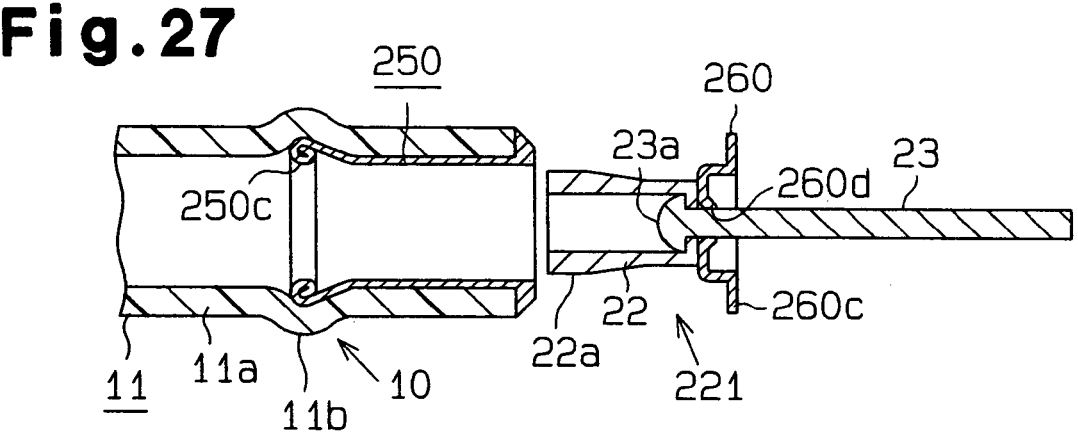
FIG. 27 is a sectional view showing that a swollen portion has been formed using the formation member in FIG. 26.

Then, as shown in FIG. 27, as in the case of the embodiments shown in FIGS. 20 to 24, the increased diameter portion 22a causes the inner diameter of the projecting portion 250c to be increased. Thus, the swollen portion 10b is formed in the outer surface of the pipe main body 11a. When the pullout pin 23 is further pulled, the pullout piece 22 is placed between the projecting portion 250c and the cap 260 and then abuts against the cap 260. Moreover, the cap 260 is pulled out of the inner sleeve 250 in a direction in which it exits the pipe main body 11a. The pullout piece 22 and the cap 260 are pulled out of the pipe main body 11a.

Since the projecting portion 250c is engaged with the inner peripheral surface of the pipe main body 11a, even when the inner sleeve 250 is separated from the cap 260 to pull the pullout piece 22 out of the pipe main body 11a, it remains in the pipe main body 11a. Thus, the inner portion 250a is integrated with the inside of the end of the pipe main body 11a to reinforce this end.

Further, the projecting portion 250c allows the swollen portion 10b to be formed at the end of the pipe main body 11a. Furthermore, a seal structure is formed between the outer peripheral surface of the projecting portion 250c and the inner peripheral surface of the pipe main body 11a to prevent the leakage of fluid. Moreover, the inner diameter of the projecting portion 250c is almost the same as that of the part of the pipe main body 11a which is not enlarged. Consequently, flow loss decreases compared to the case where the inner diameter of the projecting portion 250c is not increased. Thus, the pipe main body 11a is formed with the water pipe 11 comprising the end structure 10 having the swollen portion 10b, the seal structure, and the function to reduce the flow loss. The water pipe 11 is connected to a joint (not shown).

Accordingly, the present embodiment also makes it possible to easily form the end structure 10 having the swollen portion 10b, the seal structure, and the function to reduce the flow loss. The inner portion 250a can also be used to reinforce the end structure between the formation member 211 and the joint. This prevents the formation member 211 from being disadvantageously folded or damaged even if a bending stress or the like acts on the formation member 211.

Each embodiment may be changed as described below.

Figure 28:
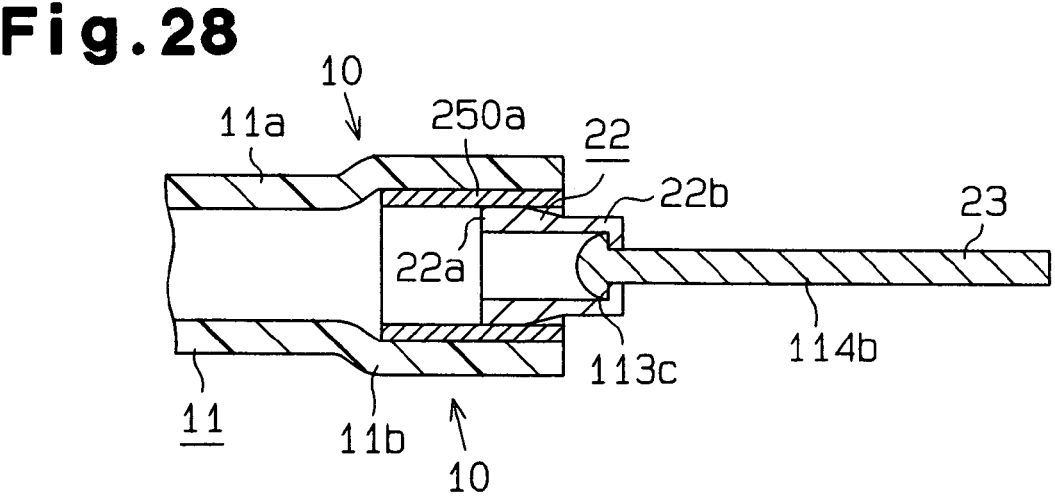
FIG. 28 is a side view showing a formation member comprising an inner sleeve according to another embodiment.

As shown in FIG. 28, the engagement flange portion 250b and projecting portion 250c according to the embodiments shown in FIGS. 26 and 27 are omitted. The whole inner portion 250a is thickened, and the inner diameter of the inner portion 250a is reduced below the outer diameter of the increased diameter portion 22a. Then, the pullout piece 22 may be passed through the inner portion 250a to increase the diameter of the entire inner portion 250a along its axis. Consequently, the swollen portion 11b having a length along the axis of the inner portion 250a may be formed in the pipe main body 11a. With such a configuration, the outer peripheral surface of the inner portion 250a tightly contacts the inner peripheral surface of the pipe main body 11a to form a seal structure. Further, the inner diameter of the inner portion 250a becomes almost the same as that of the part of the pipe main body 11a which is not enlarged. This reduces the flow loss.

In the embodiments shown in FIGS. 1 to 5, the outer diameter of the swollen portion 1b may be larger than the diameter of the inner hole 20a in the fixed sleeve 20. With such a configuration, before the swollen portion 11b is formed in the pipe main body 11a, the fixed sleeve 20 is installed around the pipe main body 11a.

In the embodiments shown in FIGS. 1 to 5, the engagement sleeve 19 may be integrally formed rather than being divided into the two divided pieces 19a.

In the embodiments shown in FIGS. 1 to 5, the cylinder 34 shown in FIG. 9 may be used instead of the ring piece 13. In this case, the size of the engagement concavity 19b may be changed so that the swollen portion 11b, formed by the cylinder 34, engages with the engaging concave 19b of the engagement sleeve 19.

In the embodiments shown in FIGS. 1 to 5, the connecting cylindrical portions 14 may be formed at the respective ends of the joint main body 12a of the joint 12.

In the embodiments shown in FIGS. 1 to 8, a diameter increasing tool commonly used to increase the diameter of the pipe main body Ha may be used in place of the formation member 21 to increase the diameter of the ring piece 13 to form the swollen portion 11b in the water pipe 11.

In the embodiments shown in FIGS. 6 to 8, the first ring 31 and the second ring 32 may be integrated together. Then, a groove may be formed in the inner peripheral surface of the integrated member so that the swollen portion 11b can be engaged with the groove.

In the embodiments shown in FIGS. 6 to 8, the inner sleeve 25 may be omitted.

In the embodiments shown in FIGS. 6 to 8, the connecting cylindrical portion 27b may be formed at only one end of the joint main body 27.

Figure 29:
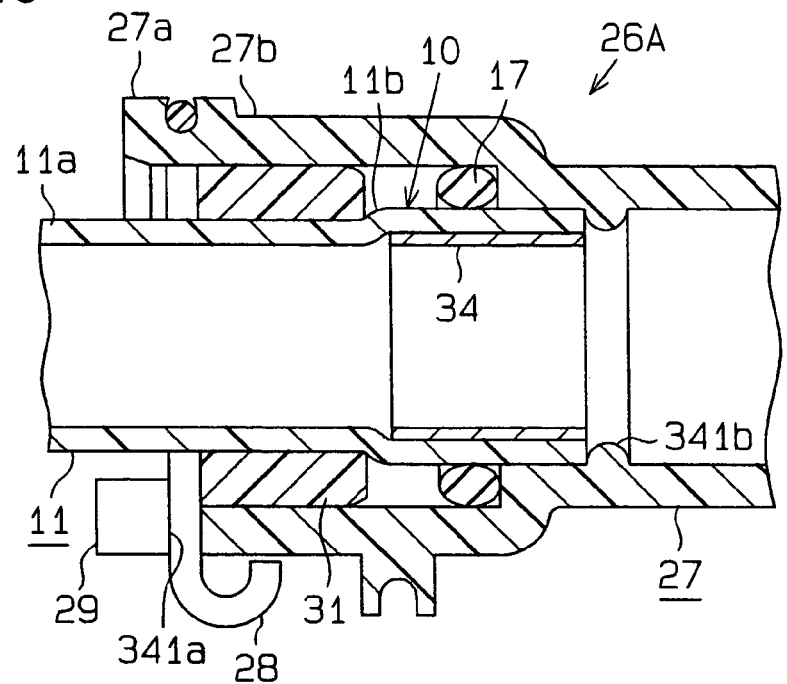
FIG. 29 is a sectional view showing a structure connecting a water pipe and joint together according to yet another embodiment.

The joint 26A shown in FIG. 29 may be connected to the water pipe 11 comprising the end structure 10. The configuration of the present embodiment includes the main configuration of the embodiments shown in FIGS. 6 to 8 as well as the cylinder 34 of the embodiment shown in FIG. 9. Specifically, the second ring 32 of the embodiments shown in FIGS. 6 to 8 is omitted, and the configuration of the inner sleeve 25 is different. The other components are the same and are thus denoted by the same reference numerals, with their description omitted. Also in the present embodiment, the terms "upward", "downward", "right", and "left" in the description below correspond to the upper, lower, right, and left sides, respectively, of the drawings.

Figure 30:
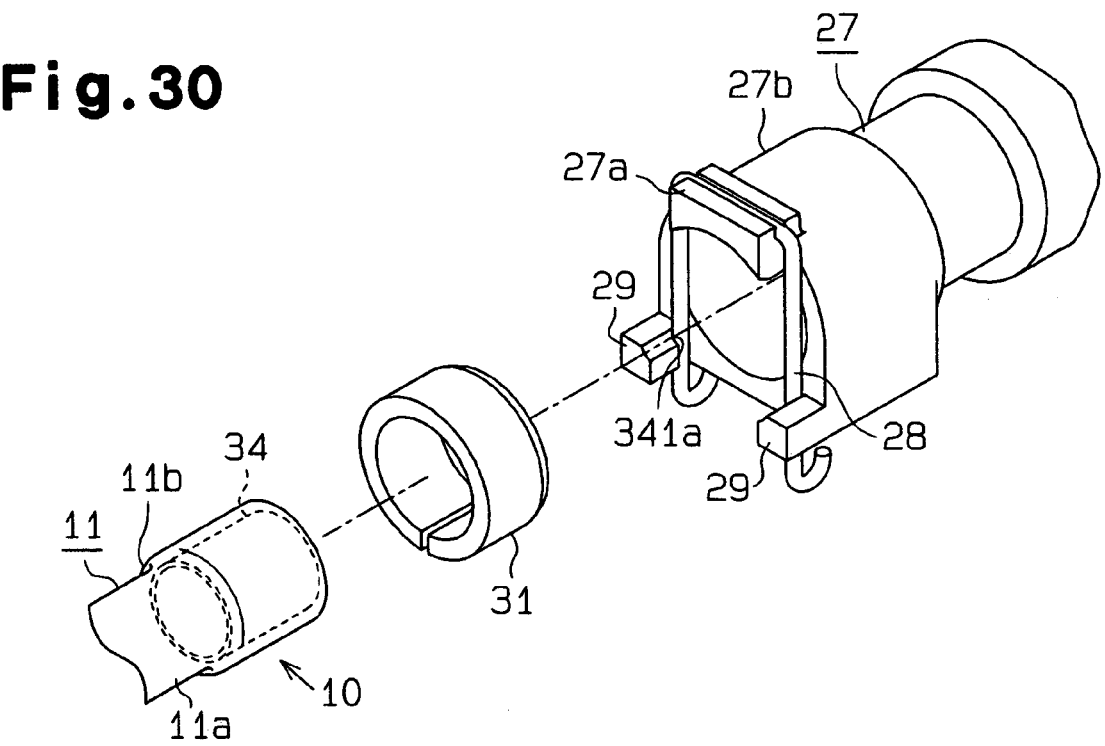
FIG. 30 is an exploded perspective view showing the water pipe and joint in FIG. 29.

The cylinder 34 is inserted into the pipe main body 11a of the water pipe 11. Then, the diameter of the cylinder 34 is increased to form the water pipe 11 comprising the end structure 10. Then, the first ring 31 and the seal member 17 are installed around the end of the pipe main body 11a at which the swollen portion 11b has been formed. Subsequently, the pipe main body Ha of the water pipe 11 is connected to the joint 26A using steps substantially similar to those described in the embodiments shown in FIGS. 9 to 13 (see FIG. 30). Unlike the embodiments shown in FIGS. 9 to 13, the present embodiment does not require the second ring, thus reducing the number of parts required.

In the embodiments shown in FIGS. 9 to 13, the ring piece 13 in FIG. 1 may be used instead of the cylinder 34 to form the swollen portion 11b in the pipe main body 11a. Then, the water pipe 11 and the joint 33 may be connected together by engaging the swollen portion 11b with the slip-out preventing sleeve 33b, attached to the joint main body 33a, to prevent the pipe main body 11a from slipping out of the joint 33.

In the embodiments shown in FIGS. 9 to 13, the connecting cylindrical portions 33f may be formed at the respective ends of the joint main body 33a. The inner diameter of the cylinder 34 need not be almost the same as that of the part of the pipe main body 11a which is not enlarged. Moreover, the seal structure need not be formed between the outer peripheral surface of the cylinder 34 and the inner peripheral surface of the pipe main body 11a.

In the embodiments shown in FIGS. 14 to 17, the connecting cylindrical portion 44d may be formed at only one end of the joint main body 44a. When the water pipe 11 is connected to the joint 44, the inner diameter of the enlarged inner sleeve 25 need not be the same as that of the part of the pipe main body 11a which is not enlarged. Further, the seal structure need not be formed between the outer peripheral surface of the inner sleeve 25 and the inner peripheral surface of the pipe main body 11a. Moreover, the seal structure need not be formed between the outer peripheral surface of the inner sleeve 25 and the inner peripheral surface of the pipe main body 11a or between the inner peripheral surface of the outer sleeve 45 and the outer peripheral surface of the pipe main body 11a.

In the embodiments shown in FIGS. 14 to 17, the outer sleeve 45 is omitted and the swollen portion 11b is formed using the outer surface of the pipe main body 11a. Then, with the slip-out preventing sleeve 46 screwed onto the joint main body 44a, the engagement step portion 48 may be engaged with the swollen portion 11b of the pipe main body 11a to prevent the pipe main body 11a from slipping out of the joint main body 44a.

In the embodiments shown in FIGS. 14 to 17, the engagement flange portion 25b of the inner sleeve 25 may be joined to the outer peripheral flange portion 45b of the outer sleeve 45 to integrally form the inner sleeve 25 and outer sleeve 45.

Figure 19B:
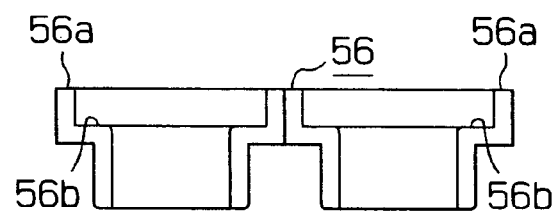
FIG. 19(b) is a front view showing an engagement sleeve.

In the embodiments shown in FIGS. 18 and 19(b), the connecting cylindrical portions 14 may be formed at the respective ends of the joint main body 55a.

In the embodiments shown in FIGS. 18 and 19(b), the outer sleeve 45 may be omitted, and the swollen portion 11b, formed around the outer surface of the pipe main body 11a, may be engaged with the engagement surface 56b of the engagement sleeve 56 to prevent the pipe main body Ha from slipping out of the joint main body 55*a*.

In the embodiments shown in FIGS. 18 and 19(*b*), with the water pipe 11 connected to the joint 55, the inner diameter of the part of the pipe main body 11*a* which is not enlarged need not be the same as that of the enlarged part of the cylinder 34.

In the embodiments shown in FIGS. 18 and 19(*b*), the seal structure need not be formed between the outer peripheral surface of the cylinder 34 and the inner peripheral surface of the pipe main body 11*a*. Moreover, the seal structure need not be formed between the outer peripheral surface of the cylinder 34 and the inner peripheral surface of the pipe main body 11*a* or between the inner peripheral surface of the outer sleeve 45 and the outer peripheral surface of the pipe main body 11*a*.

In the embodiments shown in FIGS. 18 and 19(*b*), the engagement sleeve 56 may be formed by integrating the divided pieces 56*a* with each other.

Figure 31:
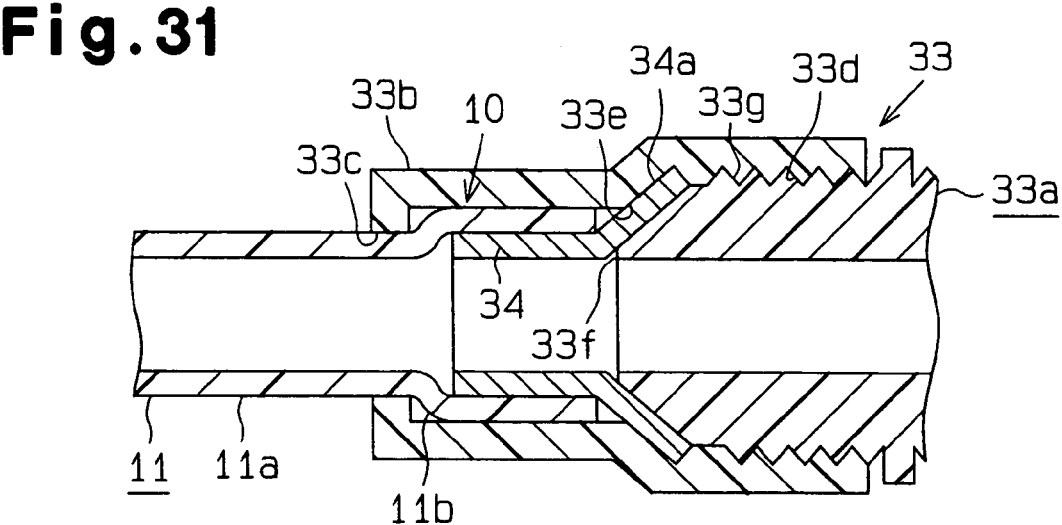
FIG. 31 is a sectional view showing how a water pipe and a joint are connected together according to still another embodiment.

FIG. 31 shows a variation of the embodiments shown in FIGS. 9 to 13. The present embodiment differs from that shown in FIG. 9 in the configurations of the cylinder 34 and joint 33, inserted into the pipe main body 11*a* of the water pipe 11 as shown in FIG. 9.

The cylinder 34 has an extension portion 34*a* extending outward. The end surface of the connecting cylindrical portion 33*f* of the joint main body 33*a* has a tapered outer diameter that decreases toward the central portion of the joint main body 33*a*. Moreover, the slip-out preventing sleeve 33*b* has a locking step portion 33*e* formed on the inner peripheral surface of its central portion so as to extend along its circumferential direction.

The inner diameter of the cylinder 34 inserted into the pipe main body 11*a* is increased to form the swollen portion 11*b* around the outer surface of the pipe main body 11*a*. Further, the inner diameter of the extension portion 34*a* is increased. Moreover, the inner peripheral surface of the extension portion 34*a* is abutted against the end surface of the joint main body 33*a* to screw the slip-out preventing sleeve 33*b* around the joint main body 33*a*. As a result, the extension portion 34*a* is sandwiched between the left end surface of the joint main body 33*a* and the locking step portion 33*e* of the slip-out preventing sleeve 33*b*. Additionally, the swollen portion 11*b* engages with the inner surface of the slip-out preventing sleeve 33*b*. Consequently, the pipe main body 11*a* is prevented from slipping out of the slip-out preventing sleeve 33*b* attached to the joint main body 33*a*. That is, the water pipe 11 is connected to the joint 33 so as to be prevented from slipping out of it. In this case, a seal structure is formed between the inner peripheral surface of the extension portion 34*a* and the left end surface of the joint main body 33*a* and between the inner peripheral surface of the extension portion 34*a* and the inner peripheral surface of the slip-out preventing sleeve 33*b*. Therefore, the seal structure between the water pipe 11 and the joint main body 33*a* can prevent a fluid from disadvantageously leaking between the pipe main body 11*a* and the joint main body 33*a*.

Figure 32:
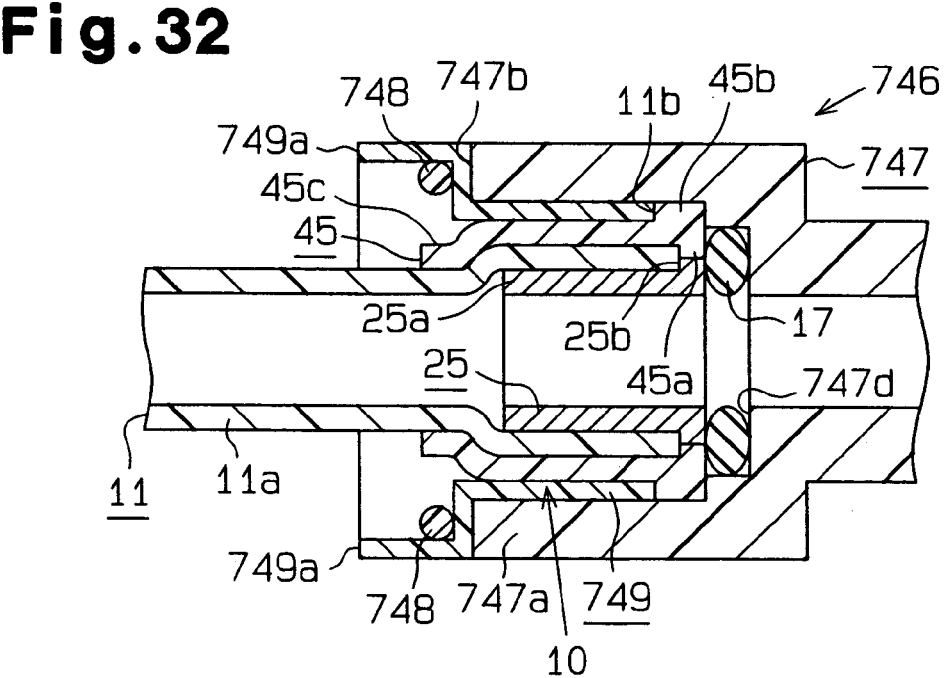
FIG. 32 is a partial sectional view showing a structure connecting a joint and a water pipe together according to yet another embodiment.
Figure 33:
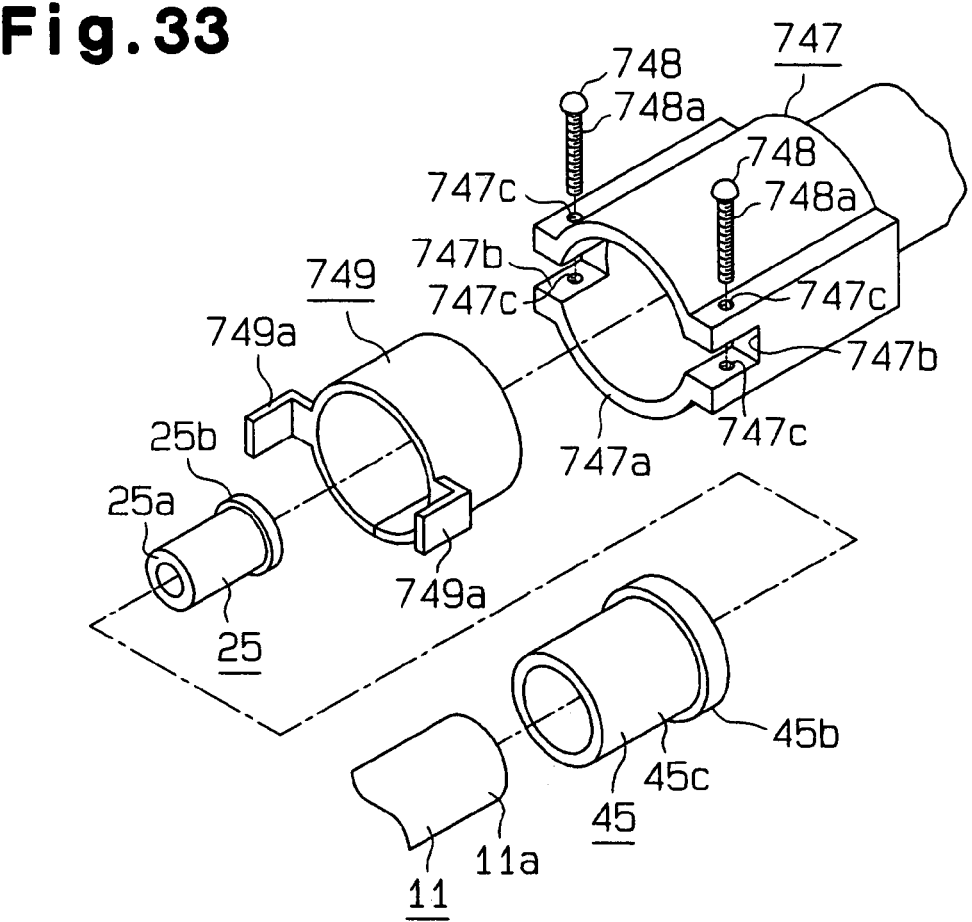
FIG. 33 is an exploded perspective view showing the joint and the water pipe according to still another embodiment.

In place of the joint 33 of the embodiments shown in FIGS. 9 to 13, a joint 746, shown in FIGS. 32 and 33, may be used. The joint 746 includes a joint main body 747 formed of a synthetic resin, attachment pins 748 operating as attachment bodies, and an attachment cylinder 749 operating as an engaged piece. The joint main body 747, the attachment pin 748, and the attachment cylinder 749 may be formed of metal. Also in the present embodiment, the terms "upward", "downward", "right", and "left" in the description below correspond to the upper, lower, right, and left sides, respectively, of the drawings.

As shown in FIGS. 32 and 33, the joint main body 747 is generally cylindrical. The joint main body 747 has a connecting cylindrical portion 747*a* formed at its left end. A pipe (not shown) can be connected to a right end of the joint main body 747. At the left end of the connecting cylindrical portion 747*a*, accommodation concave portions 747*b* are formed at opposite positions across the axis of the connecting cylindrical portion 747*a*. The connecting cylindrical portion 747*a* has attachment holes 747*c* formed at opposite positions at its left end. The attachment pins 748 are allowed to penetrate the respective attachment holes 747*c* so as to be attached to the connecting cylindrical portion 747*a*.

Figure 34:
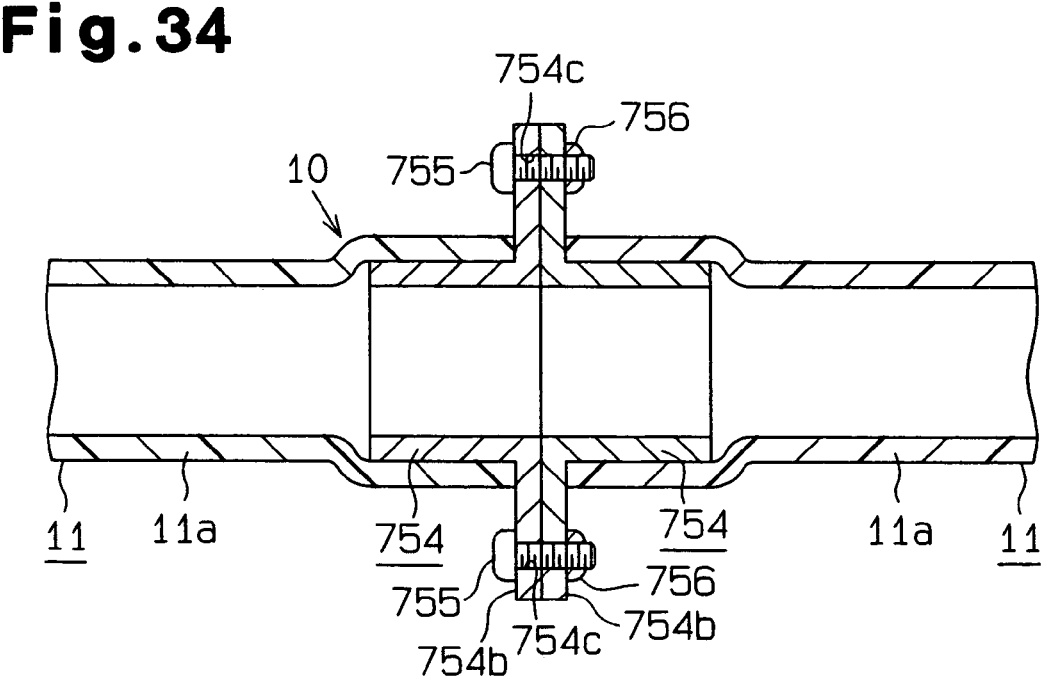
FIG. 34 is a partial sectional view showing a structure connecting water pipes together according to yet another embodiment.
Figure 35:
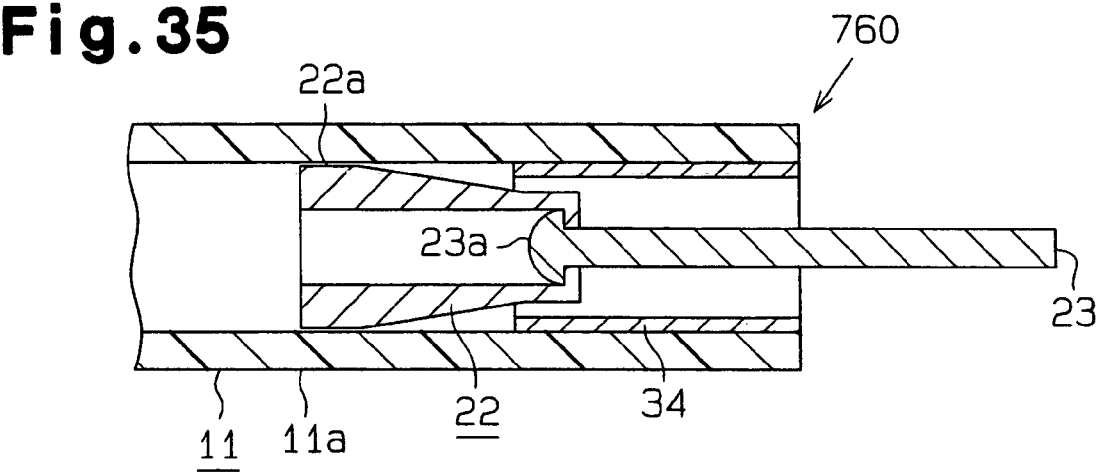
FIG. 35 is a sectional view showing a tool according to still another embodiment.

Each attachment hole 747*c* has a female thread (not shown) formed around its inner peripheral surface. A male thread 748*a* formed on each attachment pin 748 is screwed into the female thread of the corresponding attachment hole 747*c*. As shown in FIG. 34, the joint main body 747 is formed with a locking surface 747*d* constituting an inner peripheral surface of its central portion and extending along a circumferential direction of the joint main body 747. The seal member 17 is installed on the locking surface 747*d*. As shown in FIG. 35, the attachment cylinder 749 has engagement pieces 749*a* formed at its left outer peripheral edge at opposite positions so as to extend outward perpendicularly to the axis of the attachment cylinder 749 and further along the axis.

To connect the water pipe 11 to the joint 746, outer sleeve 45 and the inner sleeve 25 are first attached to the end of the pipe main body 11*a*. Then, the attachment cylinder 749 is attached to the pipe main body 11*a*. Subsequently, as in the case of the embodiments shown in FIGS. 9 to 13, a seal structure is formed at the end of the pipe main body 11*a*. At this time, the outer peripheral flange portion 45*b* of the outer sleeve 45 forms the swollen portion 1*b* in the pipe main body 11*a*. Then, the end of the pipe main body 11*a* is inserted into the connecting cylindrical portion 747*a*. Moreover, the opposite end of the attachment cylinder 749 at which the engagement pieces 749*a* of the attachment cylinder 749 are provided, that is, the right end of the attachment cylinder 749, is inserted into the connecting cylindrical portion 747*a*. Thus, the engagement pieces 749*a* are accommodated in the respective accommodation concave portions 747*b*. Then, each attachment pin 748 is inserted into the corresponding attachment hole 747*c*. The male thread 748*a* is screwed into the female thread of the attachment hole 747*c* to attach the attachment pins 748 to the connecting cylindrical portion 747*a*. Thus, the joint 746 is formed.

As shown in FIG. 32, the attachment pins 748 allow the engagement pieces 749*a* to be pressed toward the interior of the connecting cylindrical portion 747*a*. Then, the right end surface of the attachment cylinder 749 engages with the outer peripheral flange portion 32*c* of the outer sleeve 45. Further, the outer peripheral flange portion 32*c* is sandwiched between the right end surface of the attachment cylinder 749 and the inner surface of the connecting cylindrical portion 747*a*. As a result, the attachment pins 748 allow the attachment cylinder 749 to be positioned so as not to slip out of the joint main body 747. The attachment cylinder 749 in turn allows the outer sleeve 45 to be positioned in the joint main body 747. Thus, the pipe main body Ha is connected to the connecting cylindrical portion 747*a* to prevent the pipe main body 11*a* from slipping out of the joint main body 747. That is, the connecting cylindrical portion 747*a*, the attachment cylinder 749, and the attachment pin 748 form a connection structure that connects the water pipe 11 to the joint 746. The water pipe 11 comprising the end structure 10 is connected to the joint 746 so as not to slip out of it, using the connection structure formed between the end of the pipe main body 11a and the connecting cylindrical portion 747a of the joint 746.

As shown in FIG. 34, a connection member 754 as an inner piece may be attached to the pipe main body 11a to form a seal structure in the water pipe 11. The connection member 754 is generally cylindrical and is formed of metal. The connection member 754 has a connection flange portion 754b formed at an outer peripheral edge of one end of it, projecting outward along its circumferential direction, and operating as a fixation body. The connection flange portion 754b has through-holes 754c which are formed at different positions and through which respective bolts 755 can be inserted.

With the connection member 754 inserted into the pipe main body 11a, the inner diameter of the connection member 754 is increased. As a result, the connection member 754 is brought into pressure contact with the inner peripheral surface of the pipe main body 11a. Accordingly, a seal structure is formed around the inner peripheral surface of the pipe main body 11a. Therefore, the water pipe 11 comprising the end structure 10 is formed.

To connect the water pipe 11, used as a connection body, to another water pipe 11 comprising the connection member 754, each bolt 755 is inserted through the corresponding through hole 754c in each connection member 754. Then, a nut 756 is screwed onto each bolt 755 to connect the connection members 754 together. As a result, the water pipes 11 can be connected together. The water pipes 11 each pre-formed with a seal structure and comprising the end structure 10 may be transported to an installation site. Then, in the installation site, the water pipes 11 may be connected together.

In the embodiments shown in FIGS. 9 to 19(b), a diameter increasing tool 760, shown in FIG. 35, may be used to increase the diameter of the inner piece. The diameter increasing tool 760 comprises the cylinder 34 of the embodiment shown in FIG. 9 and the pullout piece 22 and pullout pin 23, shown in FIG. 3(b). The increased diameter portion 22a of the pullout piece 22 has an outer diameter larger than the inner diameter of the cylinder 34.

Figure 36:
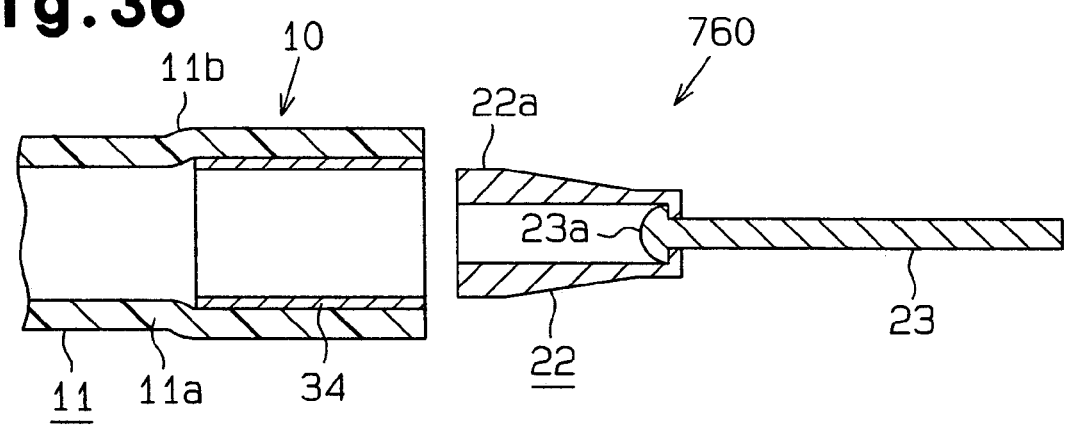
FIG. 36 is a sectional view showing that the diameter of the pipe main body has been increased using the tool.

Now, description will be provided of a method for using the diameter increasing tool 760 to form a seal structure in the water pipe 11. First, as shown in FIG. 35, the pullout piece 22 of the diameter increasing tool 760 and the cylinder 34 are inserted into the pipe main body 11a. Subsequently, an exclusive pullout tool is used to pull the pullout pin 23 away from the pipe main body 11a. Then, the movement of the pullout pin 23 causes the pullout piece 22 to be pulled away from the pipe main body 11a; the head 23a of the pullout pin 23 has been locked in the pullout piece 22. Then, since the outer peripheral surface of the pullout piece 22 has an outer diameter increasing toward its left end, as the pullout piece 22 moves, the outer diameter of the pullout piece 22 contacting with the inner peripheral surface of the cylinder 34 increases. Thus, the inner diameter of the cylinder 34 increases. The enlargement of the cylinder 34 results in a seal structure between the outer peripheral surface of the cylinder 34 and the inner peripheral surface of the pipe main body 11a as shown in FIG. 36. Further pulling the pullout pin 23 brings the cylinder 34 into pressure contact with the inner peripheral surface of the pipe main body 11a. Accordingly, the cylinder 34 remains in the pipe main body 11a, with the pullout piece 22 pulled out of the pipe main body 11a. As a result, the cylinder 34 allows a seal structure and the swollen portion 11b to be formed at the end of the pipe main body 11a. Therefore, the water pipe 11 comprising the end structure 10 is formed.

Figure 37:
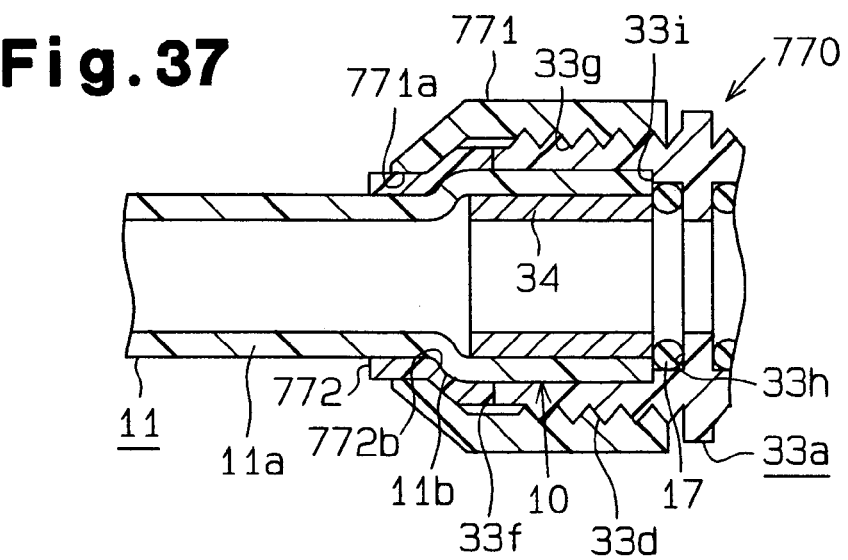
FIG. 37 is a partial sectional view showing a structure connecting a joint and a water pipe together according to yet another embodiment.

In the embodiments shown in FIGS. 9 to 13, the water pipe 11 may be formed which comprises the pipe main body 11a preformed with a seal structure. The water pipe 11 in which the end structure 10 has been formed may be transported to an installation site for the water pipe 11. Then, in the site, the water pipe 11 with the preformed end structure 10 may be connected to a connector. On this occasion, since the water pipe 11 is formed with the swollen portion 11b, it is preferable to use a connector formed so that its connection is not obstructed by the swollen portion 11b. For example, as shown in FIG. 37, a joint 770 is used which has almost the same structure as that of the joint 33 of the embodiment shown in FIG. 9. The joint 770 comprises the joint main body 33a, which is similar to the one in the embodiment shown in FIG. 9, a fixed sleeve 771 operating as an attachment, and an engagement sleeve 772 operating as an engaged piece. The fixed sleeve 771 and the engagement sleeve 772 are formed of a synthetic resin. The fixed sleeve 771 and the engagement sleeve 772 may be formed of metal.

Although not shown, the engagement sleeve 772 is formed by assembling a pair of half-cylindrical divided pieces to each other (see FIG. 2(b)). The divided pieces are integrated together by connecting their side edges together. The divided pieces can be separated from each other or assembled together around their connected part. The engagement sleeve 772 has an engagement step portion 772b formed on its inner peripheral surface and operating as an engaged piece with which the swollen portion 11b can be engaged when the engagement sleeve 772 is engaged with the outer peripheral surface of the pipe main body 11a.

As shown in FIG. 37, the fixed sleeve 771 has an inner hole 771a formed at its left end and having a diameter larger than the outer diameter of the left end of the engagement sleeve 772. The inner hole 771a has an inner diameter slightly larger than the outer diameter of the swollen portion 1b, formed in the pipe main body 11a.

If the joint 770 is connected to the water pipe 11 comprising the end structure 10 having the seal structure and swollen portion 11b formed at the end of the pipe main body 11a, then the end of the pipe main body ha at which the swollen portion 11b is formed is first inserted into the inner hole 771a of the fixed sleeve 771. Thus, the fixed sleeve 771 is installed around the pipe main body 11a. The inner hole 771a in the fixed sleeve 771 has a diameter larger than the outer diameter of the swollen portion 11b of the pipe main body 11a. Thus, the fixed sleeve 771 is installed around the pipe main body 11b without locking the swollen portion 11b on the peripheral edge of the inner hole 771a.

Then, the engagement sleeve 772 divided into the pair of divided pieces is placed around the swollen portion 11b. Then, the engagement sleeve 772 is formed by assembling the divided pieces of the pair to each other so that the swollen portion 11b engages with the engagement step portion 72b. The engagement sleeve 772 is then attached to the pipe main body 11a. Then, the end of the pipe main body 11a to which the engagement sleeve 772 has been attached is inserted into the connecting cylindrical portion 33f.

The female thread 771b of the fixed sleeve 771 is screwed onto the male thread 33g of the joint main body 33a. Then, as the fixed sleeve 771 is engaged with the joint main body 33a, the inner peripheral surface of the inner hole 771a is gradually brought into pressure contact therewith. Accordingly, the diameter of the engagement sleeve 772 decreases.

At the same time, the engagement sleeve 772 is pressed deep into the connecting cylindrical portion 33f. Thus, the pipe main body 11a with which the engagement step portion 772b of the engagement sleeve 772 is engaged is also pressed deep into the connecting cylindrical portion 33f.

As a result, the right end surface of the pipe main body 11a abuts against the second abutting surface 18. The right end surface of the engagement sleeve 772 abuts against the end surface of the joint main body 33a. Further, the engagement sleeve 772 is held inside the fixed sleeve 771 attached to the joint main body 33a. The engagement sleeve 772 is thus prevented from slipping out of the fixed sleeve 771. Then, the joint 770 is formed by assembling the joint main body 33a, the engagement sleeve 772, and the fixed sleeve 771 to one another. At the same time, the engagement step portion 772b of the engagement sleeve 772 is engaged with the swollen portion 11b. This allows the pipe main body Ha to be connected to the connecting cylindrical portion 33f so as not to slip out of it. Consequently, the water pipe 11 comprising the end structure 10 is connected to the joint 770.

Since the inner hole 771a in the fixed sleeve 771 has a larger outer diameter than the swollen portion 11b, the swollen portion 11b is prevented from obstructing an operation of connecting the water pipe 11 to the joint 770. It is thus possible to easily perform an operation for connecting the water pipe 11 and the joint 770 together. As a result, compared to the formation of a seal structure in the water pipe 11 in an installation site for the water pipe 11 and joint 770, the end structure 10 can be easily formed. It is also possible to reduce the burden on the operator.

Figure 38:
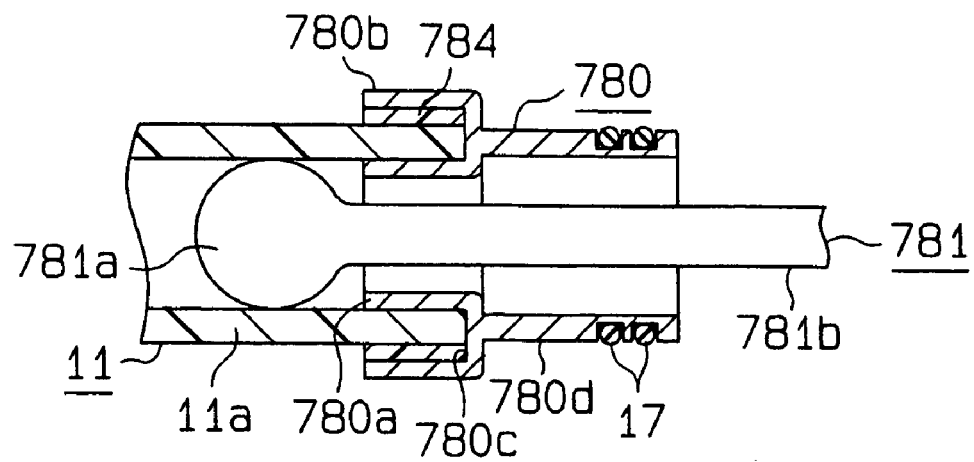
FIG. 38 is a sectional view showing an end forming member.

As shown in FIG. 38, the end structure 10 may be formed in the water pipe 11 using an end forming member 780 in which an inner piece and an outer member are integrated together. Moreover, the water pipe 11 comprising the end structure 10 may be connected to a connector. The upper, lower, right, and left sides of the water pipe 11 and end forming member 780 correspond to the upper, lower, right, and left sides of FIG. 38. The metal end forming member 780 is generally cylindrical. The end forming member 780 comprises an annular inner portion 780a operating as an inner piece, and an outer portion 780b located radially outside the inner portion 780a and operating as an outer body.

The end forming member 780 has an annular groove 780c formed between the inner portion 780a and the outer portion 780b. The end of the pipe main body 11a is inserted into the annular groove 780c. The inner portion 780a has a smaller inner diameter than the pipe main body 11a. When the pipe main body 11a is inserted into the annular groove 780c, the inner portion 780a is inserted into the pipe main body 11a. The outer portion 780b is placed radially outside the pipe main body 11a. An interposition member 784 made of a synthetic resin is fitted between the inner peripheral surface of the annular groove 780c and the outer peripheral surface of the pipe main body 11a inserted into the annular groove 780c. The interposition member 784 has a C-shaped cross section obtained by cutting out a generally cylindrical cylinder along its axial direction.

Figure 39:
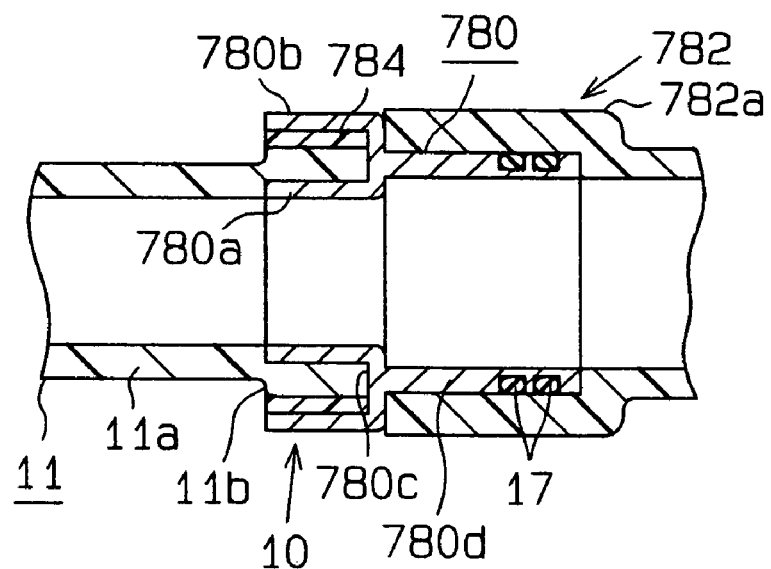
FIG. 39 is a sectional view showing a structure connecting a water pipe and joint together using an end forming member.

The end forming member 780 has an extension 780d formed in the right of the end forming member 780 and operating as a fixation portion extending from the inner portion 780a and outer portion 780b. The extension 780d has the seal member 17 installed at two positions on its outer peripheral surface. The extension 780d has the same inner diameter as that of the pipe main body 11a. A joint 782 operating as a connector connected to the end forming member 780 is generally cylindrical as shown in FIG. 39, and is formed of a synthetic resin. The joint 782 comprises a connecting cylindrical portion 782a. The joint 782 may be formed of metal.

To use the end forming member 780 to form a seal structure in the pipe main body 11a, the interposition member 784 is installed around the pipe main body 11a. Then, as shown in FIG. 38, a diameter increasing member 780a is inserted into the pipe main body 11a to increase the diameter of the inner diameter 780a of the end forming member 780. The diameter increasing member 781 comprises an increased diameter head 781a the diameter of which is almost the same as the inner diameter of the pipe main body 11a, and a grip portion 781b extending parallel with the axis of the pipe main body 11a from the increased diameter portion 781a.

The end of the pipe main body 11a is inserted into the annular groove 780c of the end forming member 780. The inner portion 780a is inserted into the pipe main body 11a. The end forming member 780 is installed around the pipe main body 11a so that the outer portion 780b is placed radially outside the pipe main body 11a. Moreover, the interposition member 784 is fitted between the inner peripheral surface of the annular groove 780c and the outer peripheral surface of the pipe main body 11a. Subsequently, with the grip portion 781b gripped, the increased diameter member 781 is pulled away from the pipe main body 11a to pass the increased diameter portion 781a through the inner portion 780a.

The increased diameter head 781a, the diameter of which is almost the same as the inner diameter of the pipe main body 11a, increases the diameters of the inner portion 780a, pipe main body 11a, interposition member 784, and outer member 780b. Further, the inner peripheral surfaces of the inner portion 780a and interposition member 784 are brought into pressure contact with both inner and outer peripheral surfaces of the pipe main body Ha to form a seal structure. As a result, a seal structure is formed at the end of the pipe main body 11a. Thus, the water pipe 11 comprising the end structure 10 is formed. When the inner portion 780a is inserted into the pipe main body 11a, the extension 780d extends from the end surface of the pipe main body 11a.

To connect the water pipe 11 in which the end structure 10 has been formed, as shown in FIG. 39 to the joint 782, the extension 780d of the joint 782 is fitted into the connecting cylindrical portion 782a. Then, the pair of seal members 17 comes into pressure contact with the inner peripheral surface of the connecting cylindrical portion 782a. Moreover, the elastic force of the seal member 17 itself causes the inner peripheral surface of the connecting cylindrical portion 782a to be pressed outward. Thus, the extension 780d allows the end forming member 780 to be connected to the connecting cylindrical portion 782a. The joint 782 is connected to the water pipe 11.

The use of the end forming member 780 enables a seal structure to be formed in the pipe main body 11a. It is also possible to easily connect the water pipe 11 to the joint 782. The water pipe 11 may be transported to an installation site and then connected to the joint 782, the water pipe 11 having a seal structure formed by connecting the end forming member 780 to the water pipe 11 and comprising the end structure 10.

The interposition member 784 may be omitted. In this case, the size of the annular groove 780c is adjusted so as to fit only the pipe main body 11a into the annular groove 780c. Moreover, in place of the interposition member 784, an elastic member such as a coil spring or a spring member may be interposed between the outer peripheral surface of the pipe main body 11a and the inner peripheral surface of the annular groove 780c. Such a configuration enables the elastic member to press both the outer peripheral surface of the pipe main body 11a and the inner peripheral surface of the annular groove 780c. This inhibits the water pipe 11 from slipping out of the annular groove 780c.

Figure 40A:
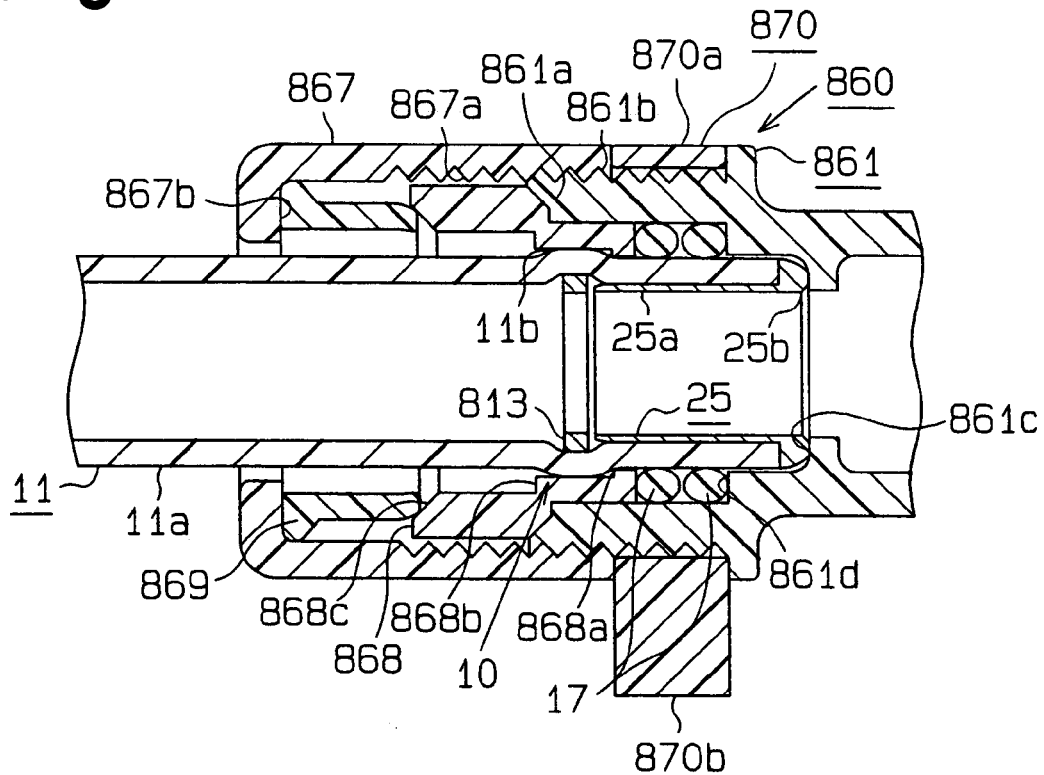
FIG. 40(a) is a sectional view showing a state before the connection of a joint to a water pipe according to still another embodiment.

A joint 860 operating as a connector may be connected to the water pipe 11 comprising the end structure 10 shown in FIG. 40(a). First, the end structure 10 of the water pipe 11 will be described. An annular ring piece 813 is attached to the pipe main body 11a using the formation member 21, with the ring piece having a rectangular cross section, being formed of metal, and operating as an inner piece. The ring piece 813 allows the swollen portion 11b to be formed in the pipe main body 11a. Thus, the water pipe 11 comprising the end structure 10 is formed. The metal inner sleeve 25 shown in FIG. 6 is fitted into the pipe main body Ha in which the swollen portion 11b has been formed.

Figure 40B:
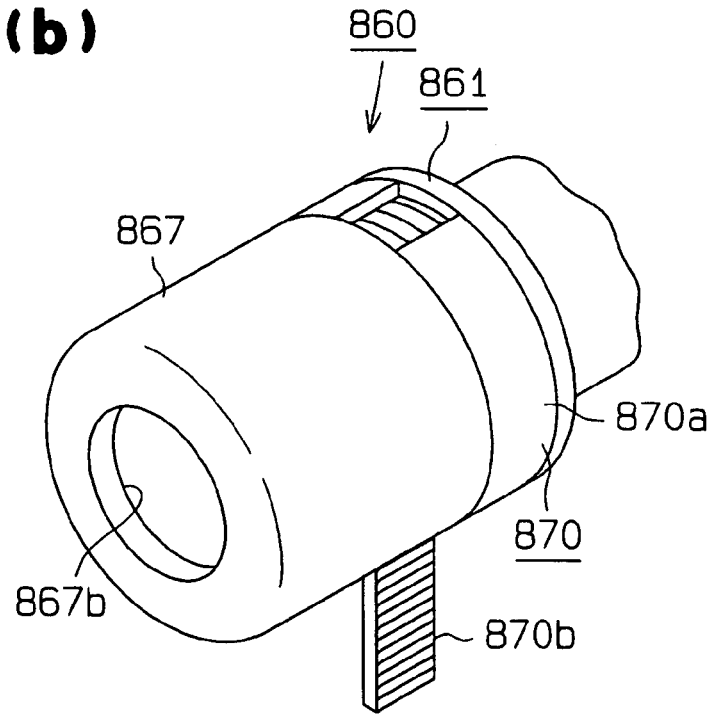
FIG. 40(b) is a perspective view showing the joint in FIG. 40(a)
Figure 41:
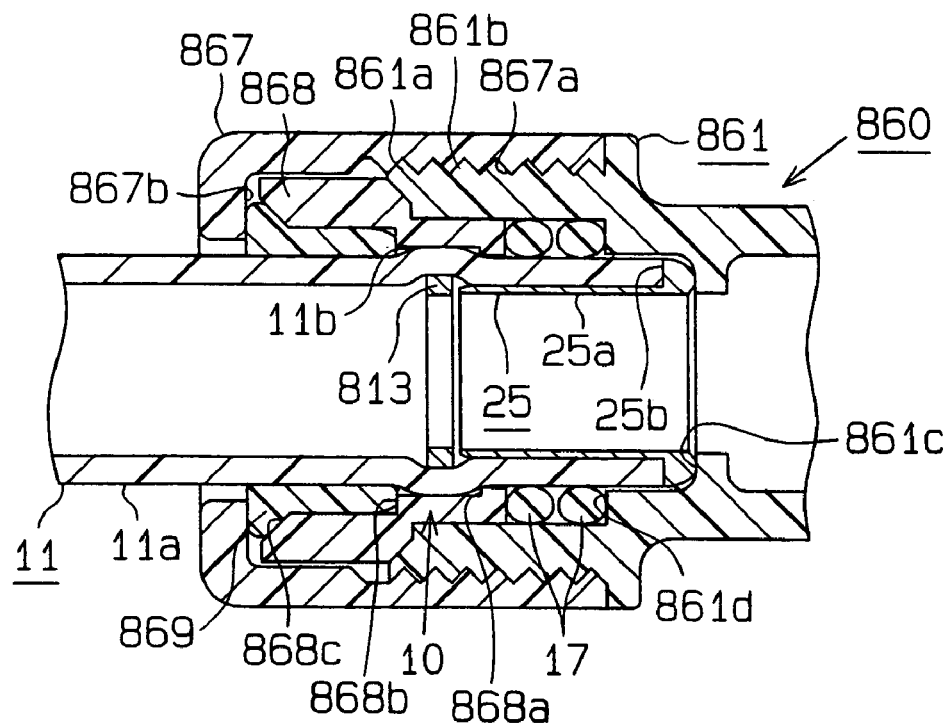
FIG. 41 is a sectional view showing how the water pipe and the joint are connected together.

Now, the joint 860 of the present embodiment will be described. As shown in FIGS. 40(a) to 41, the joint 860 includes a joint main body 861, an attachment sleeve 867, an insertion sleeve 868, and an engagement sleeve 869, all of which are generally cylindrical. Each of the joint main body 861, attachment sleeve 867, insertion sleeve 868, and engagement sleeve 869 are each formed of a synthetic resin. Each of the joint main body 861, attachment sleeve 867, insertion sleeve 868, and engagement sleeve 869 may be formed of metal. The joint main body 861 has connecting cylindrical portions 861a formed at its respective ends and to which the pipe main body 11a can be connected. The joint main body 861 has a male thread 861b formed around an outer peripheral surface of each end of it. Further, the joint main body 861 is internally formed with a first abutting surface 861c projecting inward along its circumferential direction. A second abutting surface 861d having larger outer and inner diameters than the first abutting surface 861c is a part of an inner peripheral surface of the joint main body 861 which is closer to the connecting cylindrical portion 861a of the joint main body 861 than the first abutting portion 861c. The pair of seal members 17 is installed on the second abutting surface 861d.

The attachment sleeve 867 as an attachment is generally cylindrical. The attachment sleeve 867 has a female thread 867a formed around an inner peripheral surface of one end (in FIG. 40(a), the right end) of it and which can be screwed onto the male thread 861b. On the other hand, the attachment sleeve 867 has an inner peripheral edge 867b formed at the other end (in FIG. 40(a), the left end) of it so as to extend inward along its circumferential direction. An opening at the other end of the attachment sleeve 867 has a diameter slightly larger than the outer diameter of the swollen portion 11b, formed in the water pipe 11.

The insertion sleeve 868 is generally cylindrical. The insertion sleeve 868 has a lager inner and outer diameters at one end (in FIG. 40(a), the right end) of it than at the other end (in FIG. 40(b), the left end) of it. The insertion sleeve 68 is formed with an engagement edge 68a constituting an inner peripheral edge at one end of it and extending along a circumferential direction of the insertion sleeve 868. Moreover, the insertion sleeve 868 is formed with an engagement surface 868b constituting an inner peripheral surface of its central portion and having a larger outer diameter than the right end of the insertion sleeve 868. The insertion sleeve 868 also has an inclined surface 868c formed at an opening at the other end of it and inclined from the opening to its interior.

The engagement sleeve 869 is a generally cylindrical cylinder and operates as an engaged piece comprising an engagement portion. The engagement sleeve 869 has a C-shaped cross section obtained by being partly cut out along its axial direction. An outer peripheral surface of one end (in FIG. 40(a), the right end) of the engagement sleeve 869 has an outer diameter decreasing toward the right end. With the insertion sleeve 868 and the engagement sleeve 869 accommodated in the joint main body 861, the attachment sleeve 867 is screwed onto the joint main body 861. As shown in FIG. 40(b), before the joint 860 is used, the interposition member 870 is installed between the joint main body 861 and the attachment sleeve 867. This serves to regulate the insertion of the engagement sleeve 869 into the insertion sleeve 868.

The interposition member 870 includes an interposition portion 870a having a C-shaped cross section and a grip portion 870b extended from the interposition portion 870a. The interposition portion 870a has an inner diameter almost the same as the outer diameter of the female thread 861b. As shown in FIG. 40(a), the interposition portion 870a is installed around the outer periphery of the male thread 861b. In this state, the female thread 867a of the attachment sleeve 867 is screwed onto the male thread 861b. On this occasion, the interposition portion 870a avoids excessive screwing of the attachment sleeve 867. The attachment sleeve 867 prevents the engagement sleeve 869 from being pushed into the insertion sleeve 868.

To connect the water pipe 11 comprising the end structure 10, to the joint 860, the ring piece 813 is first used to form the swollen portion 11b in the pipe main body 11a in accordance with a method similar to that in the embodiments shown in FIGS. 9 to 13. Thus, the water pipe 11 comprising the end structure 10 is formed. Then, the inner portion 25a of the inner sleeve 25 is fitted into the end of the pipe main body 11a at which the swollen portion 11b has been formed. Further, the engagement flange portion 25b is engaged with the end surface of the pipe main body 11a.

Subsequently, the attachment sleeve 867 is loosened from the joint main body 861. Moreover, the interposition member 870 is removed from the joint main body 861 to take out the insertion sleeve 868 and the engagement sleeve 869. Then, the attachment sleeve 867 is installed at the end of the pipe main body 11a at which the swollen portion 11b has been formed. On this occasion, since the opening at the other end of the attachment sleeve 867 has a diameter larger than the outer diameter of the swollen portion 11b, the attachment sleeve 867 can be moved through the swollen portion 11b and deep into the pipe main body 11a.

Then, the engagement sleeve 869 and then the insertion sleeve 868 are installed into the pipe main body 11a. At this time, the locking edge 868a of the insertion sleeve 868 is locked on the swollen portion 11b. This inhibits the engagement sleeve 869 from moving deep into the pipe main body 11a. Then, the end of the pipe main body 11a at which the swollen portion 11b has been formed is inserted into the connecting cylindrical portion 861a of the joint main body 861. Moreover, the right end of the insertion sleeve 868 is inserted into the connecting cylindrical portion 861a and abutted against the seal members 17.

Then, the attachment sleeve 867 is attached to the joint main body 861. Then, the inner peripheral edge 867b of the attachment sleeve 867 abuts against the surface of the other end of the engagement sleeve 869. Thus, the engagement sleeve 869 is pressed toward the connecting cylindrical portion 861a. Correspondingly, the right end of the engagement sleeve 869 is guided into the insertion sleeve 868 via the inclined surface 868c. Then, the right end of the engagement sleeve 869 has its diameter reduced and is then inserted into the insertion sleeve 868.

As shown in FIG. 41, when the attachment sleeve 867 is screwed onto the joint main body 861, the surface of the right end of the engagement sleeve 869 engages with the engagement surface 868b of the insertion sleeve 868. The engagement sleeve 869 is thus sandwiched between the engagement surface 868b and the inner peripheral edge 867b of the attachment sleeve 867. At the same time, the surface of the right end of the engagement sleeve 869, operating as an engagement portion, engages with the swollen portion 11b. Further, the seal members 17 are brought into pressure contact with the outer peripheral surface of the pipe main body 11a. Consequently, a favorable seal is provided between the joint main body 861 and the water pipe 11.

As shown in FIG. 41, when the attachment sleeve 867 is screwed onto the joint main body 861, the inner peripheral edge 867b engages with the engagement sleeve 869. Thus, the inner peripheral edge 867b prevents the engagement sleeve 869 engaged with the swollen portion 11b from slipping out of the sleeve 867. The attachment sleeve 867 maintains the engagement between the engagement sleeve 869 and the swollen portion 11b. This prevents the water pipe 11 from slipping out of the connecting cylindrical portion 861a, that is, out of the joint 860. As a result, the water pipe 11 comprising the end structure 10 is connected to the joint 60.

Figure 42:
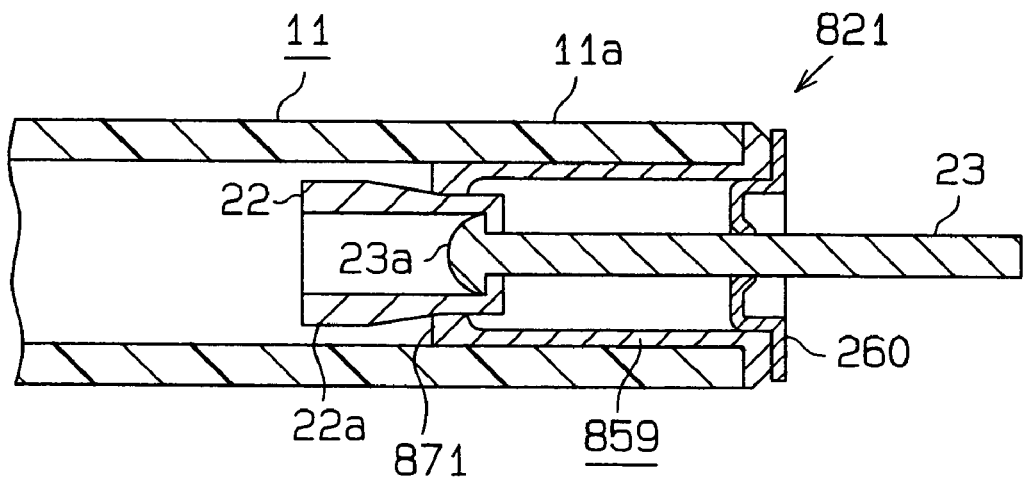
FIG. 42 is a sectional view showing how an inner piece is installed in a water pipe according to yet another embodiment.
Figure 45:
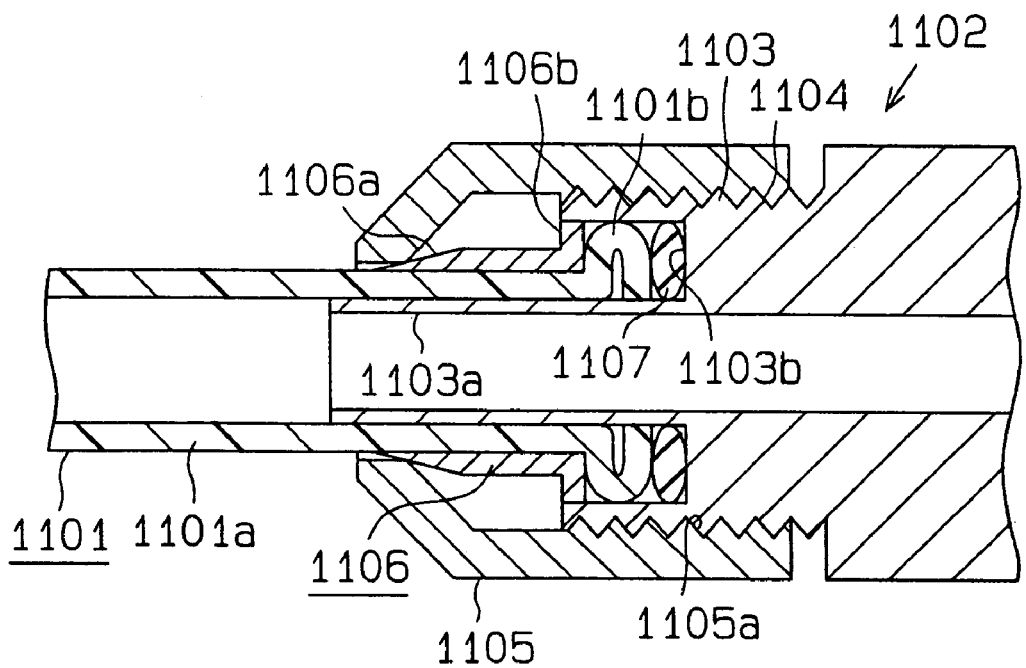
FIG. 45 is a sectional view showing how a water pipe and a joint are connected together in the prior art.

It is possible to use a formation member 821 comprising a cylindrical member 859 as shown in FIG. 42. The cylindrical member 859 has an inner peripheral projection 871 integrally formed on an inner peripheral surface of its leading end so as to project inward. As shown in FIG. 45, the swollen portion 11b may be formed in the pipe main body 11a by internally fitting the cylindrical member 859 into one end of the pipe main body 11a and increasing only the diameter of the inner peripheral projection 871. That is, the swollen portion 11b may be formed by increasing the diameter of a part of the peripheral surface of the cylindrical member 859 along its axial direction. Alternatively, the swollen portion 11b may be formed at each end of the pipe main body 11a by internally fitting the cylindrical member 859 into each end of the pipe main body 11a and increasing the diameter of the inner peripheral projection 871.

Specifically, as shown in FIG. 42, the pullout piece 22 of the formation member 21, shown in FIG. 3(b), is inserted into the cylindrical member 859. Further, the cylindrical member 859 and the pullout piece 22 are integrated together. The base end of the cylindrical member 859 is internally fitted with the cap 260. The use of the formation member 21 increases the diameter of the inner peripheral projection 871. As shown in FIG. 45, the inner peripheral projection 871 pushes the pipe main body 11a outward along the circumferential direction. The swollen portion 11b projecting outward is formed in the outer surface of the pipe main body 11a.

Figure 43:
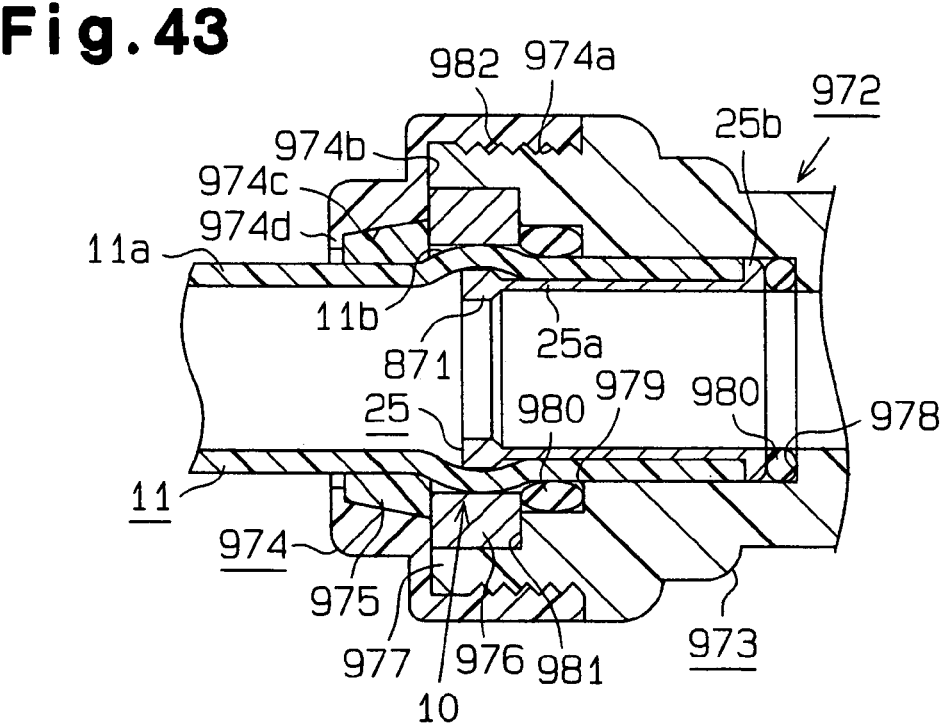
FIG. 43 is a sectional view showing how a water pipe and a joint are connected together according to still another embodiment.

The water pipe 11 in which the swollen portion 11b has been formed using the cylindrical member 859 comprising the inner peripheral projection 871 is connected to a joint 972 shown in FIG. 43 and operating as a connector, so as not to slip out of the joint 972. The joint 972 connects water pipes 11 together or is a part of a branching joint (header). The joint 972 includes a joint main body 973 formed to be generally cylindrical, a fixed sleeve 974 screwed onto the joint main body 973, a split ring 975, and a ring member 976.

The joint main body 973, formed of a synthetic resin, has connecting cylindrical portions 977 formed at its respective ends (FIG. 43 shows only the left end). Each connecting cylindrical portion 977 is formed with a first placement surface 978 constituting an inner peripheral surface of its part closer to its axial center. The connecting cylindrical portion 977 is also formed with a second placement surface 979 constituting its inner peripheral surface located to the left of the first placement surface 978 within the joint main body 973 and having a larger inner and outer diameters than the first placement surface 978. An O-ring 980 made of rubber is disposed on each of the first placement surface 978 and second placement surface 979.

The connecting cylindrical portion 977 is also formed with an abutting surface 981 constituting its inner peripheral surface located to the left of the second placement surface 979 within the joint main body 973 and having a larger inner and outer diameters than the second placement surface 979. The connecting cylindrical portion 977 has a male thread 982 formed around its outer peripheral surface. A fixed sleeve 974 as an attachment is generally cylindrical and is formed of a synthetic resin. The fixed sleeve 974 has a female thread 974a formed around its right inner peripheral surface and into which the male thread 982 can be screwed. The fixed sleeve 974 is formed with a locking surface 974b constituting its inner peripheral surface and projecting inward. The fixed sleeve 974 is formed with a tapered surface 974c constituting its inner peripheral surface joined to an inner peripheral edge of the locking surface 974b, the tapered surface 974c having a diameter decreasing from the locking surface 974b side toward a left end of the fixed sleeve 974. Moreover, the fixed sleeve 974 has a locking rib 974d formed at an inner peripheral edge of its left end so as to project inward.

A right end surface of the split ring 975, operating as an engaged piece, functions as an engagement portion that engages with the swollen portion 11b. The split ring 975 is a cylinder made of a synthetic resin. The split ring 975 has a C-shaped cross section obtained by being partly cut out along its axial direction. The split ring 975 is tapered and has an outer diameter decreasing from its right end to left end. When the split ring 975 is inserted into the connecting cylindrical portion 977, its right end surface engages with the swollen portion 11b as an engagement portion. The ring member 976 is annular and is formed of metal. When the fixed sleeve 974 is screwed onto the joint main body 973, the right end of the ring member 976 abuts against the abutting surface 981, and its left end is locked on the locking surface 974b. Thus, the ring member 976 is held between the abutting surface 981 and the tapered surface 974c.

When the ring member 976 is held between the abutting surface 981 and the tapered surface 974c, an O-ring 980 is held between an inner peripheral edge of the ring member 976 and the second placement surface 979. With the O-ring 980 placed on the first and second placement surfaces 978 and 979 and the ring member 976 placed on the abutting surface 981, when the fixed sleeve 974 in which the split ring 975 has been placed is screwed onto the joint main body 973, the joint 972 is assembled. At this time, the left end surface of the split ring 975 is locked on a locking rib 974d of the fixed sleeve 974 to prevent the split ring 975 from slipping out of the fixed sleeve 974.

To connect a water pipe 11 in which the swollen portion 11b has been formed, to the joint 972, the fixed sleeve 974 is loosened from the joint main body 973. Then, a gap is formed between the tapered surface 974c and the outer peripheral surface of the split ring 975. Thus, the split ring 975 is ready to have its diameter increased. Then, the end of the pipe main body 11a at which the swollen portion 11b has been formed is inserted into the connecting cylindrical portion 977 from the fixed sleeve 974. Then, the outer peripheral surface of the engagement flange portion 25b abuts against the inner peripheral surface of the split ring 975. Moreover, the pipe main body 11a is inserted into the split ring 975 to increase its diameter. This allows the swollen portion 11b to pass through the split ring 975.

The water pipe 11 is inserted into the joint 972 until the end surface of the engagement flange portion 25b abuts against the O-ring 980 placed on the first placement surface 978. At this time, the swollen portion 11b is located closer to the axial center of the joint main body 973 than the right end surface of the split ring 975 and in association with the ring member 976. Subsequently, the fixed sleeve 974 is screwed onto the connecting cylindrical portion 977, the tapered surface 974c is brought into pressure contact with the outer peripheral surface of the split ring 975. Thus, the diameter of the split ring 975 is gradually reduced. Once the fixed sleeve 974 is screwed onto the connecting cylindrical portion 977, the inner surface of the split ring 975 is brought into pressure contact with the outer peripheral surface of the pipe main body 11a. Further, the right end surface of the split ring 975 is placed where it can be engaged with the swollen portion 11b. Furthermore, the O-ring 980 placed on the first placement surface 978 comes into pressure contact with the engagement flange portion 25b. The O-ring 980 placed on the second placement surface 979 comes into pressure contact with the outer peripheral surface of the pipe main body 11a.

As a result, the swollen portion 11b engages with the split ring 975. The split ring 975 is thus accommodated in the fixed sleeve 974 so as not to slip out of it. Accordingly, the swollen portion 11b remains engaged with the split ring 975. The pipe main body 11a is prevented from slipping out of the connecting cylindrical portion 977. Consequently, the water pipe 11 is prevented from slipping out of the joint 972. Further, the outer peripheral surface of the inner peripheral projection 871 comes into pressure contact with the inner peripheral surface of the pipe main body 11a. Consequently, a favorable seal is provided between the inner peripheral surface of the pipe main body 11a and the outer peripheral surface of the inner sleeve 25. If water should leak between the inner peripheral surface of the pipe main body 11a and the outer peripheral surface of the inner sleeve 25, the O-ring 980 placed on the second placement surface 979 can act as the seal between the outer surface of the pipe main body 11a and the inner peripheral surface of the connecting cylindrical portion 977. This makes it possible to prevent water from disadvantageously leaking from the joint 972.

Moreover, the end surface of the pipe main body 11a is engaged with the engagement flange portion 25b formed in the end of the inner sleeve 25. Thus, the entire circumferential end surface of the engagement flange portion 25b comes into pressure contact with the O-ring 980 placed on the first placement surface 978. This provides a reliable seal between the engagement flange portion 25b and the O-ring 980. For example, it is possible to inhibit the leakage of water from between the O-ring 980 and the end surface of the pipe main body 11a, which may occur if the engagement flange portion 25b is not provided and if the end surface of the pipe main body 11a is obliquely cut.

By accommodating the split ring 975 in the joint 972, it is possible to perform an operation for connecting the water pipe 11 after the members forming the joint 972 have been assembled together. The operation of connecting the water pipe 11 and the joint 972 together can be simplified compared to the case where, for example, after the fixed sleeve 974, the split ring 975, and the ring member 976 have been installed around the water pipe 11, they are assembled together to form the joint 972, which is then connected to the water pipe 11.

In the above description, the operation for connecting the water pipe 11 is performed after the joint main body 973, the fixed sleeve 974, the split ring 975, and the ring member 976 have been installed. However, the connecting operation may be performed as described below. The fixed sleeve 974 and the split ring 975 are installed around the water pipe 11 in which the swollen portion 11b has been formed. Then, the water pipe 11 is inserted into the connecting cylindrical portion 977 in which the ring member 976 has been placed so as to abut against the abutting surface 981. Subsequently, the fixed sleeve 974 is screwed onto the connecting cylindrical portion 977 to form the joint 972. The water pipe 11 is then connected to the joint 972. Alternatively, for the joint 972, the joint main body 973 and the fixed sleeve 974 may be formed of metal, with the ring member 976 integrally formed in the joint main body 973. The split ring 975 is molded of a synthetic resin.

Figure 44:
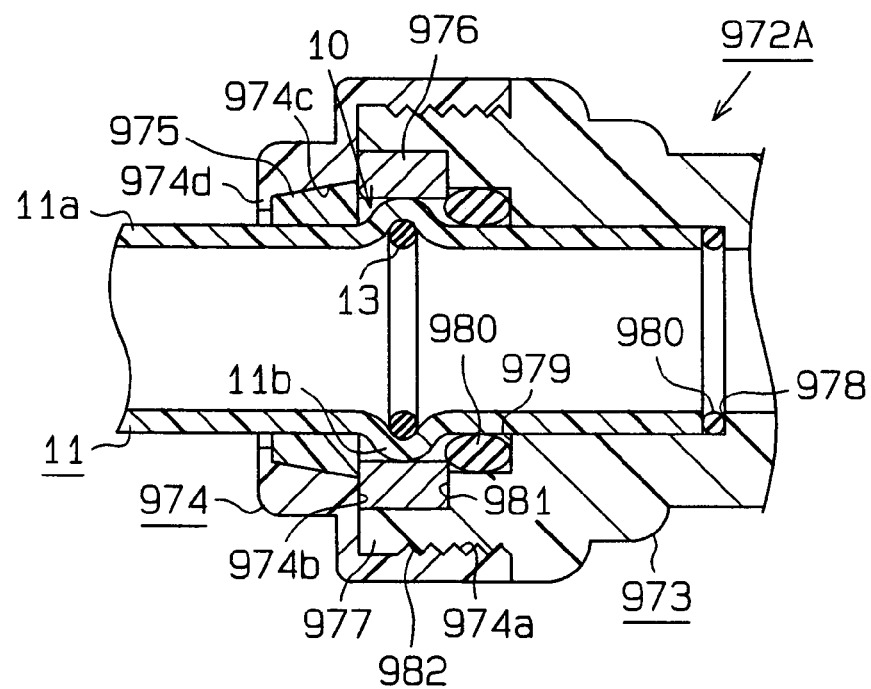
FIG. 44 is a partial sectional view showing a structure connecting a water pipe and a joint together according to yet another embodiment.

A joint 972A shown in FIG. 44 and operating as a connector may be connected to the water pipe 11 in which the end structure 10 has been formed using the ring piece 13 of the embodiments shown in FIGS. 1 to 5. The joint 972A is configured similarly to the joint 972, shown in FIG. 43. Also in the present embodiment, the joint 972A provides advantages similar to those of the joint 972, described above in FIG. 43.

In the embodiments shown in FIGS. 1 to 8, instead of the ring piece 13, the inner piece may be a ring member formed by annularly winding a metal wire. This configuration enables the inner piece to be easily and inexpensively formed.

The end structure 10 may be formed at each end of the water pipe 11.

In the embodiments shown in FIGS. 1 to 44, the end structure 10 is formed in the water pipe 11 in an installation site where the water pipe 11 and a connector are connected together. However, the end structure 10 may be preformed in the water pipe 11 at a factory or the like. Then, the water pipe 11 comprising the end structure 10 may be transported to the installation site to connect the water pipe 11 and the connector together. At this time, after the water pipe 11 has been inserted into a sheath pipe or the like to protect the outer surface of the water pipe 11, the water pipe 11 and the connector may be immediately connected together. Further, in contrast to the prior art, in which a flange portion is formed at the end of a pipe main body, the size of the swollen portion 11b can be reduced to facilitate the operation of inserting the water pipe 11 comprising the end structure 10 into the sheath pipe. Additionally, the operation of connecting the water pipe 11 and the connector together is easy in contrast to the prior art, in which to connect the water pipe 11 to the connector, it is necessary to pass the water pipe through the sheath pipe and then form the flange portion on the pipe main body.

In the embodiments shown in FIGS. 1 to 44, a metal layer may be provided within the thickness of the pipe main body 11a of the water pipe 11, made of a synthetic resin. With this configuration, the metal layer can prevent oxygen from passing through the water pipe 11. This serves to prevent the following problem: a fluid such as water flowing through the water pipe 11 may contain oxygen and corrode the metal connector.

The diameter increasing jig 35, used in the embodiments shown in FIGS. 9 to 17, may be used to form the inner periphery of the main sleeve 36 to have an octagonal or hexagonal cross section. The head of the movable bolt 38 may be formed to have an octagonal or hexagonal cross section. With this configuration, when the nut 40 is engaged with or loosened from the male thread 38c, the head of the movable bolt 38 and the inner peripheral surface of the main sleeve 36 interfere with each other. Consequently, the movable bolt 38 can be moved without being rotated in the main sleeve 36. This makes it possible to omit the engagement groove 38b, which regulates the rotation of the movable bolt 38, and the engagement pin 41.

The water pipe 11 comprising the end structure 10 may be connected to a branching joint (header), a water faucet, or the like.

In the embodiments shown in FIGS. 1 to 44, it is also possible to increase the diameter of at least a part of that portion of the pipe main body 11a which corresponds to the ring piece 13, operating as an inner piece, or the cylinder 34. The inner piece may be formed of a semi-annular member, for example, a member having a C-shaped cross section. Additionally, the swollen portion 11b may be formed projecting partly from the outer periphery of the pipe main body 11a.

The inserted piece 24 of the formation member 21, shown in FIGS. 1 to 5, may be omitted. Instead it is possible to use the formation member 21 in which the ring piece 13 is attached to the pullout piece 22.

The diameter of the inner piece may be increased using a diameter increasing tool different from the formation members 21, 111, and 211 and diameter increasing jig 35, used in the embodiments.

In the embodiments shown in FIGS. 20 to 25, it is possible to manually pull the pullout piece 22 out of the pipe main body 11a while holding the shaft portion 114b and without using the pullout tool 130. Moreover, the pullout piece 22 may be pulled out while holding the shaft portion 114b using a tool such as pliers or pincers.

In the embodiments shown in FIGS. 20 to 27, the inserted piece 24 or the cap 260 may be omitted, with the formation member 111 formed of the pullout piece 22 and ring piece 13 or the pullout piece 22 and inner sleeve 250. Moreover, the pullout pin 23 may be omitted from the pullout piece 22.

In the embodiments shown in FIGS. 20 to 27, the diameter of the ring piece 13 may be increased so that the pipe main body 11a is formed only with the swollen portion 10b and at least either the seal structure or the function to reduce the flow loss.

In the embodiments shown in FIGS. 20 to 24, instead of the ring piece 13, the inner piece may be a ring member formed by spirally winding a metal wire. The ring piece 13 may also be formed to be a rectangular frame.

In the embodiments shown in FIGS. 26 and 27, the projecting portion 250c may be formed by increasing the thickness of the left edge of the inner portion 250a so that the left edge projects from the inner periphery of the inner portion 250a rather than folding up the left edge of the inner portion 250a.

In the embodiments shown in FIGS. 26 and 27, the projecting portion 250c may be formed in a central portion or at an arbitrary position of the inner portion 250a in its axial direction.

In the embodiments shown in FIGS. 20 to 24, the formation member 111 may be formed by placing a cylinder between the pullout piece 22 and the inserted piece 24 as an inner piece.

In the embodiments shown in FIGS. 1 to 24, the ring piece 13 need not be bonded to the inserted piece 24. When the pullout piece 22 is inserted into the inserted piece 24, the ring piece 13 may be placed between the end surface of the inserted piece 24 and the pullout piece 22.

In the embodiments shown in FIGS. 20 to 27, the insertion support portion 115b or 260b may be omitted. Then, each through-hole 115d or the through-hole 260d may support the shaft portion 114b of the pullout pin 23.

The pullout pin 23 may be integrated with the pullout piece 22 by being joined to the pullout piece 22 by welding or the like. Alternatively, a shaft may be extended from the pullout piece 22 when the pullout piece 22 is molded.

In the embodiments shown in FIGS. 20 to 24, the pullout pin 23 may be omitted and instead a rivet passed through the inserted piece 24 and then inserted into the pullout piece 22. Furthermore, in the embodiments shown in FIGS. 26 and 27, a rivet may be passed through the cap 260 and then inserted into the pullout piece 22. Then, the diameter of the tip of the rivet may be increased using a riveter. The tip of the rivet may then be locked on the locking edge 113c of the pullout piece 22. Alternatively, the riveter may be used to pull the rivet as well as the pullout piece 22 out of the pipe main body 11a.

In the embodiments shown in FIGS. 20 to 27, the pullout pin 23 may be omitted and instead a keyhole-shaped through-hole may be formed in the inner bottom surface of the pullout piece 22. When the pullout piece 22 is pulled out of the pipe main body 11a, for example, a metal bar folded into an L shape is inserted into the through-hole and then rotatively moved. The tip of the metal bar is thus locked on the inner bottom surface of the locking edge 113c. Then, the metal bar is pulled away from the pipe main body Ha to pull the pullout piece 22 out of the pipe main body 11a.

In the embodiments shown in FIGS. 20 to 27, the pullout piece 22 may be formed to be generally cylindrical so that the increased diameter portion 22a is formed at the end of the pullout piece 22 and so that a shaft is extended from the pullout piece 22. In this case, the increased diameter portion 22a has a diameter larger than the inner diameter of the ring piece 13 or projecting portion 250c.

In the embodiments shown in FIGS. 20 to 27, a step may be formed between the increased diameter portion 22a and small diameter portion 22b of the pullout piece 22.

In the embodiments shown in FIGS. 20 to 27, the support portion 24c of the inserted piece 24 or the support portion 260c of the cap 260 may be omitted.

In the embodiments shown in FIGS. 20 to 27, the pullout piece 22 and the ring piece 13 may be separately provided so that the ring piece 13 may be assembled to the pullout piece 22 when the end structure 10 is formed.

The invention claimed is:

1. An end structure for a water pipe having a pipe main body made of a synthetic resin, the end structure comprising an annular metal inner piece inserted into an end of the pipe main body, and a connector including a connecting cylindrical portion connected to the pipe main body with the pipe main body inserted into the connecting cylindrical portion, the connecting cylindrical portion including a connection having an engagement portion, wherein said inner piece has its diameter increased from the inside of the pipe main body while the pipe main body is open to the outside so as to form a radially outward swollen portion in at least a part of that portion of the pipe main body which corresponds to the inner piece, the swollen portion engaging the engagement portion to connect the pipe main body to the connecting cylindrical portion so that the pipe main body is locked on the connecting cylindrical portion, wherein the inner piece is a cylinder having first and second axial ends opposite to each other, wherein the inner piece has a flange portion extending radially outward at the first axial end, the flange portion having an outer diameter larger than the inner diameter of the pipe main body so that the flange portion contacts an end surface of the pipe main body when the inner piece is inserted into the pipe main body, and wherein the flange portion is tapered so that the outer diameter of the flange portion decreases toward the first axial end.

2. The end structure for a water pipe according to claim 1, wherein said inner piece has a peripheral projection at the second axial end, wherein the swollen portion is formed by increasing a diameter of the peripheral projection from the inside of the pipe main body with the flange portion contacting the end surface of the pipe main body.

3. The end structure for a water pipe according to claim 1, wherein said swollen portion is formed by increasing an outer diameter of a peripheral surface of said pipe main body at a predetermined position of said pipe main body in an axial direction of said pipe main body.

4. The end structure of the water pipe according to claim 1, wherein the inner piece seals between an outer peripheral surface of the inner piece and an inner peripheral surface of the pipe main body.

5. A water pipe comprising the end structure according to claim 1 provided at least at one end of said pipe main body.

6. A structure for connecting a water pipe having a pipe main body made of a synthetic resin, the connection structure comprising an annular metal inner piece inserted into an end of the pipe main body, and a connector including a connecting cylindrical portion connected to the pipe main body with the pipe main body inserted into the connecting cylindrical portion, wherein said inner piece has its diameter increased from the inside of the pipe main body while the pipe main body is open to the outside so as to form a radially outward swollen portion in at least a part of that portion of the pipe main body which corresponds to the inner piece, said connecting cylindrical portion comprises a connection having an engagement portion, the engagement portion engaging the swollen portion to connect the pipe main body to the connecting cylindrical portion so that the pipe main body is locked on the connecting cylindrical portion, wherein the inner piece is a cylinder and has a flange portion extending radially outward at an axial end of the inner piece, the flange portion having an outer diameter larger than the inner diameter of the pipe main body so that the flange portion contacts an end surface of the pipe main body when the inner piece is inserted into the pipe main body, and wherein the flange portion is tapered so that the outer diameter of the flange portion decreases toward the axial end.

7. The structure according to claim 6, wherein said connection is a slip-out preventing sleeve, and with the slip-out preventing sleeve screwed onto said connecting cylindrical portion, said engagement portion is engaged with said swollen portion.

8. The structure according to claim 6, said connection includes an engaged piece comprising the engagement portion and an attached piece attached to the connecting cylindrical portion in order to maintain engagement between the engaged piece and said swollen portion.

9. The structure according to claim 8, wherein said attached piece is a fixed sleeve internally holding said engaged piece and screwed onto said connecting cylindrical portion.

10. The structure according to claim 9, wherein said fixed sleeve is installed around said pipe main body by being passed over the outside of said swollen portion from the end of the pipe main body at which said swollen portion has been formed.

\* \* \* \* \*

UNITED STATES PATENT AND TRADEMARK OFFICE
CERTIFICATE OF CORRECTION

| | | |
|---|---|---|
| PATENT NO. | : 7,350,831 B2 | Page 1 of 1 |
| APPLICATION NO. | : 10/499836 | |
| DATED | : April 1, 2008 | |
| INVENTOR(S) | : Shohachi Shimizu | |

It is certified that error appears in the above-identified patent and that said Letters Patent is hereby corrected as shown below:

Title page item (22) should read -- PCT Filed: [Jun. 18, 2004] December 25, 2002 --

Title page item (30) should read -- Foreign Application Priority Data

Dec. 25, 2001 (JP) ............. 2001-392476
Dec. 26, 2001 (JP) ............. 2001-394458
Dec. 27, 2001 (JP) ............. 2001-398470

Apr. 19, 2002 (JP) ............. 2002-117955
Nov. 29, 2002 (JP) ............. 2002-347704
Nov. 29, 2002 (JP) ............. 2002-347705
Nov. 29, 2002 (JP) ............. 2002-348300
Dec. 13, 2002 (JP) ............. 2002-362315
Dec. 13, 2002 (JP) ............. 2002-362316
Dec. 13, 2002 (JP) ............. 2002-362317 --

Signed and Sealed this

First Day of July, 2008

JON W. DUDAS
*Director of the United States Patent and Trademark Office*